US012103840B2

(12) United States Patent
Hooper et al.

(10) Patent No.: US 12,103,840 B2
(45) Date of Patent: Oct. 1, 2024

(54) INGREDIENT CONTAINER WITH SEALING VALVE

(71) Applicant: SharkNinja Operating LLC, Needham, MA (US)

(72) Inventors: Ross Hooper, Needham, MA (US); Carl Robert Wrigglesworth, London (GB)

(73) Assignee: SharkNinja Operating LLC, Needham, MA (US)

(*) Notice: Subject to any disclaimer, the term of this patent is extended or adjusted under 35 U.S.C. 154(b) by 0 days.

(21) Appl. No.: 17/989,636

(22) Filed: Nov. 17, 2022

(65) Prior Publication Data

US 2024/0166488 A1 May 23, 2024

(51) Int. Cl.
*B67D 1/08* (2006.01)
*B67D 1/12* (2006.01)

(52) U.S. Cl.
CPC ......... *B67D 1/0804* (2013.01); *B67D 1/1277* (2013.01); *B67D 2001/0812* (2013.01)

(58) Field of Classification Search
CPC ................ B67D 1/0804; B67D 1/1277; B67D 2001/0812
USPC ................ 222/556, 325, 327, 401, 490, 491
See application file for complete search history.

(56) References Cited

U.S. PATENT DOCUMENTS 236,478 A 1/1881 Ball et al.
494,483 A 3/1893 Malmstrom
916,654 A 3/1909 Barwis
1,242,493 A 10/1917 Stringham
1,420,773 A 6/1922 Stainbrook
2,400,955 A 5/1946 Leo
2,402,132 A 6/1946 Goldberg
(Continued)

FOREIGN PATENT DOCUMENTS

AU 2014241782 A1 9/2015
AU 2012293327 C1 3/2016
(Continued)

OTHER PUBLICATIONS

U.S. Appl. No. 17/989,640, filed Nov. 17, 2022, Ingredient Containers for Use Beverage Dispensers.
(Continued)

*Primary Examiner* — Donnell A Long
(74) *Attorney, Agent, or Firm* — Mintz, Levin, Cohn, Ferris, Glovsky and Popeo, P.C.

(57) ABSTRACT

Containers for use in a beverage system are provided. The containers include a container body defining an interior hollow chamber, and having an opening leading to the interior hollow chamber, and a cap covering the opening. The cap has an inlet port with an inlet valve seated therein and movable between a closed configuration for preventing passage of fluid there through, and an open configuration for allowing passage of fluid there through. The cap also has an outlet port having an outlet valve seated therein and movable between a closed configuration for preventing passage of fluid there through, and an open configuration for allowing passage of fluid there through. The cap has a collar positioned around the inlet port, the collar has an inner surface with at least a portion configured to circumferentially engage a seal having an outer diameter in a range of about 7 mm to 8 mm.

14 Claims, 26 Drawing Sheets

(56) References Cited

U.S. PATENT DOCUMENTS

| | | | |
|---|---|---|---|
| 3,357,601 | A | 12/1967 | Crawford et al. |
| 3,419,193 | A | 12/1968 | Stewart et al. |
| 3,596,809 | A | 8/1971 | Taubenheim |
| 3,752,362 | A | 8/1973 | Risener |
| 3,923,183 | A | 12/1975 | Choksi et al. |
| 4,062,466 | A | 12/1977 | Conti |
| 4,073,294 | A | 2/1978 | Stanley et al. |
| 4,103,803 | A | 8/1978 | Irvine |
| 4,190,169 | A | 2/1980 | Pehr |
| 4,212,414 | A * | 7/1980 | Beyens ................ B67D 1/0832 222/400.7 |
| 4,251,473 | A | 2/1981 | Gilbey |
| 4,323,090 | A | 4/1982 | Magi |
| 4,408,701 | A | 10/1983 | Jeans |
| 4,411,369 | A | 10/1983 | Borows |
| 4,436,227 | A | 3/1984 | Johnson et al. |
| 4,518,541 | A | 5/1985 | Harris |
| 4,533,068 | A | 8/1985 | Meierhoefer |
| 4,555,371 | A | 11/1985 | Jeans |
| 4,558,484 | A | 12/1985 | Groth |
| 4,567,993 | A | 2/1986 | Albrecht et al. |
| 4,676,287 | A | 6/1987 | Fitzwater |
| 4,706,847 | A | 11/1987 | Sankey et al. |
| 4,726,494 | A | 2/1988 | Scott |
| 4,752,138 | A | 6/1988 | Rufer |
| 4,836,414 | A | 6/1989 | Credle et al. |
| 4,866,324 | A | 9/1989 | Yuzawa et al. |
| 5,038,976 | A | 8/1991 | Mcmillin |
| 5,045,077 | A | 9/1991 | Blake, III |
| 5,102,010 | A | 4/1992 | Osgar et al. |
| RE33,969 | E | 6/1992 | Richter |
| 5,128,574 | A | 7/1992 | Koizumi et al. |
| 5,156,871 | A | 10/1992 | Goulet et al. |
| 5,170,912 | A | 12/1992 | Du |
| 5,185,007 | A | 2/1993 | Middaugh et al. |
| 5,199,609 | A | 4/1993 | Ash, Jr. |
| 5,205,440 | A | 4/1993 | Matsushita |
| 5,299,608 | A | 4/1994 | Bosyj |
| 5,330,154 | A | 7/1994 | Mashburn et al. |
| 5,390,854 | A | 2/1995 | Hench |
| 5,415,329 | A | 5/1995 | Westlund |
| 5,425,404 | A | 6/1995 | Dyer |
| 5,507,436 | A | 4/1996 | Ruttenberg |
| 5,526,853 | A | 6/1996 | Mcphee et al. |
| 5,549,228 | A | 8/1996 | Brown |
| 5,573,046 | A | 11/1996 | Venooker et al. |
| 5,642,761 | A | 7/1997 | Holbrook |
| 5,697,115 | A | 12/1997 | Sciarra et al. |
| 5,816,448 | A | 10/1998 | Kobold |
| 5,836,483 | A | 11/1998 | Disel |
| 5,842,682 | A | 12/1998 | Schennum et al. |
| 5,862,948 | A | 1/1999 | Duchon et al. |
| 5,870,944 | A | 2/1999 | Vander et al. |
| 5,884,679 | A | 3/1999 | Hansen et al. |
| 5,897,033 | A * | 4/1999 | Okawa ............... B65D 47/2031 222/546 |
| 5,924,606 | A | 7/1999 | Huizing |
| 5,947,171 | A | 9/1999 | Woodruff |
| 5,971,179 | A | 10/1999 | Christmas et al. |
| 5,975,164 | A | 11/1999 | Whaley et al. |
| 6,012,596 | A | 1/2000 | Oglesbee et al. |
| 6,014,970 | A | 1/2000 | Ivri et al. |
| 6,081,962 | A | 7/2000 | Kasen et al. |
| 6,082,586 | A | 7/2000 | Banks |
| 6,092,569 | A | 7/2000 | Simmel et al. |
| 6,095,677 | A | 8/2000 | Karkos et al. |
| 6,142,750 | A | 11/2000 | Benecke |
| 6,158,486 | A | 12/2000 | Olson et al. |
| 6,167,586 | B1 | 1/2001 | Reed et al. |
| 6,170,543 | B1 | 1/2001 | Simmel et al. |
| 6,179,167 | B1 | 1/2001 | Boot et al. |
| 6,223,791 | B1 | 5/2001 | Arsenault et al. |
| 6,257,453 | B1 | 7/2001 | Graham |
| 6,269,837 | B1 | 8/2001 | Arent et al. |
| 6,276,560 | B1 * | 8/2001 | Belcastro ............... B65D 77/28 220/709 |
| 6,283,330 | B1 | 9/2001 | Gillespie et al. |
| 6,321,941 | B1 | 11/2001 | Argentieri et al. |
| 6,325,115 | B1 | 12/2001 | Cowland et al. |
| 6,336,603 | B1 | 1/2002 | Karkos et al. |
| 6,363,235 | B1 | 3/2002 | Chiesa et al. |
| 6,386,392 | B1 | 5/2002 | Argentieri et al. |
| 6,390,335 | B1 | 5/2002 | Lawson et al. |
| 6,427,730 | B2 | 8/2002 | Nagel et al. |
| 6,450,214 | B1 | 9/2002 | Dyer et al. |
| 6,488,058 | B1 | 12/2002 | Dyer et al. |
| 6,601,734 | B1 | 8/2003 | Smith |
| 6,672,477 | B2 | 1/2004 | Miller et al. |
| 6,672,481 | B2 | 1/2004 | Ziesel |
| 6,685,056 | B1 | 2/2004 | Argentieri et al. |
| 6,688,499 | B2 | 2/2004 | Zhang |
| 6,712,497 | B2 | 3/2004 | Jersey et al. |
| 6,735,811 | B2 | 5/2004 | Field et al. |
| 6,758,372 | B2 | 7/2004 | Studer et al. |
| 6,771,925 | B2 | 8/2004 | Satoh |
| 6,820,763 | B2 | 11/2004 | Bilskie et al. |
| 6,832,706 | B2 | 12/2004 | Hearld et al. |
| 6,866,164 | B2 | 3/2005 | Branson et al. |
| 6,893,180 | B2 | 5/2005 | Hall et al. |
| 6,923,345 | B1 | 8/2005 | Laible |
| 6,951,295 | B1 | 10/2005 | Gaus et al. |
| 6,971,549 | B2 | 12/2005 | Leifheit et al. |
| 6,973,945 | B2 | 12/2005 | Haimi |
| 7,051,399 | B2 | 5/2006 | Field et al. |
| 7,051,888 | B2 | 5/2006 | Antier et al. |
| 7,083,071 | B1 | 8/2006 | Crisp et al. |
| 7,097,074 | B2 | 8/2006 | Halliday et al. |
| 7,104,531 | B2 | 9/2006 | Page et al. |
| 7,108,156 | B2 | 9/2006 | Fox |
| 7,114,707 | B2 | 10/2006 | Rona et al. |
| 7,121,437 | B2 | 10/2006 | Kasting |
| 7,121,438 | B2 | 10/2006 | Hoepner et al. |
| 7,134,575 | B2 | 11/2006 | Vogel et al. |
| 7,140,519 | B1 | 11/2006 | Kiser |
| 7,156,247 | B2 | 1/2007 | Laburu |
| 7,156,324 | B2 | 1/2007 | Birrenkott et al. |
| 7,163,127 | B2 | 1/2007 | Seelhofer |
| 7,165,568 | B2 | 1/2007 | Kessell et al. |
| 7,165,695 | B2 | 1/2007 | Choi |
| 7,178,743 | B2 | 2/2007 | Clarke et al. |
| 7,213,506 | B2 | 5/2007 | Halliday et al. |
| 7,219,598 | B2 | 5/2007 | Halliday et al. |
| 7,231,869 | B2 | 6/2007 | Halliday et al. |
| 7,246,724 | B2 | 7/2007 | Dave |
| 7,255,039 | B2 | 8/2007 | Halliday et al. |
| 7,287,461 | B2 | 10/2007 | Halliday et al. |
| 7,288,276 | B2 | 10/2007 | Rona et al. |
| 7,305,986 | B1 | 12/2007 | Steiner et al. |
| 7,316,178 | B2 | 1/2008 | Halliday et al. |
| 7,322,277 | B2 | 1/2008 | Halliday et al. |
| 7,328,815 | B2 | 2/2008 | Lowe |
| 7,364,702 | B2 | 4/2008 | Hoffman et al. |
| 7,407,117 | B2 | 8/2008 | Dodd |
| 7,418,899 | B2 | 9/2008 | Halliday et al. |
| 7,445,133 | B2 | 11/2008 | Ludovissie et al. |
| 7,458,486 | B2 | 12/2008 | Weist et al. |
| 7,510,095 | B2 | 3/2009 | Comeau et al. |
| 7,513,192 | B2 | 4/2009 | Sullivan et al. |
| 7,533,439 | B2 | 5/2009 | Theiss et al. |
| 7,533,603 | B2 | 5/2009 | Halliday et al. |
| 7,533,604 | B2 | 5/2009 | Halliday et al. |
| 7,544,289 | B2 | 6/2009 | Straka et al. |
| 7,578,415 | B2 | 8/2009 | Ziesel et al. |
| 7,592,027 | B2 | 9/2009 | Halliday et al. |
| 7,607,385 | B2 | 10/2009 | Halliday et al. |
| 7,607,591 | B2 | 10/2009 | Barch et al. |
| 7,617,954 | B2 | 11/2009 | Skillin |
| 7,621,426 | B2 | 11/2009 | Reynolds et al. |
| 7,644,843 | B1 | 1/2010 | Bush et al. |
| 7,648,049 | B1 | 1/2010 | Lassota |
| 7,651,002 | B2 | 1/2010 | Hennemann et al. |
| 7,669,737 | B2 | 3/2010 | Bethuy et al. |
| 7,673,558 | B2 | 3/2010 | Panesar et al. |

(56) References Cited

U.S. PATENT DOCUMENTS

| | | | |
|---|---|---|---|
| 7,681,492 B2 | 3/2010 | Suggi et al. | |
| 7,686,441 B2 | 3/2010 | Hashii et al. | |
| 7,690,392 B1 | 4/2010 | Sarkiss | |
| 7,703,381 B2 | 4/2010 | Liverani et al. | |
| 7,731,066 B2 | 6/2010 | Norris et al. | |
| 7,731,161 B2 | 6/2010 | Seiwert et al. | |
| 7,735,665 B2 | 6/2010 | Robinson | |
| 7,762,438 B2 | 7/2010 | Skillin | |
| 7,770,758 B2 | 8/2010 | Le | |
| 7,780,043 B2 | 8/2010 | Jourdin et al. | |
| 7,784,311 B2 | 8/2010 | Santoemma et al. | |
| 7,789,273 B2 | 9/2010 | Kadyk et al. | |
| 7,806,294 B2 | 10/2010 | Gatipon et al. | |
| 7,819,381 B2 | 10/2010 | Abe | |
| 7,823,756 B2 | 11/2010 | Alley | |
| 7,832,593 B2 | 11/2010 | Raterman et al. | |
| 7,837,132 B2 | 11/2010 | Mazooji et al. | |
| 7,841,491 B2 | 11/2010 | Contiero | |
| 7,849,872 B2 | 12/2010 | Phillips et al. | |
| 7,854,354 B2 | 12/2010 | Laible | |
| 7,857,910 B2 | 12/2010 | Carhuff et al. | |
| 7,896,203 B2 | 3/2011 | Myron | |
| 7,975,881 B1 | 7/2011 | Glucksman et al. | |
| 7,975,883 B2 | 7/2011 | Laib et al. | |
| 7,975,988 B2 | 7/2011 | Thomson et al. | |
| 7,980,421 B2 | 7/2011 | Ophardt et al. | |
| 8,006,853 B2 | 8/2011 | Delage | |
| 8,006,866 B2 | 8/2011 | Minard et al. | |
| 8,020,733 B2 | 9/2011 | Snodgrass | |
| 8,052,257 B2 | 11/2011 | Gonzales | |
| 8,083,100 B2 | 12/2011 | Minard et al. | |
| 8,087,347 B2 | 1/2012 | Halliday et al. | |
| 8,087,545 B2 | 1/2012 | Ciavarella et al. | |
| 8,113,384 B2 | 2/2012 | Bethuy et al. | |
| 8,172,453 B2 | 5/2012 | Boussemart et al. | |
| 8,210,736 B2 | 7/2012 | Raber | |
| 8,282,268 B2 | 10/2012 | Karkos et al. | |
| 8,292,101 B1 | 10/2012 | Bragg et al. | |
| 8,317,050 B2 | 11/2012 | Hollis et al. | |
| 8,376,173 B2 * | 2/2013 | Britto .................. | B65D 47/066 206/217 |
| 8,376,182 B2 | 2/2013 | Lepage | |
| 8,381,925 B2 | 2/2013 | Skillin et al. | |
| 8,403,179 B1 | 3/2013 | Gerber | |
| 8,430,134 B2 | 4/2013 | Gill | |
| 8,434,639 B2 | 5/2013 | Markert | |
| 8,448,804 B2 | 5/2013 | Luburic | |
| 8,479,950 B2 | 7/2013 | Ophardt et al. | |
| 8,517,212 B2 | 8/2013 | Antal, Sr. | |
| 8,523,025 B2 | 9/2013 | Skillin et al. | |
| 8,544,692 B2 | 10/2013 | Rusch et al. | |
| 8,555,774 B2 | 10/2013 | Patera et al. | |
| 8,584,578 B2 | 11/2013 | Koopman et al. | |
| 8,590,746 B2 | 11/2013 | Bethuy et al. | |
| 8,616,412 B2 | 12/2013 | Bethuy et al. | |
| 8,621,990 B2 | 1/2014 | Fang et al. | |
| 8,635,740 B2 | 1/2014 | Gordon et al. | |
| 8,651,333 B2 | 2/2014 | Metropulos et al. | |
| 8,661,966 B2 | 3/2014 | Stearns et al. | |
| 8,668,376 B2 | 3/2014 | Krauchi et al. | |
| 8,677,888 B2 | 3/2014 | Santoiemmo | |
| 8,685,477 B2 | 4/2014 | Almblad et al. | |
| 8,690,026 B2 | 4/2014 | Richards et al. | |
| 8,727,515 B2 | 5/2014 | Dowell et al. | |
| 8,733,566 B2 | 5/2014 | Druitt et al. | |
| 8,746,506 B2 | 6/2014 | Jersey et al. | |
| 8,757,227 B2 | 6/2014 | Girard et al. | |
| 8,757,452 B2 | 6/2014 | Richards et al. | |
| 8,770,094 B2 | 7/2014 | Rithener et al. | |
| 8,794,126 B2 | 8/2014 | Skalski et al. | |
| 8,807,392 B2 | 8/2014 | Smeller et al. | |
| 8,807,824 B2 | 8/2014 | Bodum | |
| 8,820,577 B2 | 9/2014 | Rusch et al. | |
| 8,826,688 B2 | 9/2014 | Tachibana et al. | |
| 8,833,241 B2 | 9/2014 | Santoiemmo | |
| 8,833,584 B2 | 9/2014 | Groubert | |
| 8,833,586 B2 | 9/2014 | Meyers et al. | |
| 8,840,092 B2 | 9/2014 | Kumar et al. | |
| 8,844,555 B2 | 9/2014 | Schneider | |
| 8,846,121 B2 | 9/2014 | Hansen et al. | |
| 8,863,991 B2 | 10/2014 | Cleary et al. | |
| 8,887,958 B2 | 11/2014 | Kadyk et al. | |
| 8,887,959 B2 | 11/2014 | Hill et al. | |
| 8,889,203 B2 | 11/2014 | York | |
| 8,916,215 B2 | 12/2014 | Yoakim et al. | |
| 8,919,240 B2 | 12/2014 | Ozanne et al. | |
| 8,919,669 B2 | 12/2014 | Sandahl | |
| 8,960,500 B2 | 2/2015 | Van Opstal et al. | |
| 8,960,506 B2 | 2/2015 | Beilke et al. | |
| 8,985,395 B2 | 3/2015 | Tansey | |
| 8,985,396 B2 | 3/2015 | Jersey et al. | |
| 8,985,561 B2 | 3/2015 | Hatherell | |
| 8,993,018 B2 | 3/2015 | Bucher et al. | |
| 8,998,035 B2 | 4/2015 | Ford | |
| 9,010,237 B2 | 4/2015 | Ozanne et al. | |
| 9,026,245 B2 | 5/2015 | Tilton et al. | |
| 9,027,466 B2 | 5/2015 | Bucher et al. | |
| 9,044,718 B2 | 6/2015 | Ludwig et al. | |
| 9,045,722 B2 | 6/2015 | Reif et al. | |
| 9,051,162 B2 | 6/2015 | Peters et al. | |
| 9,051,167 B2 * | 6/2015 | Burge .................. | B67D 1/0831 |
| 9,056,287 B2 | 6/2015 | Peltola et al. | |
| 9,060,650 B2 | 6/2015 | De | |
| 9,073,673 B2 | 7/2015 | Mazurkiewicz et al. | |
| 9,084,510 B2 | 7/2015 | Scorrano et al. | |
| 9,107,448 B2 | 8/2015 | Giardino et al. | |
| 9,107,449 B2 | 8/2015 | Njaastad et al. | |
| 9,107,533 B2 | 8/2015 | Volz et al. | |
| 9,114,368 B2 | 8/2015 | Njaastad et al. | |
| 9,155,330 B1 | 10/2015 | Shtivelman | |
| 9,155,418 B2 | 10/2015 | Lai et al. | |
| 9,156,670 B2 | 10/2015 | Hill et al. | |
| 9,161,654 B2 | 10/2015 | Belmont | |
| 9,166,448 B2 | 10/2015 | Lam et al. | |
| 9,167,935 B2 | 10/2015 | Scholvinck et al. | |
| 9,169,048 B2 | 10/2015 | Ludewigs et al. | |
| 9,193,506 B2 | 11/2015 | Madison et al. | |
| 9,233,824 B2 | 1/2016 | Alan et al. | |
| 9,290,317 B2 | 3/2016 | Quinn et al. | |
| 9,295,278 B2 | 3/2016 | Nowak | |
| 9,320,382 B2 | 4/2016 | Lo Faro et al. | |
| 9,320,385 B2 | 4/2016 | Spiegel et al. | |
| 9,334,090 B1 | 5/2016 | Maple et al. | |
| 9,352,897 B2 * | 5/2016 | Hoshino .................. | B65D 1/32 |
| 9,364,018 B1 | 6/2016 | Peterson et al. | |
| 9,371,176 B2 | 6/2016 | Kohli et al. | |
| 9,375,686 B2 | 6/2016 | Boarman et al. | |
| 9,388,033 B2 | 7/2016 | Gates | |
| 9,409,680 B2 | 8/2016 | Van Alfen et al. | |
| 9,409,757 B2 | 8/2016 | Reddy | |
| 9,409,759 B2 | 8/2016 | Wilder et al. | |
| 9,433,317 B2 | 9/2016 | Agon et al. | |
| 9,433,328 B2 | 9/2016 | Ciavarella et al. | |
| 9,434,532 B2 | 9/2016 | Yoakim et al. | |
| 9,440,836 B2 | 9/2016 | Quittner et al. | |
| 9,445,688 B2 | 9/2016 | Flick | |
| 9,458,003 B1 | 10/2016 | Laible | |
| 9,469,463 B2 | 10/2016 | Murray et al. | |
| 9,481,508 B2 | 11/2016 | Oh | |
| 9,486,102 B2 | 11/2016 | Baldo | |
| 9,493,298 B2 | 11/2016 | Evans et al. | |
| 9,504,348 B2 | 11/2016 | Windler et al. | |
| 9,505,510 B2 | 11/2016 | Hatherell | |
| 9,516,969 B2 | 12/2016 | Weflen | |
| 9,521,924 B2 | 12/2016 | Priley et al. | |
| 9,527,047 B2 | 12/2016 | Ring et al. | |
| 9,538,876 B2 | 1/2017 | Ozanne et al. | |
| D779,046 S | 2/2017 | Tansey, Jr. | |
| 9,580,216 B2 | 2/2017 | Wisniewski | |
| 9,582,699 B2 | 2/2017 | Jarisch et al. | |
| 9,593,005 B2 | 3/2017 | Jersey et al. | |
| 9,630,157 B2 | 4/2017 | Li et al. | |
| 9,651,188 B2 | 5/2017 | Green et al. | |
| 9,661,951 B2 | 5/2017 | Bugnano et al. | |

(56) References Cited

U.S. PATENT DOCUMENTS 9,664,264 B2 5/2017 Kristlbauer
9,668,604 B2 6/2017 Yoakim et al.
9,669,973 B2 6/2017 Hoshino et al.
9,687,796 B2 6/2017 Hoare et al.
9,701,527 B2 7/2017 Tansey, Jr.
9,708,109 B2 7/2017 Marina et al.
9,714,162 B2 7/2017 Hecht et al.
9,717,366 B2 8/2017 Nevin et al.
9,718,035 B2 8/2017 Bandixen et al.
9,723,863 B2 8/2017 Njaastad et al.
9,730,547 B2 8/2017 Tanner et al.
9,743,801 B2 8/2017 Leuzinger et al.
9,745,120 B2 8/2017 Abegglen et al.
9,745,185 B2 8/2017 Klopfenstein et al.
9,751,054 B2 9/2017 Jin et al.
9,754,437 B2 9/2017 Deo et al.
9,770,129 B2 9/2017 Remo et al.
9,783,403 B2 10/2017 Tansey, Jr.
9,783,405 B2 10/2017 Olson et al.
9,788,681 B2 10/2017 Perentes et al.
9,790,076 B2 10/2017 Novak et al.
9,796,506 B2 10/2017 Meager
9,801,500 B2 10/2017 Ven Der Woning
9,809,437 B2 11/2017 Tansey, Jr.
9,811,704 B2 11/2017 Kaeser
9,821,951 B2 11/2017 Estabrook et al.
9,821,992 B2 11/2017 Rudick et al.
9,854,935 B2 1/2018 Danieli et al.
9,889,239 B2 2/2018 Michaels et al.
9,889,966 B2 * 2/2018 Medeiros ............... B65D 23/02
9,896,322 B2 2/2018 Hecht
9,897,220 B2 2/2018 Cohen et al.
9,907,432 B2 3/2018 Tanner et al.
9,918,586 B2 3/2018 Smith et al.
9,957,145 B2 5/2018 Cohen et al.
9,974,410 B2 5/2018 Ferrier
9,980,596 B2 5/2018 Rognon et al.
9,981,801 B2 5/2018 Ozanne et al.
9,999,315 B2 6/2018 Crarer et al.
9,999,316 B2 6/2018 Ye et al.
10,000,370 B2 6/2018 Bethuy et al.
10,007,397 B2 6/2018 Besson et al.
10,017,372 B2 7/2018 Bethuy et al.
10,022,011 B2 7/2018 Norton et al.
10,028,614 B2 7/2018 Perentes et al.
10,034,573 B2 7/2018 Flick et al.
10,046,903 B2 8/2018 Evans et al.
10,046,904 B2 8/2018 Evans et al.
10,051,988 B2 8/2018 Gordon et al.
10,058,826 B2 8/2018 Cohen et al.
10,064,513 B2 9/2018 Rehfuss
10,070,751 B2 9/2018 Magniet et al.
10,076,208 B2 9/2018 Castellani et al.
10,080,461 B2 9/2018 Bugnano et al.
10,093,530 B2 10/2018 Mackey et al.
10,099,443 B1 10/2018 Evans et al.
10,106,392 B2 10/2018 Peirsman et al.
10,117,539 B2 11/2018 Rognon et al.
10,117,540 B2 11/2018 De Vreede et al.
10,130,211 B2 11/2018 Bugnano et al.
10,131,528 B2 11/2018 Webster et al.
10,131,529 B2 11/2018 Jersey et al.
10,136,755 B2 11/2018 Talon
10,143,782 B2 12/2018 Yurek et al.
10,143,978 B2 12/2018 Tipton
10,149,569 B2 12/2018 Preshel
10,155,647 B2 12/2018 Foster et al.
10,159,376 B2 12/2018 Dovat et al.
10,160,575 B2 12/2018 Ray
10,165,892 B2 1/2019 Lafosse
10,189,614 B2 1/2019 Pruiett
10,193,411 B2 1/2019 Tajima et al.
10,201,171 B2 2/2019 Gordon et al.
10,201,785 B2 2/2019 Cohen et al.
10,206,533 B2 2/2019 Pirone
10,211,438 B2 2/2019 Ohashi et al.
10,213,033 B2 2/2019 Bratsch et al.
10,213,752 B2 2/2019 Shalev
10,214,018 B2 2/2019 Nozawa et al.
10,227,226 B2 3/2019 Jersey et al.
10,229,401 B2 3/2019 Yoakim
10,231,569 B2 3/2019 Perentes et al.
10,233,002 B2 3/2019 Baenninger et al.
10,239,669 B2 3/2019 Ayriss et al.
10,258,186 B2 4/2019 Rivera
10,280,060 B2 5/2019 Van Opstal et al.
10,294,020 B2 5/2019 Nordqvist et al.
10,307,718 B2 6/2019 Waisman
10,329,134 B2 6/2019 Olson et al.
10,334,871 B2 7/2019 Van De Sluis et al.
10,336,597 B2 7/2019 Griscik et al.
10,343,885 B2 7/2019 Novak et al.
10,349,773 B2 7/2019 Segiet et al.
10,350,561 B1 7/2019 Dushine et al.
10,358,269 B2 7/2019 Cerveny
10,364,089 B2 7/2019 Daniels et al.
10,365,141 B2 7/2019 Freiburger et al.
10,370,235 B2 8/2019 Pellaud
10,377,540 B2 8/2019 Borgardt et al.
10,377,620 B2 8/2019 Makino et al.
10,384,839 B2 8/2019 Yamaguchi
10,398,254 B2 9/2019 Tinkler et al.
10,399,769 B2 9/2019 Talon et al.
10,399,838 B2 9/2019 Green
10,399,839 B2 9/2019 Knoll et al.
10,405,690 B2 9/2019 Tentorio
10,405,691 B2 9/2019 Hesselbrock et al.
10,414,557 B2 9/2019 Skillin et al.
10,414,642 B2 9/2019 Melville, Jr. et al.
10,433,668 B2 10/2019 Merali et al.
10,433,671 B2 10/2019 Surface
10,442,591 B2 10/2019 Rognard et al.
10,455,968 B1 10/2019 Singer
10,455,973 B2 10/2019 Dollner et al.
10,455,974 B2 10/2019 Talon
10,456,539 B2 10/2019 Hearn et al.
10,456,757 B1 10/2019 Blichmann
10,457,450 B2 * 10/2019 Rios ................... B65D 47/0804
10,470,605 B2 11/2019 Ergican et al.
10,479,669 B2 11/2019 Kim et al.
10,485,374 B2 11/2019 Lo Faro et al.
10,486,953 B2 11/2019 Pellaud et al.
10,488,097 B2 11/2019 Nachawati et al.
10,494,246 B2 12/2019 Hecht et al.
10,506,896 B2 12/2019 Ven Der Woning
10,507,958 B2 * 12/2019 Hashimoto ............ B65D 41/04
10,513,424 B2 12/2019 Tansey, Jr.
10,518,938 B2 12/2019 Suzuki et al.
10,518,942 B2 12/2019 Seibert et al.
10,519,020 B2 12/2019 Ozawa et al.
10,524,617 B2 1/2020 Perrin et al.
10,526,186 B2 1/2020 Kuboi et al.
10,526,192 B2 1/2020 Holley et al.
10,543,977 B2 1/2020 Brockman et al.
10,548,430 B2 2/2020 Guard et al.
10,555,636 B2 2/2020 Carr et al.
10,562,700 B2 2/2020 Weijers et al.
10,568,452 B2 2/2020 Fin et al.
10,595,549 B2 3/2020 Van De Sluis et al.
10,595,668 B2 3/2020 Tinkler et al.
10,596,305 B2 3/2020 Roberts et al.
10,604,310 B2 3/2020 Kutsuzawa et al.
10,604,398 B2 3/2020 Smeller et al.
10,618,705 B1 * 4/2020 Laible ........................ B05B 1/14
10,631,686 B2 4/2020 Abdo et al.
10,647,564 B2 5/2020 Showalter
10,654,700 B2 5/2020 Hecht
10,674,857 B2 6/2020 Lyons et al.
10,674,863 B2 6/2020 Sevcik et al.
10,676,336 B2 6/2020 Makino et al.
10,682,007 B2 6/2020 Fischer
10,682,593 B2 6/2020 Baird
10,702,835 B2 7/2020 Tran et al.
10,702,838 B2 7/2020 Chaussin et al.

(56) References Cited

U.S. PATENT DOCUMENTS 10,703,618 B2 7/2020 Ziesel
10,707,734 B2 7/2020 Holenstein et al.
10,710,864 B2 7/2020 Jangbarwala et al.
10,717,567 B2 7/2020 Sakamoto et al.
10,717,637 B2 7/2020 Pellaud et al.
10,743,707 B2 8/2020 Bugnano et al.
10,759,594 B2 9/2020 Mills et al.
10,765,254 B2 9/2020 Iotti et al.
10,766,756 B2 9/2020 Gatipon et al.
10,772,460 B2 9/2020 Accursi
10,780,408 B2 9/2020 Schöb et al.
10,791,752 B2 10/2020 Siegel et al.
10,793,346 B2 10/2020 Bartoli et al.
10,800,581 B2 10/2020 Berroa Garcia
10,807,049 B2 10/2020 Abdo et al.
10,807,853 B2 10/2020 Balstad et al.
10,813,501 B2 10/2020 Helf et al.
10,820,741 B2 11/2020 Byun et al.
10,820,744 B2 11/2020 Rubin et al.
10,820,745 B2 11/2020 Zwicker et al.
10,820,746 B2 11/2020 Noth
10,827,875 B2 11/2020 Noth
10,828,586 B2 11/2020 Simpson et al.
10,829,359 B2 11/2020 Von Kraus et al.
10,842,313 B2 11/2020 Novak et al.
10,843,142 B2 11/2020 Waggoner et al.
10,843,849 B1 11/2020 Berge
10,843,866 B2 11/2020 Cafaro et al.
10,846,975 B2 11/2020 Tansey et al.
10,849,451 B2 12/2020 Su
10,849,454 B2 12/2020 Gordon et al.
10,869,572 B2 12/2020 Blatt
10,870,566 B2 12/2020 Green et al.
10,882,728 B2 1/2021 Hong et al.
10,883,072 B2 1/2021 Hong et al.
10,893,773 B2 1/2021 Standaar et al.
10,894,639 B2 1/2021 Pruiett
10,894,706 B2 1/2021 Iotti et al.
10,898,026 B2 1/2021 Fin
10,899,600 B2 1/2021 Frieburger et al.
10,905,287 B2 2/2021 Tu et al.
10,906,013 B2 2/2021 Cohen et al.
10,918,239 B2 2/2021 Hartmann et al.
10,919,752 B2 2/2021 Breault
10,925,433 B2 2/2021 Hansen et al.
10,926,945 B2 2/2021 Kennedy et al.
10,940,494 B2 3/2021 Romanov et al.
10,945,554 B2 3/2021 Lo Faro et al.
10,945,557 B2 3/2021 Nishimura et al.
10,947,485 B2 3/2021 Min et al.
10,952,562 B2 3/2021 Tanner et al.
10,954,043 B2 3/2021 Taruno
10,961,027 B1 3/2021 Laible
10,966,563 B2 4/2021 Dubief et al.
10,966,564 B2 4/2021 Rijskamp et al.
10,973,364 B2 4/2021 Hesselbrock et al.
10,981,700 B2 4/2021 Migas et al.
10,989,026 B2 4/2021 Al-gouhi et al.
10,993,575 B2 5/2021 Krug et al.
10,993,576 B2 5/2021 Fedorak et al.
10,994,980 B2 5/2021 Jangbarwala et al.
11,001,490 B2 5/2021 Headley et al.
11,008,206 B2 5/2021 Pappas
11,013,363 B1 5/2021 Alsudairi et al.
11,021,359 B2 6/2021 Bissen et al.
11,026,539 B2 6/2021 Zosimadis et al.
11,033,141 B2 6/2021 Schlack
11,039,712 B2 6/2021 Egli et al.
11,040,806 B2 6/2021 Naumann et al.
11,049,354 B2 6/2021 Yoakim
11,053,053 B2 7/2021 Jordan
11,059,636 B2 7/2021 Maeda
11,064,715 B2 7/2021 Herbert et al.
11,072,521 B2 7/2021 Walker
11,078,066 B2 8/2021 Crackel et al.
11,084,007 B2 8/2021 Adams
11,084,701 B2 8/2021 Kuboi et al.
11,085,435 B2 8/2021 Dobbins et al.
11,097,236 B2 8/2021 Alexander et al.
11,109,708 B2 9/2021 Lecomte et al.
11,110,418 B2 9/2021 Furman et al.
11,124,404 B2 9/2021 Von Kraus et al.
11,129,490 B2 9/2021 Park et al.
11,129,491 B2 9/2021 Park et al.
11,147,410 B2 10/2021 Hachenberger et al.
11,148,927 B2 10/2021 Wing et al.
11,166,593 B2 11/2021 Trakselis
11,167,231 B2 11/2021 Akdim et al.
11,180,293 B2 11/2021 Sahara et al.
11,191,286 B2 12/2021 Cross et al.
11,192,711 B2 12/2021 Jarisch et al.
11,194,443 B2 12/2021 Deo et al.
11,203,515 B2 12/2021 Cook
11,206,941 B2 12/2021 Abdo et al.
11,208,310 B2 12/2021 Tansey et al.
11,208,313 B2 12/2021 Conover et al.
11,208,314 B2 12/2021 Peirsman et al.
11,235,267 B1 2/2022 Santoiemmo
11,242,195 B2 2/2022 Nordqvist et al.
11,246,326 B2 2/2022 Feola
11,247,186 B2 2/2022 Topp-manske
11,247,892 B2 2/2022 Moore et al.
11,250,659 B2 2/2022 Tansey et al.
11,252,976 B2 2/2022 Popov et al.
11,254,491 B2 2/2022 Krüger
11,254,586 B1 2/2022 Santoiemmo
11,274,027 B2 3/2022 Krüger et al.
11,284,734 B2 3/2022 Hilckmann et al.
11,284,736 B2 3/2022 Ochoa et al.
11,292,642 B2 4/2022 Hiltser et al.
11,292,646 B2 4/2022 Bai et al.
11,292,706 B2 4/2022 Showalter
11,292,707 B2 4/2022 Lecomte et al.
11,297,850 B2 4/2022 Popov et al.
11,304,557 B2 4/2022 De Vreede et al.
11,312,604 B2 4/2022 Mehta et al.
11,325,760 B2 5/2022 Alderson et al.
11,325,818 B2 5/2022 Dahlberg et al.
11,337,542 B2 5/2022 Kroos
11,339,045 B2 5/2022 Conway et al.
11,344,151 B2 5/2022 Rolla
11,345,581 B2 5/2022 Cook
11,345,583 B2 5/2022 Aslam et al.
11,370,648 B2 6/2022 Melville, Jr. et al.
11,407,629 B1 8/2022 Siegel
11,407,630 B1 8/2022 Shafir
11,465,892 B1 10/2022 Dos Santos
11,470,994 B2 10/2022 Hashimoto
11,479,457 B2 10/2022 Krüger et al.
11,634,314 B1 4/2023 Anthony et al.
11,745,996 B1 9/2023 Zbedlick
2002/0121531 A1 9/2002 Stillinger et al.
2002/0130140 A1 9/2002 Cote
2002/0158075 A1* 10/2002 Caldicott ........... A47G 19/2272 220/717
2003/0012849 A1 1/2003 Berson
2003/0132241 A1 7/2003 Treat
2003/0168455 A1 9/2003 Zettle et al.
2004/0195245 A1 10/2004 Gohil
2005/0000053 A1 1/2005 Kasper et al.
2005/0040131 A1 2/2005 Lin
2005/0092392 A1 5/2005 Abe
2005/0151764 A1 7/2005 Grady et al.
2005/0184075 A1* 8/2005 Belcastro ........... A47G 19/2272 220/717
2005/0191759 A1 9/2005 Pedersen-Bjergaard et al.
2006/0071040 A1* 4/2006 Young ................ B65D 47/0838 222/484
2006/0124662 A1 6/2006 Reynolds et al.
2006/0226176 A1 10/2006 Tseng
2008/0029541 A1 2/2008 Wallace et al.
2008/0078769 A1 4/2008 Crunkleton et al.
2008/0237271 A1 10/2008 Olechowski
2008/0272144 A1 11/2008 Bonney et al.

(56) References Cited

U.S. PATENT DOCUMENTS

2008/0287880 A1 11/2008 Keller
2009/0140006 A1 6/2009 Vitantonio et al.
2009/0214742 A1 8/2009 Peden et al.
2009/0236361 A1 9/2009 Doelman et al.
2010/0089921 A1 4/2010 Ellenkamp-Van et al.
2010/0170841 A1* 7/2010 An ........................ B01D 35/30 137/511
2010/0192782 A1 8/2010 Blumenauer et al.
2010/0251901 A1 10/2010 Santoiemmo
2011/0011889 A1 1/2011 Bonney et al.
2011/0107545 A1 5/2011 Cagnina et al.
2011/0181417 A1 7/2011 Haskayne et al.
2011/0186535 A1 8/2011 Meager
2011/0290828 A1 12/2011 Lolk
2012/0187153 A1 7/2012 Burge et al.
2012/0193318 A1 8/2012 Meager
2013/0062366 A1 3/2013 Tansey
2013/0098499 A1 4/2013 Bencista et al.
2013/0233878 A1 9/2013 Lindmayer
2014/0004241 A1 1/2014 Hatherell
2014/0070431 A1 3/2014 Hatherell
2014/0154368 A1 6/2014 Kolls et al.
2014/0175125 A1 6/2014 Breault
2014/0182715 A1 7/2014 Cooper et al.
2014/0231442 A1 8/2014 Hill et al.
2014/0272019 A1 9/2014 Schuh et al.
2015/0050392 A1 2/2015 Stonehouse et al.
2015/0125578 A1 5/2015 Hatherell
2015/0125586 A1 5/2015 Ergican
2015/0166252 A1 6/2015 Jones
2015/0225169 A1 8/2015 Jarisch
2015/0374025 A1 12/2015 Evans et al.
2016/0009539 A1 1/2016 Jersey et al.
2016/0130076 A1 5/2016 Jarisch
2016/0192806 A1 7/2016 Pikkemaat et al.
2016/0242456 A1 8/2016 Evans et al.
2016/0251208 A1 9/2016 Tansey, Jr.
2016/0255991 A1 9/2016 Givens et al.
2016/0318689 A1 11/2016 Rudick et al.
2016/0332124 A1 11/2016 Cohen
2017/0215645 A1 8/2017 Doglioni Majer et al.
2017/0225880 A1 8/2017 Vivier et al.
2017/0280750 A1 10/2017 Arnaud et al.
2017/0332672 A1 11/2017 Kasprzycki et al.
2017/0334636 A1 11/2017 Park et al.
2017/0341856 A1 11/2017 Aschwanden
2017/0370629 A1 12/2017 Fire
2018/0000280 A1 1/2018 Dubief
2018/0057337 A1 3/2018 Babucke et al.
2018/0086621 A1 3/2018 Dubief et al.
2018/0093820 A1 4/2018 Massey et al.
2018/0215603 A1 8/2018 Hecht
2018/0251358 A1 9/2018 Wing et al.
2018/0251361 A1 9/2018 Wing et al.
2018/0297830 A1 10/2018 Kraenzle
2018/0312386 A1 11/2018 Brun-Kestler et al.
2018/0354713 A1 12/2018 Ting et al.
2019/0077586 A1 3/2019 Cafaro et al.
2019/0134583 A1 5/2019 Lautenschläger et al.
2019/0144804 A1 5/2019 Hong et al.
2019/0146641 A1 5/2019 Deo et al.
2019/0153368 A1 5/2019 Yoon et al.
2019/0166886 A1 6/2019 Gordon et al.
2019/0169016 A1 6/2019 Vandekerckhove et al.
2019/0191916 A1 6/2019 Guyon et al.
2019/0231119 A1 8/2019 Kennedy et al.
2019/0241420 A1 8/2019 Peirsman et al.
2019/0269156 A1 9/2019 Van De Sluis et al.
2019/0270630 A1 9/2019 Dahan et al.
2019/0274469 A1 9/2019 Van De Sluis
2019/0274482 A1 9/2019 Abdo et al.
2019/0275478 A1 9/2019 Jersey et al.
2019/0290054 A1 9/2019 Weber et al.
2019/0291062 A1 9/2019 Wood et al.
2019/0291064 A1 9/2019 Conroy et al.
2019/0292034 A1 9/2019 Wood et al.
2019/0292036 A1 9/2019 Rice et al.
2019/0328170 A1 10/2019 Cai
2019/0335952 A1 11/2019 Di Bari
2019/0337713 A1 11/2019 Ergican et al.
2019/0344233 A1 11/2019 Savino
2019/0367350 A1 12/2019 Bhutani et al.
2020/0000272 A1 1/2020 Nabeiro et al.
2020/0010311 A1 1/2020 Moore
2020/0017806 A1 1/2020 Peirsman et al.
2020/0031651 A1 1/2020 Schneidewend et al.
2020/0047137 A1 2/2020 Wilder et al.
2020/0054172 A1 2/2020 Trakselis
2020/0060465 A1 2/2020 Longman et al.
2020/0062476 A1 2/2020 Katayama et al.
2020/0077841 A1 3/2020 Dercar et al.
2020/0079637 A1 3/2020 Kaplita et al.
2020/0100618 A1 4/2020 Guyon et al.
2020/0107671 A1 4/2020 Gordon et al.
2020/0121115 A1 4/2020 Oh
2020/0122100 A1 4/2020 Tumey
2020/0122994 A1 4/2020 Cimatti et al.
2020/0146308 A1 5/2020 Roberts et al.
2020/0146500 A1 5/2020 Cafaro et al.
2020/0146501 A1 5/2020 Mchugh et al.
2020/0156019 A1 5/2020 Sawyer et al.
2020/0170443 A1 6/2020 Chioda et al.
2020/0187718 A1 6/2020 Seidl
2020/0198956 A1 6/2020 Hartsfield et al.
2020/0207603 A1 7/2020 Sevcik
2020/0216786 A1 7/2020 Pintz
2020/0229472 A1 7/2020 Manne
2020/0231372 A1 7/2020 Parise
2020/0253361 A1 8/2020 Davidson
2020/0281396 A1 9/2020 Accursi et al.
2020/0331739 A1 10/2020 Mehta et al.
2020/0345170 A1 11/2020 Jarisch et al.
2020/0359822 A1 11/2020 Dercar et al.
2020/0359841 A1 11/2020 Dercar et al.
2020/0360875 A1 11/2020 Danieli et al.
2020/0361758 A1 11/2020 Fantappié et al.
2020/0367689 A1 11/2020 Illy et al.
2020/0369440 A1 11/2020 Croibier et al.
2020/0369446 A1 11/2020 Mélan-moutet
2020/0369504 A1 11/2020 Balstad et al.
2020/0369505 A1 11/2020 Mckay
2020/0375221 A1 12/2020 Colvin et al.
2020/0397184 A1 12/2020 Ruggiero et al.
2021/0000289 A1 1/2021 Krüger et al.
2021/0002044 A1 1/2021 Koenigseder
2021/0002046 A1 1/2021 Da Costa et al.
2021/0013785 A1 1/2021 Liang et al.
2021/0015303 A1 1/2021 Byun et al.
2021/0052104 A1 2/2021 Perentes
2021/0100394 A1 4/2021 Affolter et al.
2021/0101722 A1 4/2021 Migas et al.
2021/0106163 A1 4/2021 Van De Sluis et al.
2021/0122540 A1 4/2021 Meager
2021/0127891 A1 5/2021 Wei
2021/0127902 A1 5/2021 Deng et al.
2021/0137304 A1 5/2021 Krger et al.
2021/0137315 A1 5/2021 Byun et al.
2021/0147138 A1 5/2021 Affolter et al.
2021/0171333 A1 6/2021 Amos
2021/0177189 A1 6/2021 Kordich et al.
2021/0179411 A1 6/2021 Dahan et al.
2021/0188530 A1 6/2021 Pellegrini et al.
2021/0196074 A1 7/2021 Guarin et al.
2021/0259286 A1 8/2021 Siegel et al.
2021/0259472 A1 8/2021 Seidler et al.
2021/0261324 A1 8/2021 Arnold
2021/0275942 A1 9/2021 Stryker et al.
2021/0292152 A1 9/2021 Fedorka et al.
2021/0307564 A1 10/2021 Gort-barten
2021/0309422 A1 10/2021 Hiltser et al.
2021/0316913 A1 10/2021 Woody et al.
2021/0316979 A1 10/2021 Hayes-pankhurst et al.
2021/0317393 A1 10/2021 Peirsman et al.
2021/0338004 A1 11/2021 Alsayar et al.

(56) References Cited

U.S. PATENT DOCUMENTS

2021/0347623 A1 11/2021 Fantappie et al.
2021/0354883 A1 11/2021 Ferrari et al.
2021/0361112 A1 11/2021 Hobden et al.
2021/0362993 A1 11/2021 Shafir et al.
2021/0378267 A1 12/2021 Barak
2021/0380392 A1 12/2021 Glucksman et al.
2022/0002134 A1 1/2022 Pellaud
2022/0022496 A1 1/2022 Monsanto et al.
2022/0024748 A1 1/2022 Fantappie et al.
2022/0031110 A1 2/2022 Sekulic et al.
2022/0031113 A1 2/2022 Smith et al.
2022/0033172 A1 2/2022 Favre
2022/0039587 A1 2/2022 De Freitas
2022/0039602 A1 2/2022 Xiong
2022/0040651 A1 2/2022 Böttcher et al.
2022/0053967 A1 2/2022 Guyon et al.
2022/0061581 A1 3/2022 Fernandes De Carvalho et al.
2022/0071435 A1 3/2022 Tseng
2022/0071437 A1 3/2022 Tseng
2022/0071440 A1 3/2022 Tseng et al.
2022/0071441 A1 3/2022 Patil et al.
2022/0073238 A1 3/2022 Naumann et al.
2022/0073336 A1 3/2022 Savioz
2022/0088937 A1 3/2022 Oya
2022/0098020 A1 3/2022 Garcia Tebar
2022/0106180 A1 4/2022 Rue et al.
2022/0135294 A1 5/2022 Peng et al.
2022/0169424 A1 6/2022 Yang
2022/0289548 A1 9/2022 Augsburger
2022/0296015 A1 9/2022 Crane

FOREIGN PATENT DOCUMENTS

AU 2013284311 B2 12/2016
AU 2014241782 B2 9/2017
AU 2016259900 A1 11/2017
AU 2016200626 B2 3/2018
AU 2018201199 B2 11/2018
AU 2017394249 A1 7/2019
AU 2019238313 A1 11/2020
BR 112014032633 B1 4/2020
BR 112021003593 A2 5/2021
CA 3081923 A1 2/2013
CA 2903862 A1 9/2014
CA 2904325 A1 9/2014
CA 2920909 A1 2/2015
CA 2961901 A1 4/2016
CA 2967927 A1 5/2016
CA 2977475 A1 9/2016
CA 2983958 A1 11/2016
CA 2996900 A1 3/2017
CA 2781759 C 9/2017
CA 2837286 C 11/2017
CA 2837064 C 1/2018
CA 3041722 A1 5/2018
CA 3047084 A1 6/2018
CA 3049841 A1 7/2018
CA 3079433 A1 4/2019
CA 3095669 A1 9/2019
CA 2936866 C 10/2019
CA 2875899 C 12/2019
CA 2843702 C 7/2020
CA 3081920 C 9/2021
CN 1016312 B 4/1992
CN 201200323 Y 3/2009
CN 101432221 B 8/2012
CN 101300190 B 2/2013
CN 103213928 A 7/2013
CN 203314745 U 12/2013
CN 203576299 U 5/2014
CN 102842181 B 1/2015
CN 104654699 A 5/2015
CN 104828373 A 8/2015
CN 105000258 A 10/2015
CN 103720363 B 11/2015
CN 105377408 A 3/2016
CN 103648963 B 4/2016
CN 103213928 B 5/2016
CN 105595868 A 5/2016
CN 103687800 B 8/2016
CN 103781538 B 9/2016
CN 103663329 B 4/2017
CN 103430117 B 5/2017
CN 105307973 B 9/2017
CN 103841862 B 10/2017
CN 102712453 B 11/2017
CN 105188897 B 11/2017
CN 107530653 A 1/2018
CN 108024654 A 5/2018
CN 105712278 B 8/2018
CN 208291834 U 12/2018
CN 109171502 A 1/2019
CN 109380973 A 2/2019
CN 109922668 A 6/2019
CN 104582509 B 7/2019
CN 106715322 B 8/2019
CN 105849030 B 9/2019
CN 110198910 A 9/2019
CN 110234592 A 9/2019
CN 110247484 A 9/2019
CN 106073500 B 10/2019
CN 107108192 B 10/2019
CN 107074522 B 1/2020
CN 209988362 U 1/2020
CN 107108191 B 2/2020
CN 107438580 B 3/2020
CN 105011305 B 5/2020
CN 111356648 A 6/2020
CN 108910815 B 7/2020
CN 111386060 A 7/2020
CN 111466793 A 7/2020
CN 106793808 B 8/2020
CN 111589315 A 8/2020
CN 112218819 A 1/2021
CN 112421819 A 2/2021
CN 112998522 A 6/2021
CN 113038840 A 6/2021
CN 107205445 B 7/2021
CN 113165861 A 7/2021
CN 113226052 A 8/2021
CN 108768070 B 9/2021
CN 214731066 U 11/2021
CN 110980621 B 1/2022
CN 113905975 A 1/2022
CN 109863112 B 2/2022
CN 113995076 A 2/2022
CN 112313168 B 10/2022
DE 202015104155 U1 11/2015
EP 268451 A2 5/1988
EP 1351758 A1 10/2003
EP 1767262 B1 8/2008
EP 1718403 B1 5/2011
EP 2340754 A1 7/2011
EP 2359260 A1 8/2011
EP 2340754 B1 10/2012
EP 2504270 A1 10/2012
EP 2504271 A1 10/2012
EP 1966065 B2 11/2012
EP 2714577 A1 4/2014
EP 2737834 A1 6/2014
EP 2969899 A2 1/2016
EP 2714577 B1 7/2016
EP 2719450 B1 7/2016
EP 2504270 B1 11/2016
EP 3003542 A4 1/2017
EP 3021686 A4 2/2017
EP 2359260 B1 6/2017
EP 3197820 A2 8/2017
EP 2976975 B1 1/2018
EP 3261981 A1 1/2018
EP 3212562 A4 6/2018
EP 2741845 B1 8/2018
EP 3294443 A4 1/2019
EP 3040114 B1 3/2019

(56) References Cited

FOREIGN PATENT DOCUMENTS

| | | | |
|---|---|---|---|
| EP | 3275345 | B1 | 3/2019 |
| EP | 3349622 | A4 | 6/2019 |
| EP | 3221251 | B1 | 10/2019 |
| EP | 3533937 | A3 | 11/2019 |
| EP | 3452403 | A4 | 1/2020 |
| EP | 2504271 | B1 | 4/2020 |
| EP | 3537891 | A4 | 5/2020 |
| EP | 3554988 | A4 | 7/2020 |
| EP | 2866593 | B1 | 8/2020 |
| EP | 3643676 | A3 | 8/2020 |
| EP | 3697724 | A1 | 8/2020 |
| EP | 2714578 | B1 | 12/2020 |
| EP | 3760795 | A1 | 1/2021 |
| EP | 3762331 | A1 | 1/2021 |
| EP | 3200610 | B1 | 2/2021 |
| EP | 3571152 | A4 | 3/2021 |
| EP | 3834622 | A1 | 6/2021 |
| EP | 3212563 | B1 | 9/2021 |
| EP | 3869973 | A1 | 9/2021 |
| EP | 3870535 | A1 | 9/2021 |
| EP | 3871994 | A1 | 9/2021 |
| EP | 3877322 | A1 | 9/2021 |
| EP | 3883389 | A1 | 9/2021 |
| EP | 3768629 | A4 | 12/2021 |
| EP | 3808230 | B1 | 6/2022 |
| EP | 4069626 | A1 | 10/2022 |
| ES | 2351796 | T3 | 2/2011 |
| ES | 2532901 | T3 | 4/2015 |
| ES | 2749388 | T3 | 3/2020 |
| FR | 2623488 | A1 | 5/1989 |
| FR | 3078531 | B1 | 5/2021 |
| GB | 2259653 | A | 3/1993 |
| GB | 2486872 | A | 7/2012 |
| GB | 2526734 | A | 12/2015 |
| GB | 2486872 | B | 3/2016 |
| IL | 119044 | | 11/1996 |
| RU | 2491875 | C2 | 9/2013 |
| WO | 8503853 | A1 | 9/1985 |
| WO | 9807122 | A1 | 2/1998 |
| WO | 103817 | A1 | 1/2001 |
| WO | 03083431 | A2 | 10/2003 |
| WO | 3098776 | A1 | 11/2003 |
| WO | 2004063087 | A1 | 7/2004 |
| WO | 2008101275 | A1 | 8/2008 |
| WO | 2009027053 | A1 | 3/2009 |
| WO | 2009135758 | A1 | 11/2009 |
| WO | 2009136781 | A1 | 11/2009 |
| WO | 2012025425 | A1 | 3/2012 |
| WO | WO 2012/082712 | A1 * | 6/2012 |
| WO | 2013019963 | A2 | 2/2013 |
| WO | 2013036564 | A2 | 3/2013 |
| WO | 2013019963 | A3 | 5/2013 |
| WO | 2014037456 | A1 | 3/2014 |
| WO | 2014182423 | A2 | 11/2014 |
| WO | 2014182423 | A3 | 12/2014 |
| WO | 2014201753 | A1 | 12/2014 |
| WO | 2016073069 | A1 | 5/2016 |
| WO | 2016087474 | A1 | 6/2016 |
| WO | 2016202815 | A1 | 12/2016 |
| WO | 2017096505 | A1 | 6/2017 |
| WO | 2017109718 | A1 | 6/2017 |
| WO | 2019183540 | A1 | 9/2019 |
| WO | 2020084615 | A1 | 4/2020 |
| WO | 2020086425 | A1 | 4/2020 |
| WO | 2020092859 | A1 | 5/2020 |
| WO | 2020097558 | A1 | 5/2020 |
| WO | 2020097728 | A1 | 5/2020 |
| WO | 2020092859 | A8 | 6/2020 |
| WO | 2020148294 | A1 | 7/2020 |
| WO | 2020148293 | A3 | 9/2020 |
| WO | 2020174336 | A1 | 9/2020 |
| WO | 2020193376 | A1 | 10/2020 |
| WO | 2020198811 | A1 | 10/2020 |
| WO | 2020219385 | A1 | 10/2020 |
| WO | 2020234060 | A1 | 11/2020 |
| WO | 2020243452 | A1 | 12/2020 |
| WO | 2021016331 | A1 | 1/2021 |
| WO | 2021016343 | A1 | 1/2021 |
| WO | 2021018760 | A1 | 2/2021 |
| WO | 2021019161 | A1 | 2/2021 |
| WO | 2021028654 | A2 | 2/2021 |
| WO | 2021032892 | A1 | 2/2021 |
| WO | 2021055937 | A1 | 3/2021 |
| WO | 2021061553 | A1 | 4/2021 |
| WO | 2021061614 | A1 | 4/2021 |
| WO | 2021090186 | A1 | 5/2021 |
| WO | 2021093936 | A1 | 5/2021 |
| WO | 2021101990 | A1 | 5/2021 |
| WO | 2021115135 | A1 | 6/2021 |
| WO | 2021138385 | A1 | 7/2021 |
| WO | 2021140254 | A1 | 7/2021 |
| WO | 2021168069 | A1 | 8/2021 |
| WO | 2021174309 | A1 | 9/2021 |
| WO | 2021191774 | A1 | 9/2021 |
| WO | 2021198162 | A1 | 10/2021 |
| WO | 2021209507 | A1 | 10/2021 |
| WO | 2021228877 | A1 | 11/2021 |
| WO | 2021233931 | A1 | 11/2021 |
| WO | 2021240307 | A1 | 12/2021 |
| WO | 2021240308 | A1 | 12/2021 |
| WO | 2021240311 | A1 | 12/2021 |
| WO | 2022020764 | A1 | 1/2022 |
| WO | 2022038408 | A1 | 2/2022 |
| WO | 2022051389 | A1 | 3/2022 |
| WO | 2022126811 | A1 | 6/2022 |
| WO | 2022189622 | A1 | 9/2022 |
| WO | 2022189623 | A1 | 9/2022 |

OTHER PUBLICATIONS

U.S. Appl. No. 17/989,642, filed Nov. 17, 2022, Dosing Accuracy.
U.S. Appl. No. 17/989,610, filed Nov. 17, 2022, Ingredient Container.
U.S. Appl. No. 17/989,648, filed Nov. 17, 2022, Ingredient Container With Retention Features.
U.S. Appl. No. 17/989,657, filed Nov. 17, 2022, Ingredient Container Valve Control.
U.S. Appl. No. 17/744,459, filed May 13, 2022, Flavored Beverage Carbonation System.
U.S. Appl. No. 17/744,462, filed May 13, 2022, Flavorant for Beverage Carbonation System.
U.S. Appl. No. 17/744,468, filed May 13, 2022, Flavored Beverage Carbonation Process.
U.S. Appl. No. 17/811,177, filed Jul. 7, 2022, Flavored Beverage Carbonation System.
European Search Report received for European Patent Application No. 23209898.8, mailed on Apr. 23, 2024, 4 pages.
International Search Report and Written Opinion received for PCT Application No. PCT/US2023/072475, mailed on Feb. 1, 2024, 14 pages.
Invitation to Pay Additional Fees received for PCT Application No. PCT/US2023/078826, mailed on Mar. 12, 2024, 10 pages.
International Search Report and Written Opinion received for PCT Application No. PCT/US2023/078826, mailed on Jul. 4, 2024, 23 pages.
Invitation to Pay Additional Fees received for PCT Application No. PCT/US2024/016898, mailed on Jul. 1, 2024, 11 pages.

* cited by examiner

INGREDIENT CONTAINER WITH SEALING VALVE

FIELD

Ingredient containers used with beverage dispensing devices are provided.

BACKGROUND

Conventional beverage dispensing devices operate to carbonate and/or flavor water. Some devices may mix carbonated water and a flavoring compound together in a machine and then dispense the resulting mixture into a receptacle. Unless the devices are thoroughly cleaned, this method can result in contamination occurring over time. Other devices rely on crushing, puncturing, and/or generally compromising flavoring containers in order to access the flavoring compounds inside. These methods of breaching flavoring containers can result in splatter and mess, which, if not thoroughly cleaned, can result in similar contamination.

Still other devices rely on carbonating water within a specialized container to be attached to the device, and from which the resulting beverage is served. The container can be pre-filled with water and/or flavoring, and then it can be secured to the devices and pressurized within the container and used to serve the resulting beverage. These devices, however, can create excess plastic waste, as specially adapted bottles must be produced to interface with the device.

Accordingly, there remains a need for a better beverage dispensing device to improve on mess creation and waste production.

SUMMARY

Ingredient containers for use with beverage dispensing systems are provided. Related apparatuses and techniques are also provided.

In one embodiment, a container is provided and can include a container body defining a hollow interior, and a cap having an end wall with a first collar projecting therefrom and a second collar projecting therefrom. The first collar can have an inlet valve therein, and the second collar can have an outlet valve therein. The first and second collars can be spaced apart from one another. The end wall can further have first and second recesses surrounding the first and second collars. The first and second recesses can be formed in a surface of the end wall.

The container can vary in a number of ways and may include any of the following features, alone or in combination. For example, the first and second collars and the first and second recesses together can define a figure-8 shaped feature. The container can also include first and second shoulder portions positioned on opposite sides of the end wall and projecting outward from the outward facing surface of the end wall. For example, each of the first and second recesses can have first and second curved sidewalls that extend partially around the first and second collars, respectively. In some aspects, each of the first and second recesses can have a third curved sidewall positioned opposite the first and second curved sidewalls. For example, the first and second recesses can be positioned on opposite sides of the first and second collars. For example, the cap can have a minor axis and a major axis, and wherein the cap is substantially symmetrical about the minor axis. In some aspects, the first and second collars can be aligned along the minor axis.

In another embodiment, a container is provided and includes a container body defining a hollow interior, and a cap coupled to the container body to close off the hollow interior. The cap can include at least one recess having a figure-8 shaped projection with first and second openings therein. The first opening can include an inlet valve and the second opening can include an outlet valve, and the figure-8 shaped projection can be at least partially defined by first and second recesses formed in a surface of the cap.

The container can vary in a number of ways and may include any of the following features, alone or in combination. For example, the substantially figure-8 shaped projection can include first and second collars defining the first and second openings and that are spaced a distance apart from one another, having the inlet and outlet valves disposed therein. For example, the first and second recesses surrounding the figure-8 shaped projection can each include first, second, and third sidewalls. The first and second sidewalls can be substantially convex and the third sidewall can be substantially concave. For example, the container body can have a substantially ovular cross-section with major and minor axes. The inlet and the outlet can be aligned along the minor axis. The cap can be configured to couple to the container body via a snap-fit.

In one embodiment, a container for use in a beverage system is provided. The container includes a container body defining an interior hollow chamber and a cap covering the opening in the container body. The container body can have an opening leading to the interior hollow chamber. The cap can have an inlet port, an outlet port, and a collar positioned around the inlet port. The inlet port can have an inlet valve seated therein and can be movable between a closed configuration for preventing passage of fluid there through, and an open configuration for allowing passage of fluid there through. The outlet port can have an outlet valve seated therein and movable between a closed configuration for preventing passage of fluid there through, and an open configuration for allowing passage of fluid there through. The collar can be positioned around the inlet port and can have an inner surface with at least a portion configured to circumferentially sealing engage a seal having an outer diameter in a range of about 7 mm to 8 mm.

The container can vary in a number of ways and may include any of the following features, alone or in combination. For example, the body can include an end face having the inlet and outlet ports therein, and a skirt extending around the interface portion and defining a sidewall of the body. In some aspects, the skirt can have a substantially triangular shape. In other aspects, the collar can project outward from the end face. For example, the collar can be substantially cylindrical. For example, the inlet valve and the outlet valve each can include a cross-shaped slit configured to enable fluid flow therethrough. For example, the cap can include a closure pivotally coupled thereto and movable between an open position and a closed position. The closure can be configured to close off the inlet valve and the outlet valve in the closed position. In some aspects, the cap can include at least one closure retention feature on an external surface thereof, and the at least one closure retention feature can be configured to couple to the closure to retain the closure in the open position.

In another embodiment, a container for use in a beverage system is provided. The container can include a container body defining an interior hollow chamber and a cap coupled to the opening of the container body. The cap can have an inlet valve that is sealed to retain the fluid additive within the interior hollow chamber and that is configured to open to allow gas to be injected into the interior hollow chamber, and an outlet valve that is sealed to retain the fluid additive within the interior hollow chamber and that is configured to open when a pressure within the interior hollow chamber exceeds a threshold pressure to allow fluid additive within the container body to flow through the outlet valve. The inlet valve can have a generally cylindrical shape and the outlet valve can have a generally cylindrical shape. A diameter of the outlet valve can be in a range from about 7 mm to 13 mm.

The container can vary in a number of ways and may include any of the following features, alone or in combination. For example, the cap can include a closure pivotally coupled thereto and movable between an open position and a closed position. The closure can be configured to close off the inlet valve and the outlet valve in the closed position. For example, the container body can have a substantially ovular cross-section including a major axis about a first width and a minor axis about a second width. In some aspects, the inlet port and the outlet port can align with the minor axis of the container body. In other aspects, the cap can include at least one orientation element configured to orient the cap relative to the container body. For example, the inlet valve and the outlet valve each can include a cross-shaped slit configured to enable fluid flow therethrough.

In one embodiment, a flow control assembly is provided. The flow control assembly can include a cap having a flow control system with an inlet port having an inlet valve and an outlet port having an outlet valve. The flow control system can achieve a Dosing Accuracy (DA) of about 100 or less according to the following formula:

$$DA = \left[\frac{(Po - Pc)}{(Vd - Ls)}\right]$$

Po is a pressure to open the outlet valve ($mmH_2O$), Pc is a pressure to close the outlet valve ($mmH_2O$), Vd is a diameter of the outlet valve (mm), and Ls is a length of the valve opening (mm).

The flow control assembly can vary in a number of ways and may include any of the following features, alone or in combination. For example, the flow control system can achieve a DA of between about 40 and 70. For example, the flow control system can achieve a DA of about 55. For example, the pressure to open the inlet valve (Po) can be greater than about 100 $mmH_2O$. For example, the pressure to open the inlet valve (Po) can be greater than about 400 $mmH_2O$ For example, the diameter of the outlet valve (Vd) can be between about 5 mm and 15 mm, and in certain embodiments can be about 9.5 mm. For example, the length of the valve opening (Ls) can be between about 1 mm and 5 mm, and in certain embodiments can be about 3.7 mm.

In other embodiments, the cap can include a sidewall defining a cavity configured to receive a neck of a container. The cap can include an end wall having the inlet port and an outlet port formed therein. In some aspects, the inlet port and the outlet port each can include a cylindrical collar having the inlet valve and the outlet valve disposed therein, respectively. For example, the flow control assembly can include a container body defining an interior hollow chamber. The container body can have an opening leading to the interior hollow chamber, and the cap can be configured to couple to the opening of the container body to seal fluid within the interior hollow chamber. In some aspects, the inlet valve can be configured to allow a gas to be injected into the interior hollow chamber, and the outlet valve can be configured to open to allow fluid to flow out of the interior hollow chamber when a pressure within the interior hollow chamber exceeds the pressure to open the outlet valve (Po).

In another embodiment, an ingredient container for use in a beverage carbonation system is provided. The ingredient container can include a container body defining an interior hollow chamber and an opening leading to the interior hollow chamber, and a cap coupled to the opening. The container body can have a cross-section with a major axis defining a width that is greater than a minor axis defining a depth. The cap can have an inlet that can be sealed to retain fluid within the container and that can be configured to open to allow gas to be injected into the interior hollow chamber. The cap can have an outlet that can be sealed to retain fluid within the container and that can be configured to open to allow fluid within the container to flow out through the outlet valve. The inlet and the outlet can be aligned along a first axis that extends parallel to the minor axis of the container body.

The container can vary in a number of ways and may include any of the following features, alone or in combination. For example, the first axis can extend substantially perpendicular to the major axis of the container body. For example, the cap can have an irregular shape. For example, the cap can have a substantially triangular outer perimeter. For example, the cap can have a major axis and a minor axis, and the first axis can extend along the minor axis of the cap. For example, the cross-section of the container body can be ovular.

In another embodiment, an ingredient container is provided. The ingredient container can include a container body defining an interior hollow chamber and having an opening leading to the interior hollow chamber, and a cap positioned over the opening in the container body. The cap can have an irregular shape with a major axis and a minor axis, and the cap can include an inlet port and an outlet port positioned along the minor axis.

The ingredient container can vary in a number of ways and may include any of the following features, alone or in combination. For example, the inlet and outlet port can be positioned along an axis that extends substantially perpendicular to the major axis of the cap. For example, the cap can have a generally triangular cross-sectional shape. For example, the cap can have an outer perimeter with first, second, and third sides, and the first side can be longer than the second and third sides. In some aspects, the inlet and outlet valves can be positioned along an axis extending substantially perpendicular to the first side. For example, the cap can have a base wall having the inlet and outlet ports therein, and a sidewall extending around an outer perimeter of the base wall. The sidewall can have a height that varies around the outer perimeter. For example, the container body can have a cross-section with a major axis defining a width that is greater than a minor axis defining a depth, and the cap major axis can be aligned with the major axis of the container body.

In another embodiment, an ingredient container is provided. The ingredient container can include a container body having a hollow interior and an opening leading into the hollow interior, and a cap positioned over the opening in the container body and including an inlet port and an outlet port. A cross-section of the cap can extend substantially perpendicular to a central axis of each of the inlet port and the outlet port can have a shape that is a substantially circular triangle.

The ingredient container can vary in a number of ways and may include any of the following features, alone or in combination. For example, the cap can have an outer sidewall defining the shape of the cross-section and can have first, second, and third walls. In some aspects, the first wall can have a length that is greater than a length of each of the second and third walls. In other aspects, the first wall can be substantially planar, and the second and third walls can be convex. For example, the cap can have a base wall with the inlet and outlet ports therein, and an outer sidewall surrounding the base wall. The outer sidewall can have first and second shoulders projecting upward from the base wall. In some aspects, the cap can include a base wall having the inlet and outlet ports formed therein, and the base wall can include a circular cavity formed therein at a mid-portion thereof. In some variations, inlet and outlet ports can be positioned within the circular cavity.

In another embodiment, an ingredient container is provided. The ingredient container can include a container body having an opening leading into a hollow interior, and a cap covering the opening. The cap can include a base having an inlet port and an outlet port formed therein, and a sidewall extending around the base and defining an outer perimeter of the cap body. The sidewall can include first and second shoulders extending upward from the base on opposed sides of the inlet and outlet ports. The first shoulder can have a first inner surface and the second shoulder can have a second inner surface. The first and second inner surfaces each can have a detent therein configured to receive a corresponding protrusion in a carriage assembly of a beverage carbonation system.

The closure can vary in a number of ways. For example, the detent can include an opening formed through the first and second inner surfaces. In some aspects, the opening can be generally rectangular. For example, the closure can include a lid coupled to the cap body. The lid can be movable between an open position spaced a distance from the inlet and outlet, and a closed position in which the lid covers the inlet and outlet. For example, the sidewall can have a generally triangular cross-sectional shape. For example, the first and second inner surfaces can be substantially planar. For example, the first shoulder can have a first outer surface opposite the first inner surface, and the second shoulder can have a second outer surface opposite the second inner surface. The first and second outer surfaces can be convex. For example, the base can include a circular recess formed therein and can have the inlet and outlet port position therein.

In another embodiment, a carbonation system is provided. The carbonation system can include a housing having at least one movable carriage with a cavity therein, and a container having a hollow body and a cap coupled to the hollow body. The cavity can include at least one spring-biased projection. The cap can include a base with inlet and outlet ports, and a sidewall extending around the base and having first and second shoulders, and at least one detent formed on an inner facing surface of at least one of the first and second shoulders. The at least one detent can be configured to receive the at least one projection in the carriage when the container is disposed within the cavity in the carriage.

The carbonation system can vary in a number of ways. For example, the at least one projection and the at least one detent can be configured to produce an audible click when the container is inserted into the cavity in the carriage. For example, the at least one projection can include first and second projections positioned within the cavity, and the at least one detent can include first and second detents formed on the inner facing surface of the first and second shoulders, respectively. For example, the inner facing surface of the first and second shoulders can extend substantially perpendicular to the base. For example, the sidewall can have a substantially triangular cross-sectional shape.

In another embodiment, a carbonation system is provided. The carbonation system can include a housing having at least one movable carriage with a cavity therein, and a container having a hollow body and a cap coupled to the hollow body. The cavity can include first and second spring-biased projections. The cap can include inlet and outlet ports, and the cap can have first and second detents formed therein and configured to receive the first and second projections in the carriage when the container is disposed within the cavity in the carriage. The first and second projections and the first and second detents can be configured to produce an audible click when the container is inserted into the cavity in the carriage.

The carbonation system can vary in a number of ways. For example, the cap can include a base having the inlet and outlet ports therein, and a sidewall can extend around the base and can include first and second shoulders. The first and second detents can be formed in the first and second shoulders, respectively. In some aspects, the first and second shoulders can have first and second inner facing surfaces with the first and second detents formed therein, and the first and second inner facing surfaces can extend substantially perpendicular to the base. For example, the cap can have a substantially triangular cross-sectional shape.

In another embodiment, a container is provided. The container can include a container body having an opening extending into a hollow interior, and a cap extending across the opening. The cap can have an inlet port with an inlet valve configured to couple to a fluid source such that fluid can be delivered through the inlet valve to pressurized the hollow interior of the container body, and an outlet port with an outlet valve. The outlet valve can have a cracking pressure at which the outlet valve is configured to move from a closed configuration to an open configuration to dispense fluid from the hollow interior, and a closing pressure at which the outlet valve is configured to move from the open configuration to the closed configuration to prevent fluid from passing therethrough. The cracking pressure can be greater than the closing pressure.

The container can vary in a number of ways. For example, a difference between the cracking pressure and the closing pressure can be in a range of about 300 $mmH_2O$ to 400 $mmH_2O$. For example, a difference between the cracking pressure and the closing pressure can be about 340 $mmH_2O$. For example, the cracking pressure can be greater than about 600 $mmH_2O$ or less than about 400 $mmH_2O$. For example, the inlet valve and the outlet valve each can include a cross-shaped slit configured to enable fluid flow therethrough.

In another embodiment, a container is provided. The container can include a container body having an opening extending into a hollow interior, and a cap extending across the opening. The cap can have an inlet port with an inlet valve configured to couple to a fluid source such that fluid can be delivered through the inlet valve to pressurized the hollow interior of the container body, and an outlet port with an outlet valve. The outlet valve can have a closed configuration to prevent fluid flow from the hollow interior, and can be movable to an open configuration to dispense fluid from the hollow interior in response to a pressure increase within the hollow interior increase of between about 300 and 380 $mmH_2O$.

The container can vary in a number of ways. For example, the pressure increase can be about 340 $mmH_2O$. For example, the outlet valve can have a cracking pressure greater than about 600 $mmH_2O$. The outlet valve can have a closing pressure less than about 400 $mmH_2O$. In some embodiments, the inlet valve and the outlet valve can each have a cross-shaped slit configured to enable fluid flow therethrough.

In another embodiment, a container is provided. The container can include a container body defining a hollow interior, and a cap. The cap can have an inlet port with an inlet valve seated therein and movable between a closed configuration for preventing passage of fluid there through, and an open configuration for allowing passage of fluid there through. The cap can also have an outlet port having an outlet valve seated therein and movable between a closed configuration for preventing passage of fluid there through, and an open configuration for allowing passage of fluid there through. The outlet valve can have a configuration that will dispense a predetermined amount of fluid in a range of 1.6 mL to 2.0 mL in response to a dose of gas being pumped into the container for a period of 140 ms.

The container can vary in a number of ways. For example, the predetermined amount of fluid can be 1.8 mL. For example, the inlet valve and the outlet valve each can include a cross-shaped slit configured to enable fluid flow therethrough. For example, the outlet valve can have a cracking pressure at which the outlet valve is configured to move from a closed configuration to an open configuration to dispense fluid from the hollow interior, and can have a closing pressure at which the outlet valve is configured to move from the open configuration to the closed configuration to prevent fluid from passing therethrough. The cracking pressure can be greater than the closing pressure. For example, the predetermined amount of fluid is proportional to a difference between the cracking pressure and the closing pressure.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

Figure 1:
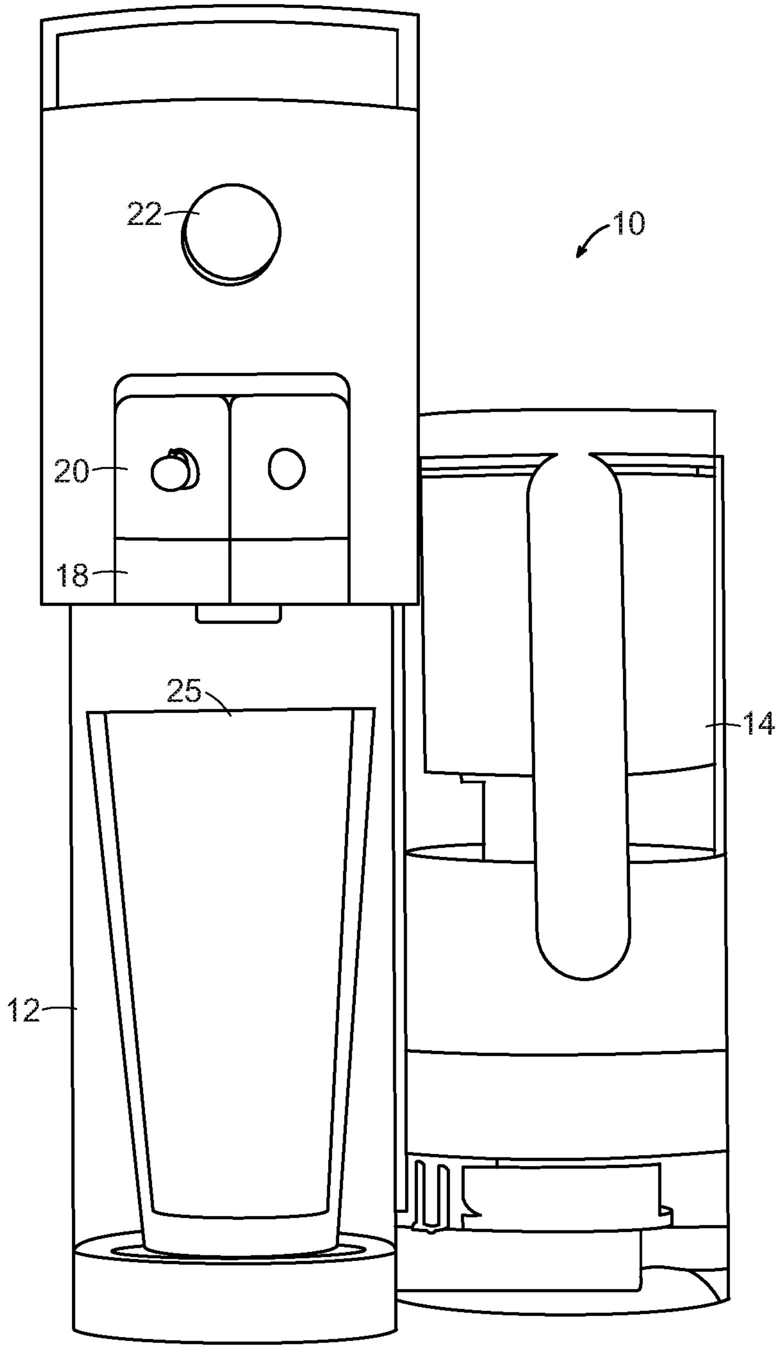
FIG. 1 is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments.

Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, ingredient containers for use with beverage dispensers and carriages for receiving ingredient containers are provided. In one embodiment, an ingredient container is provided that can contain an additive for use in a beverage dispensing process. The ingredient container can have a hollow container body with an opening and a lid coupled to the container body. The lid can include a lid base configured to couple to the container body over the opening, and the lid base can have an inlet and an outlet therein. In certain embodiments, the lid can further include a lid cover configured to selectively close the inlet and the outlet, thereby sealing a hollow interior of the container body. The inlet and the outlet can each have a seal disposed therein that is configured to open in the presence of a pressure differential between an interior and an exterior of the ingredient container in an attempt to eliminate the pressure differential. The ingredient container can be shaped and designed to correspond to a carriage located on a beverage dispensing device. The carriage can have complimentary features to receive and retain the ingredient container, and when retained, the ingredient container can be employed by a beverage dispensing device for use in the creation of customized beverages.

Methods of dispensing the additive stored within the ingredient container can vary. In some embodiments, the ingredient container is pressurized with a gas, such as air, to cause the outlet to open and dispense the stored additive. When the ingredient container is properly seated and retained by a carriage, a gas line fluidly coupled to a pump can receive the inlet of the ingredient container in order to seal around the inlet in preparation for the introduction of gas into the ingredient container during a dispensing procedure. Gas can be pumped by the pump, though the gas line, through the inlet seal, and into the hollow interior of the ingredient container. The resulting increase in internal pressure can cause the outlet seal to open and dispense an amount of the additive proportional to the amount of gas introduced through the inlet.

Figure 2:
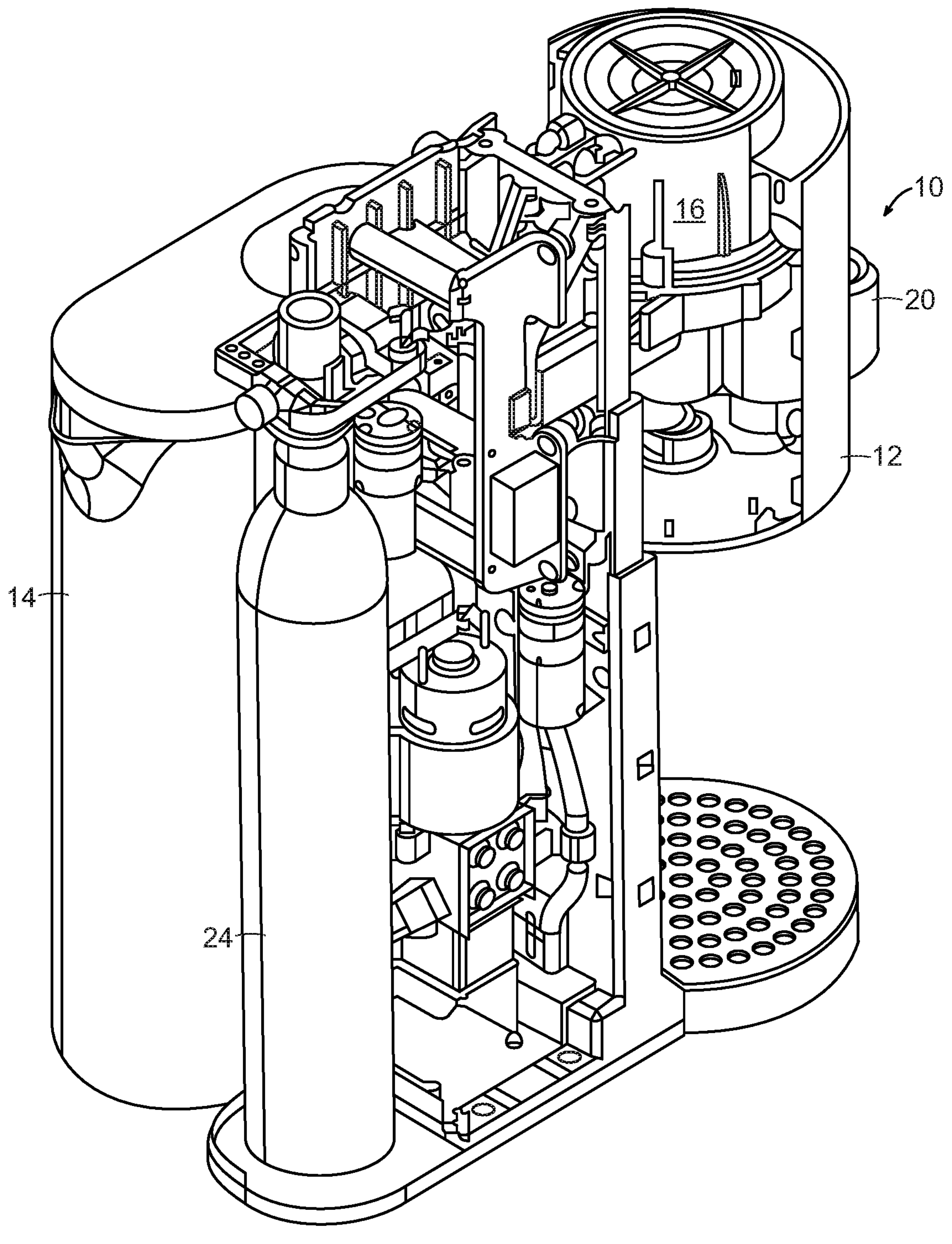
FIG. 2 is a rear perspective view of the beverage dispensing system of FIG. 1 with various housing components removed.

FIGS. 1-2 illustrate a beverage dispensing system 10 according to one embodiment. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. A carriage assembly 18 can be included on and/or coupled to the beverage dispensing system 10, and it can receive one or more ingredient containers 20 to be used in the creation of beverages. The ingredient containers 20 can include one or more additives (e.g., a flavorant, a vitamin, a food dye, etc.) to be included in a created beverage as desired.

During a beverage dispensing process, a user can actuate inputs located at a user interface 22 in order to select specific characteristics of the desired beverage, such as volume, carbonation level, specific additives, and additive amount. If the user selects inputs to indicate that the beverage is carbonated, water can be fed from the fluid reservoir 14 and into the carbonation assembly 16, and carbon-dioxide can be fed from a canister 24 and into the carbonation assembly 16 to produce carbonated water. If the user selects inputs to indicate that one or more additives should be added to the beverage, the beverage dispensing system 10 can dispense the additive from the one or more ingredient containers 20 coupled to the system. The beverage can be dispensed into a container, such as a drinking glass 26.

FIGS. 3-6 illustrate one embodiment of a carriage assembly 100 which can be coupled to and/or retained with or within a beverage dispensing device, such as beverage dispensing device 10. In the illustrated embodiment, the carriage assembly 100 is contained within a carriage housing 100A. The carriage assembly 100 can include one or more carriages 101, which can each seat and retain one or more ingredient containers (not shown) for use in a beverage dispensing process. Although the carriage assembly 100 is shown having two separately movable carriages 120, a different number of carriages 120 are contemplated herein as well. For example, the carriage assembly can be in the form of a single movable carriage having multiple cavities with each cavity configured to receive an ingredient container. Ingredient containers and their retention within the carriage assembly 100 will be described in greater detail below.

Figure 3:
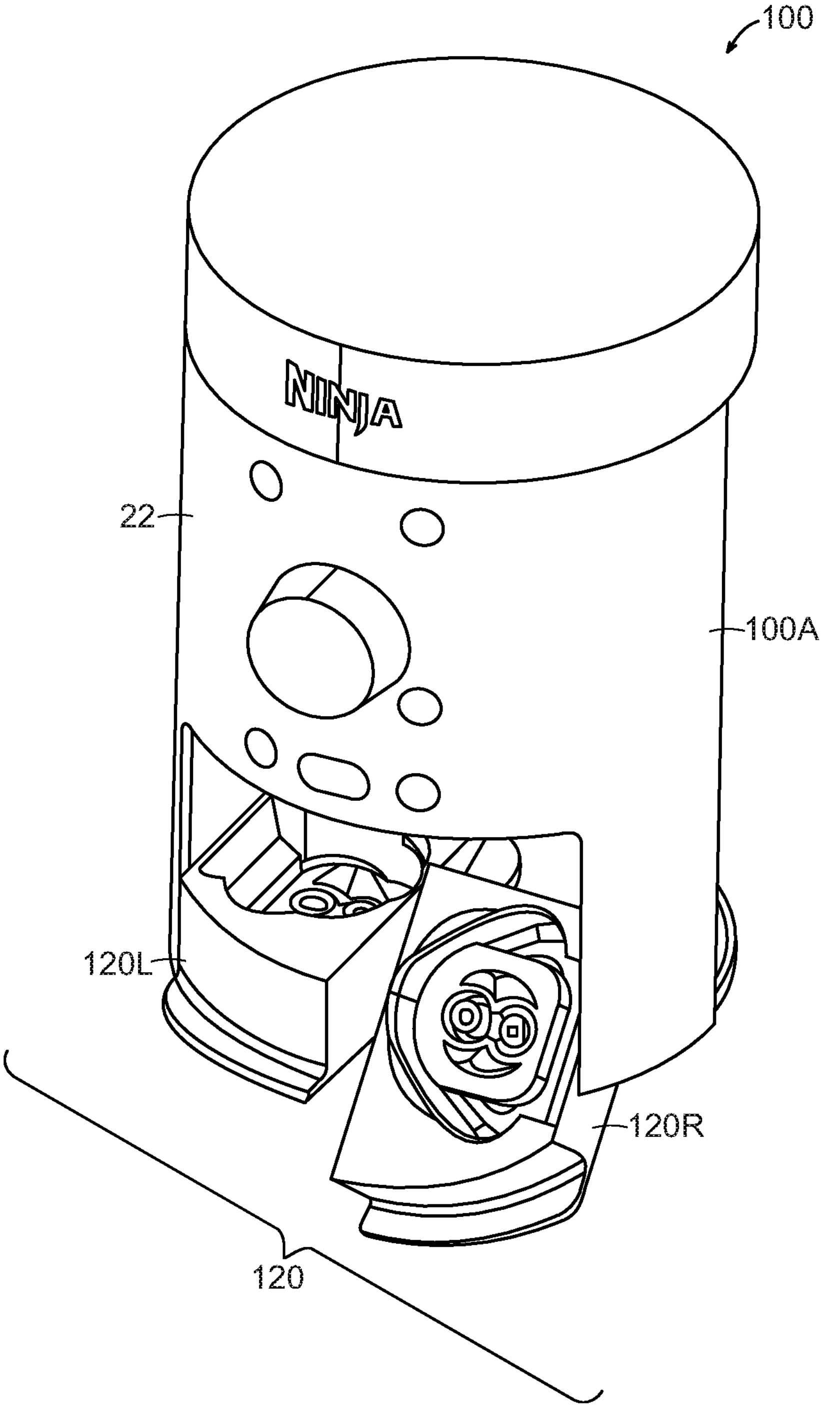
FIG. 3 is a front perspective view of one embodiment of a housing portion and carriage assembly for use with a beverage dispensing system.
Figure 4:
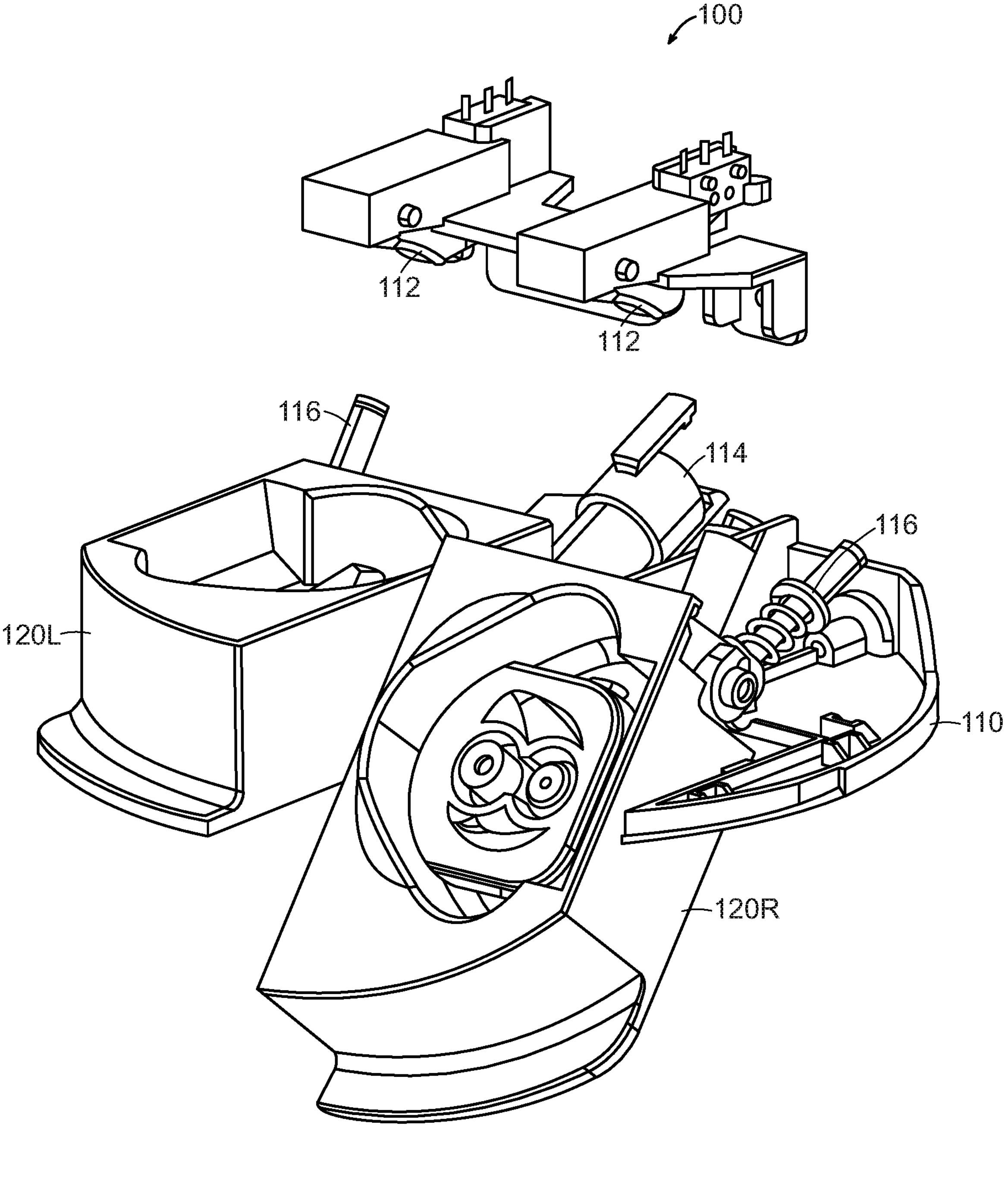
FIG. 4 is a perspective view of a carriage assembly of FIG. 3 having the housing portion removed.

FIG. 4 illustrates the carriage assembly 100 separated from the carriage housing 100A. The illustrated carriage assembly 100 generally includes a left carriage 120L and a right carriage 120R (collectively carriages 120) coupled to a carriage base 110. The carriage base 110 can have a variety of forms, which may depend upon the form of the carriage housing 100A containing the carriage base 110. As illustrated, the carriage housing 100A and the carriage base 110 have a substantially cylindrical form. The carriage base 110 can include cutouts and/or slots for seating and receiving various components including, for example, the carriages 120 and a fluid outlet 114. The carriages 120 can be coupled to be carriage base 110 in a variety of ways, for example, the carriages 120 can be pivotally hinged to the carriage base 110 such that the carriages can pivot downward in order to facilitate loading one or more ingredient containers. The left carriage 120L is illustrated in FIGS. 3 and 4 in an upward position, while the right carriage 120R is pivoted downward to a downward position. The carriages 120 can be coupled to the carriage assembly 100 in other ways, such as via a sliding connection, a stationary connection, etc., or they can be coupled directly to a beverage dispensing device. The illustrated carriage base 110 further includes lift assists 116, which can be coupled to a rear region of the carriages 120. The lift assists 116 can include a biasing feature such as a spring, such that each of the coupled carriages are biased to the upward position. A micro-switch 112 (also referred to as left micro-switch 112L and right micro-switch 112R) can be located above each of the carriages 110, which will be discussed in more detail below.

Figure 5A:
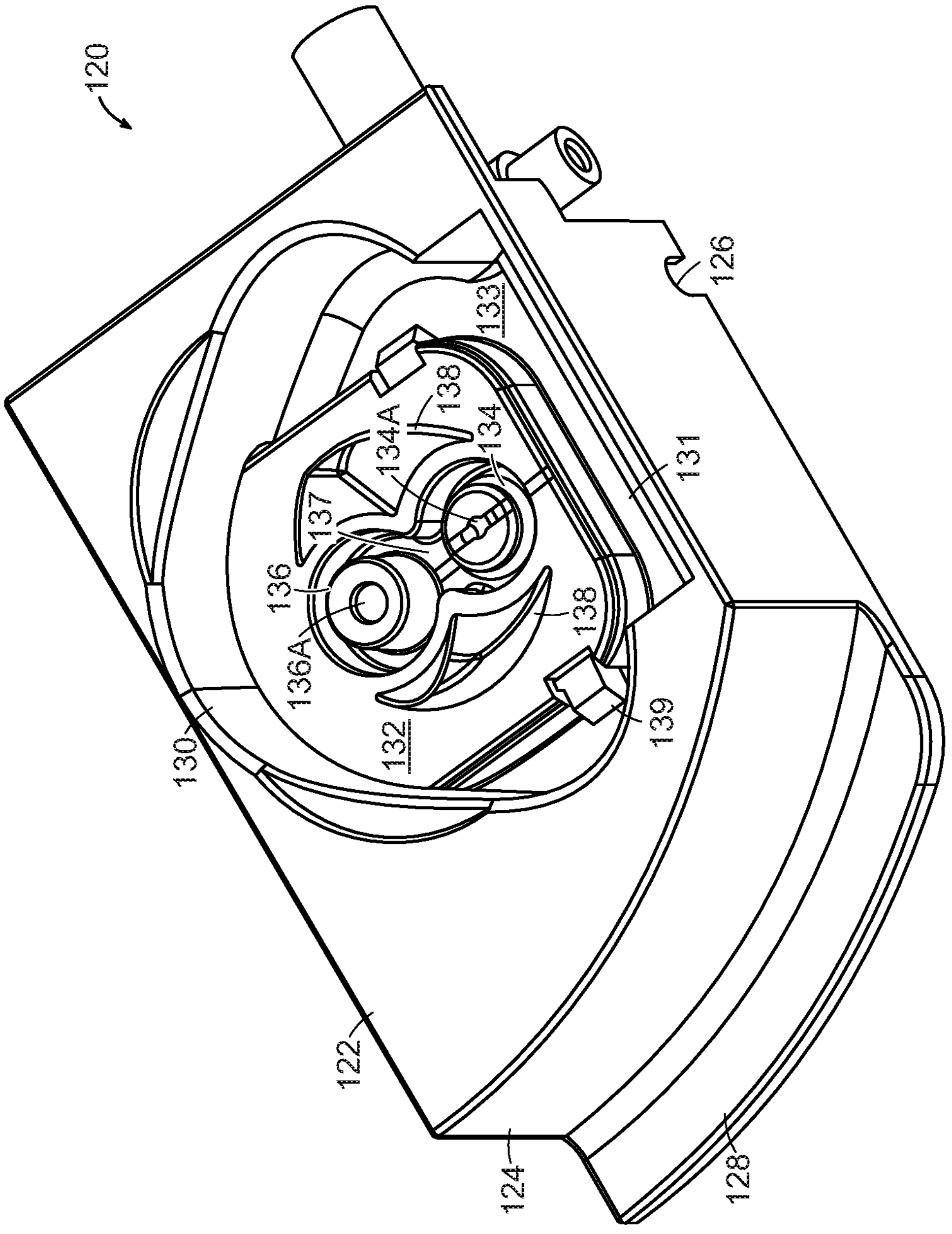
FIG. 5A is a top view of a carriage used with the carriage assembly of FIG. 3.
Figure 5B:
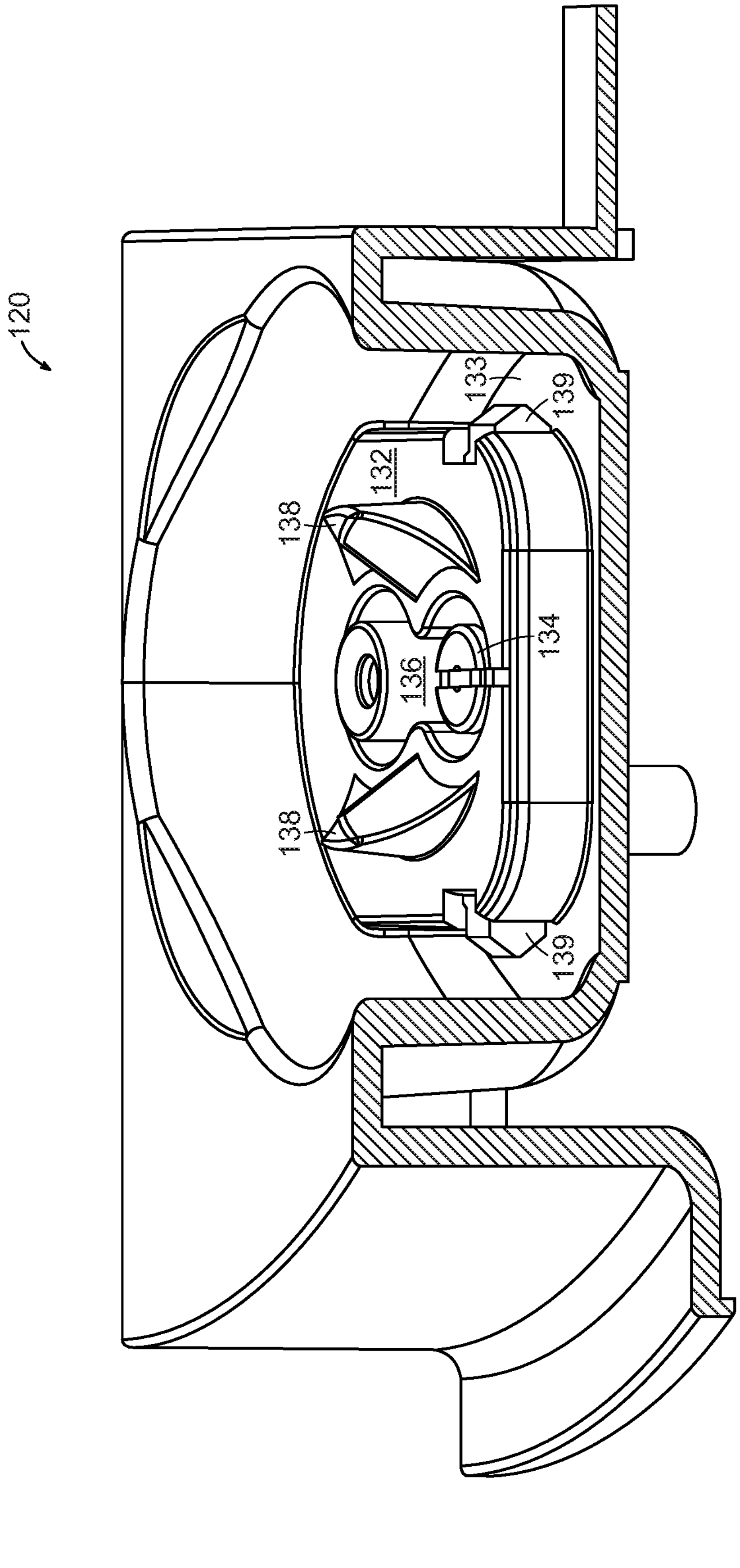
FIG. 5B is a cross-sectional view of the carriage of FIG. 5A.
Figure 6:
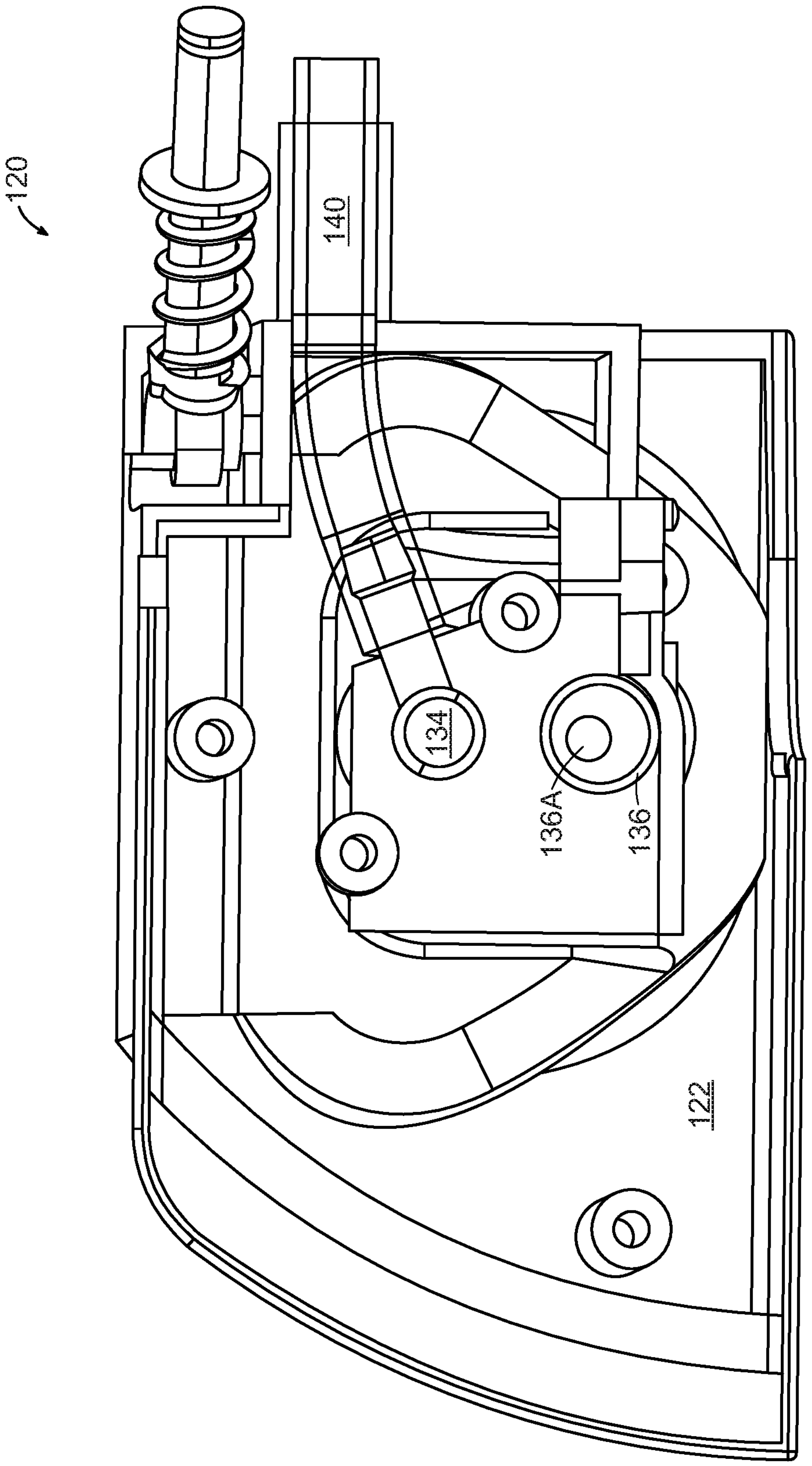
FIG. 6 is a bottom view of the carriage of FIG. 5A.
Figure 7:
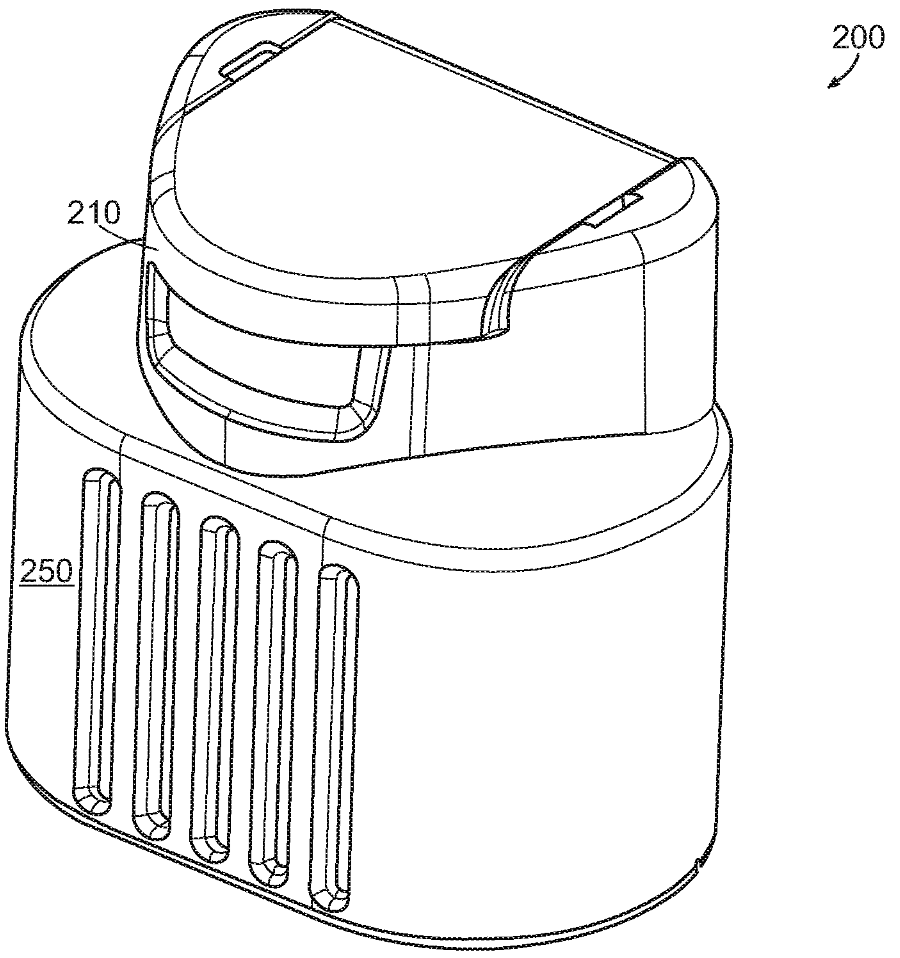
FIG. 7 is a perspective view of an ingredient container according to an embodiment.

FIGS. 5 and 6 depict a single carriage 120 in more detail. Features described as applying to one carriage can be applied to all carriages. As shown, the carriage 120 has a generally rectangular carriage body 122 with a rounded front face 124 that can be shaped to conform with an overall contour of the carriage housing 110A. A handle 128 can extend from the front face 124 to provide a grasping surface to enable the carriage 120 to be easily pivoted, such as when an ingredient container is placed into or removed from the carriage assembly 120. While the handle 128 is shown in the form of a protruding lip or ledge, the handle 128 can take on various forms and can include protrusions of other shapes as well as recesses within the carriage body 122 itself. The carriage 120 can further include a pivot axis 126 located near a rear of the carriage body 122, as introduced above, for allowing the carriage 120 to pivot relative to the carriage body 122.

An upper portion of the carriage body 122 can include a carriage face 130, as best shown in FIGS. 5A and 5B. In an exemplary embodiment, the carriage face 130 is shaped to receive and retain a complimentary ingredient container for use during a beverage dispensing process. The carriage face 130 can include a variety of indentations, protrusions, flat areas, and rounded areas to fully receive ingredient containers of any shape or size, as well as to ensure that an ingredient container is properly seated and coupled to the system. In the illustrated embodiment, the carriage face 130 is in the form of a generally triangular recess with rounded corners, e.g., a rounded triangle. One side can include a rectangular cutout 131 extending therefrom. In certain embodiments, the cutout 131 can be formed in the longed side of the triangle, and it can be located closest to a mid-portion of the carriage assembly 100. The central region 132 of the carriage face 130 can include a raised platform having a variety of features thereon. As shown, the central region 132 is raised such that a peripheral channel 133 is defined within the carriage face 130. The central region 132 can include a carriage inlet 134 and an carriage outlet 136, which can be configured to align with and couple to an inlet and an outlet of an ingredient container, respectively. The illustrated carriage inlet 134 and the carriage outlet 136 have a substantially round form defining a central opening 134A, 136A. The central openings 134A, 136A can pass entirely through the carriage 120. The inlet and outlet receivers 134, 136 can be made from a variety of materials. For example, one or both of the inlet and outlet receivers 134, 136 can be made from a plastic, a resin, a rubber, a metal, or a composite thereof. In certain embodiments, for example, one or more of the inlet and outlet receivers 134, 136 can be made from a rubber or rubber-like material such that an air-tight seal is created between the carriage face and a seated ingredient container, as discussed further below.

Figure 8A:
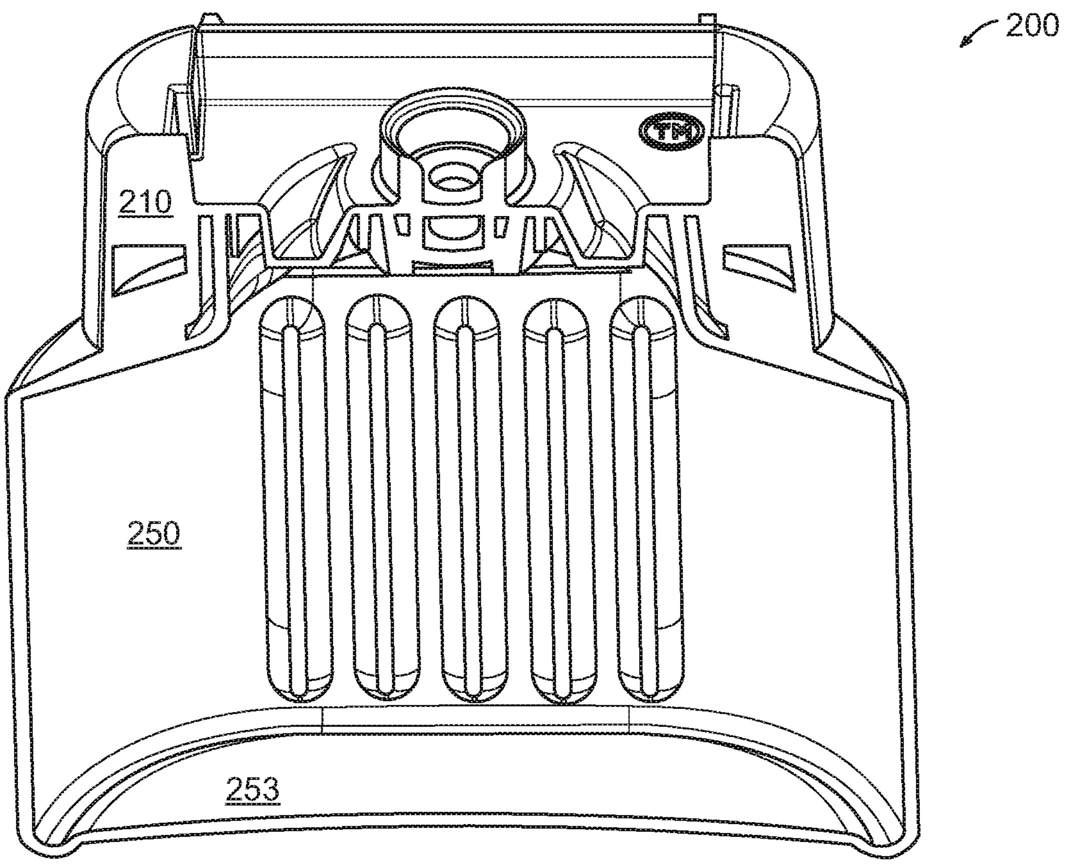
FIG. 8A is a cross-sectional view of the ingredient container of FIG. 7.

A space around the carriage inlet 134 and the carriage outlet 136 can be recessed into the central region 132, thereby defining the overall form of both the carriage inlet 134 and the carriage outlet 136. In the illustrated embodiment, this space, also called the central recess 137, takes the form of a substantially "figure-8" shape, with the inlet and outlet receivers 134, 136 being positioned within each opening of the "figure-8." The central region 132 can also include one or more flanking protrusions 138 disposed proximate to the central recess 137. The flanking protrusions 138 can be informed by the shape of other features found in the carriage face 130, or they can have independent designs. In the illustrated embodiment, the flanking protrusions 138 are shaped to extend into complimentary recesses on an ingredient container to assist in the retention thereof. As shown in FIGS. 5A and 5B, the carriage face 130 includes a pair of similar flanking protrusions 138, which take the form of "bat wings" that follow the "figure-8" contour of the central recess 137. In particular, the illustrated flanking protrusions 138 have an outer sidewall that is convexly curved along its length and two inner sidewalls that are each convexly curved to follow the contours of the inlet and outlet receivers 134, 136. The sidewalls of the flanking protrusions 138 can taper in a direction leading away from the carriage face 130, as shown, such that the tip portion is generally smaller in size than the base portion of each protrusion 138. In other embodiments, the protrusions 138 may not flare at all.

The peripheral channel 133 can further include one or more features to assist in the retention of an ingredient container. As will be discussed in more detail below, each peripheral channel 133 can have a shape configured to complement a shape of the container such that two shoulders on the container, as well as other portions of the container, can be received therein. In the illustrated embodiment, the peripheral channel 133 includes two generally rounded triangular areas and an elongated slot extending therebetween. The channel 133 is defined by the shape of the center region 132, which is generally square with rounded corners, in combination with the shape of the generally triangular recess in the carriage face 130. The peripheral channel 133 can also include one or more retainers 139 protruding from a sidewall of the center region 132 outward into the peripheral channel 133. The retainers 139 can be spring-biased outward, such that during a retention process the retainers 139 can be forced inward by the container before springing back outward to engage a corresponding recess in the ingredient container. The retention process will be described in greater detail below.

FIG. 5B illustrates the relative heights of the carriage 120, including the carriage inlet 134, the carriage outlet 136, and the flanking protrusions 138. As shown, the carriage outlet 136 has a height that is greater than a height of the carriage inlet 134. The retainers 139 can be seen located within the peripheral channel 133, which is set below the elevated center region 132. While the carriage face 130 is described and shown as having certain areas recessed and other areas protruding, carriage faces with the opposite features are contemplated herein as well, i.e., all protrusions are recesses and all recesses are protrusions. Further, carriage faces are also contemplated that may have only a portion of the features interchanged, such that only one or a few protrusions are recesses and/or only one or a few recesses are protrusions. Other shapes and configurations are also contemplated.

FIG. 6 depicts an underside of the carriage 120, according to some embodiments. The underside of the carriage 120 is positioned on the opposite side of the carriage inlet 134 and the carriage outlet 136, and it includes central holes 134A, 136A, which, as introduced above, can pass through the carriage 120. In operation, the central hole 134A of the carriage outlet 136 can be coupled to a gas line 140. The gas line 140 can be coupled at an opposite end to an air pump (not shown), which can be used to introduce air or another gas into a seated ingredient container. The resulting increase in pressure can cause the seated ingredient container to dispense a stored additive through the central hole 136A of the carriage outlet 136. In systems with more than one carriage, one or more pumps can be used to introduce gas to a seated ingredient container. In some variations, each carriage can have its own pump fluidly coupled thereto via a gas line or similar setup. In other embodiments, the gas line 140 can be coupled to the carbonation source, which can be used to supply gas to the container for ejecting additive.

FIGS. 7-16 illustrate an exemplary embodiment of an ingredient container 200. The ingredient container 200 can generally include a lid 210 coupled to a container body 250 which can be configured to contain an additive (e.g., a flavorant, a supplement, a vitamin, a coloring agent, etc.) to be used in the creation of beverages. The additive can be in the form of a fluid, a solid, a powder, a gel, a syrup, or any other form. The ingredient container 200 can come in a variety of sizes. For example, the ingredient container 200 can have an overall height between about 55 mm and 60 mm, and in some embodiments can be about 56.9 mm. The ingredient container 200 can have a maximum width between about 55 mm and 65 mm, and in some embodiments, the maximum width can be about 59.5 mm. The lid 210 can have a depth between about 38 mm and 42 mm, and in some embodiments can be about 39.6 mm. The container body 250 can have a depth between about 38 mm and 42 mm, and in some embodiments can be about 39.5 mm. For example, the ingredient container 200 can have a volume between about 50-90 mL, and in some variations can have a volume of about 70 mL.

The ingredient container 200 can store the additive inside, and, as part of a beverage creation process, receive a measured volume of gas (e.g., air, carbon-dioxide, etc.) through an inlet 224 resulting in an increased internal pressure. The increase in internal pressure within the container 200 can result in an outlet 226 emitting a tailored amount of the additive as a consequence of eliminating or reducing the newly-created pressure differential across the outlet.

Figure 10A:
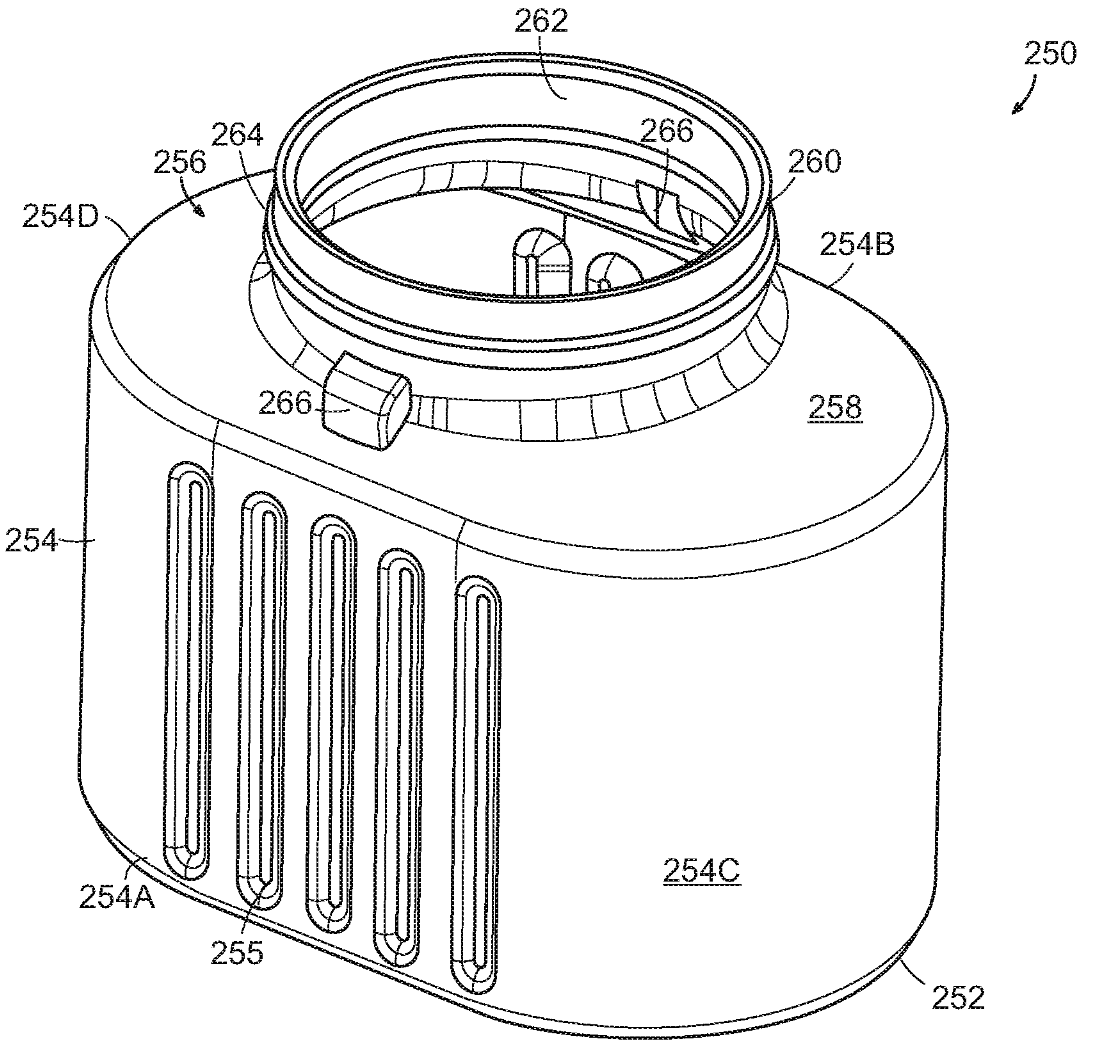
FIG. 10A is a perspective view off a container body of the ingredient container of FIG. 7.
Figure 10B:
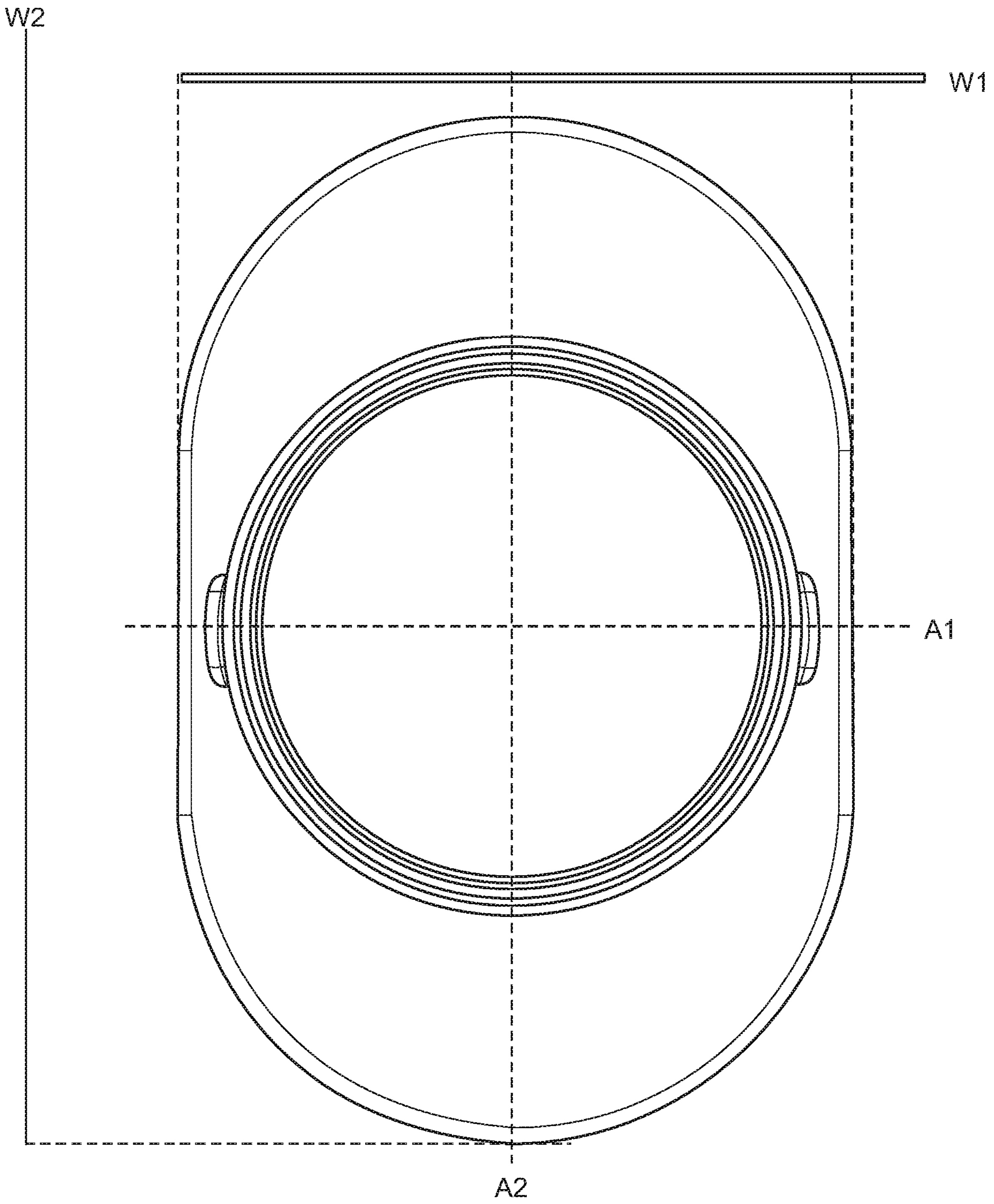
FIG. 10B is a top view of the container body of FIG. 10A.

The illustrated container body 250 has a generally oblong, ovular form similar to a race-track configuration, as seen in FIGS. 10A and 10B. While the container body 250 is shown as having a specific form, the container body 250 can take on a variety of forms. This oblong ovular form can include a minor width W1 about a shorter dimension of the container body 250 and a major width W2 about a longer dimension of the container body 250. Similarly, the oblong, ovular form can have a minor axis A1 extending centrally along the minor width W1, and the oblong, ovular form can have a major axis A2 extending centrally along the major width W2. As will be discussed in more detail below, the shape of the container body can aid in allowing multiple containers to be positioned closer to one another within the beverage system, thus allowing the outlets 226 to be positioned closer for dispensing an additive.

Figure 8B:
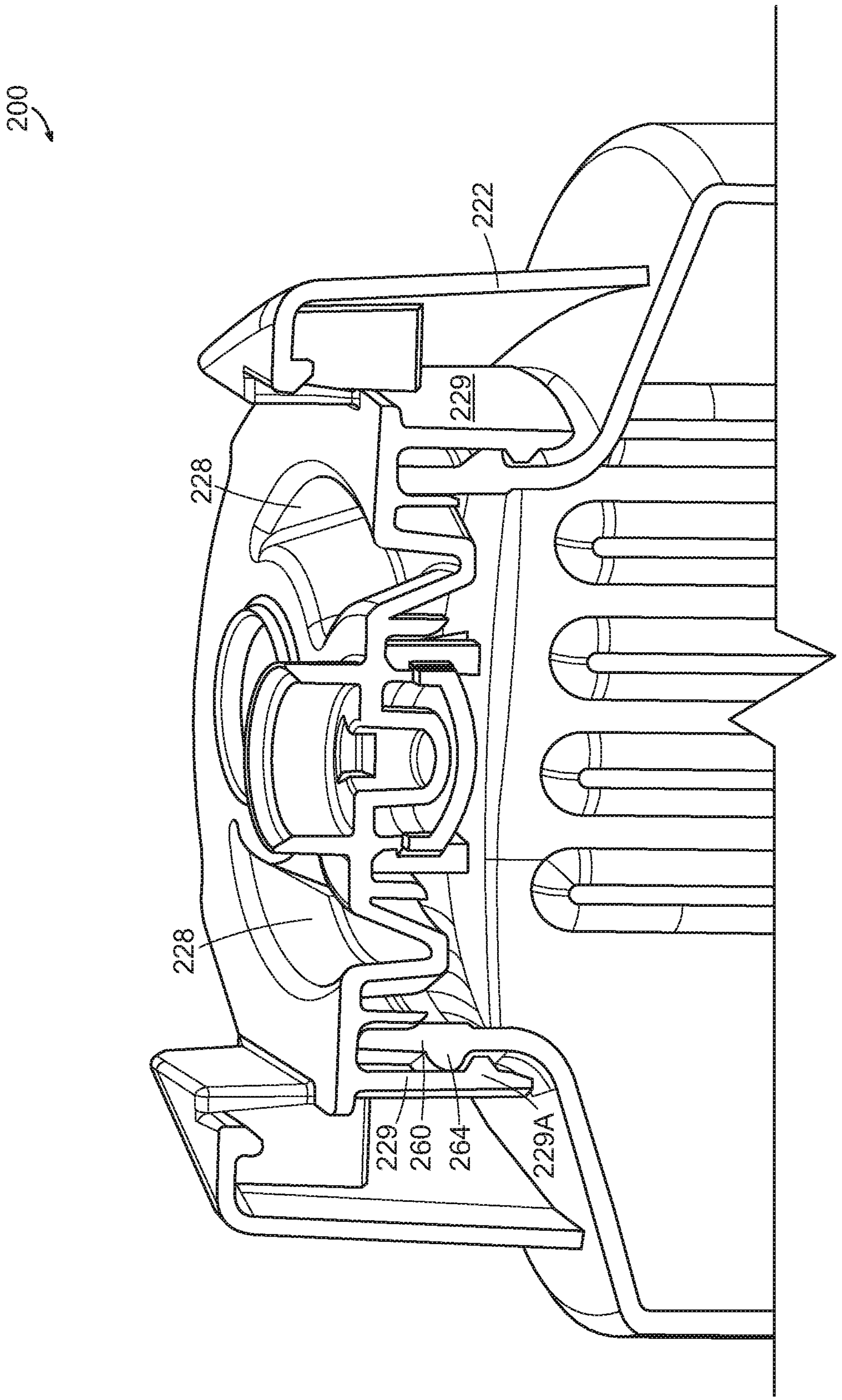
FIG. 8B is a partial cross-sectional view of the ingredient container of FIG. 7.

The container body 250 can include a base 252, a sidewall 254 extending upwardly from the base 252, and a top 256, which together can define an interior space to store the additive. In some embodiments, the base 252 can include an ovular recess 253 as shown in FIG. 8B. The ovular recess 253 can provide increased structural integrity to the container body 250 during storage, transit, operations, etc., and it can also provide an area for increased engagement, such as by a user and/or by a beverage dispensing device (e.g., beverage dispensing system 10).

The sidewall 254 can extend upward from the base 252 to maintain a substantially constant cross-section. The sidewall 254 can include first and second side faces 254A, 254B, which can be substantially planar, and first and second convexly curved faces 254C, 254D extending between the first and second side faces 254A, 254B. A series of channels 255 can run vertically on the first and second side faces 254A, 254B, substantially parallel to each other. The channels 255 can operate similarly to the ovular recess 253, in that they may provide for increased structural integrity, and/or they may provide an area of increased engagement between the container body 250 and a beverage dispensing device (e.g., beverage dispensing system 10). They can also aid in gripping the container. In certain embodiments, a carriage assembly (e.g., carriage assembly 100) can have complimentary components to be received by the channels 255 in order to aid in retention of the ingredient container 200.

The top 256 sits upon the sidewall 254, and it can include a shoulder 258 and a neck 260. The shoulder 258 can have a gradual slope upward toward the neck 260, which can be centrally disposed on the top 256 and can be a round, substantially vertical portion of the container body 250. The neck 260 can define the opening 262 leading to the interior of the container body 250. A circumferential flange 264 can extend around the neck 260 and can provide a coupling point for the lid 210, such as with a snap-fit. In some embodiments, the circumferential flange 264 can be replaced by threads to provide threaded connection with the lid 210. A pair of orientation protrusions 266 can be disposed on opposite sides of the neck 260. These protrusions 266 can vary in shape or number, and they can function to align with complimentary features on the lid 210 to ensure that the lid 210 is properly oriented on the container body 250.

FIGS. 11A-16 depict the lid 210 and elements thereof, separated from the container body 250. The illustrated lid 210 has a substantially rounded triangular shape and includes a lid base 220 and a lid cover 240 coupled to the lid base 220. The lid cover 240 can be used to close the inlet and outlet, and in turn the container body 250. The triangular shape can be defined by a perimeter having first, second, and third sides, with the first side being longer than each of the second and third sides.

The lid base 220 can include a skirt 222 located at a lower perimeter thereof and having a curved shaped to conform with the shoulder 258 of the container body 250. The skirt 222 can include a front recess 223, which can be shaped to allow a portion of the lid cover 240 to extend outward beyond the skirt 222 when the lid 210 is in the closed position to enable grasping of the lid cover 240 to ease opening and closing of the lid cover 240 relative to the lid base 220. The lid base 220 can include an inlet 224 and an outlet 226, which lead respectively to and from the interior of the container body 250. The inlet 224 can include an inlet collar 224A flanking an inlet orifice 224B, while the outlet 226 can include an outlet collar 224A flanking an outlet orifice 224B. In the illustrated embodiment, the inlet collar 224 has a height that is greater than a height of the outlet collar 226. The greater height of the inlet collar 224 can aid in allowing a seal to be formed between the container inlet 224 and the outlet 136 on the carriage 120.

Figure 11A:
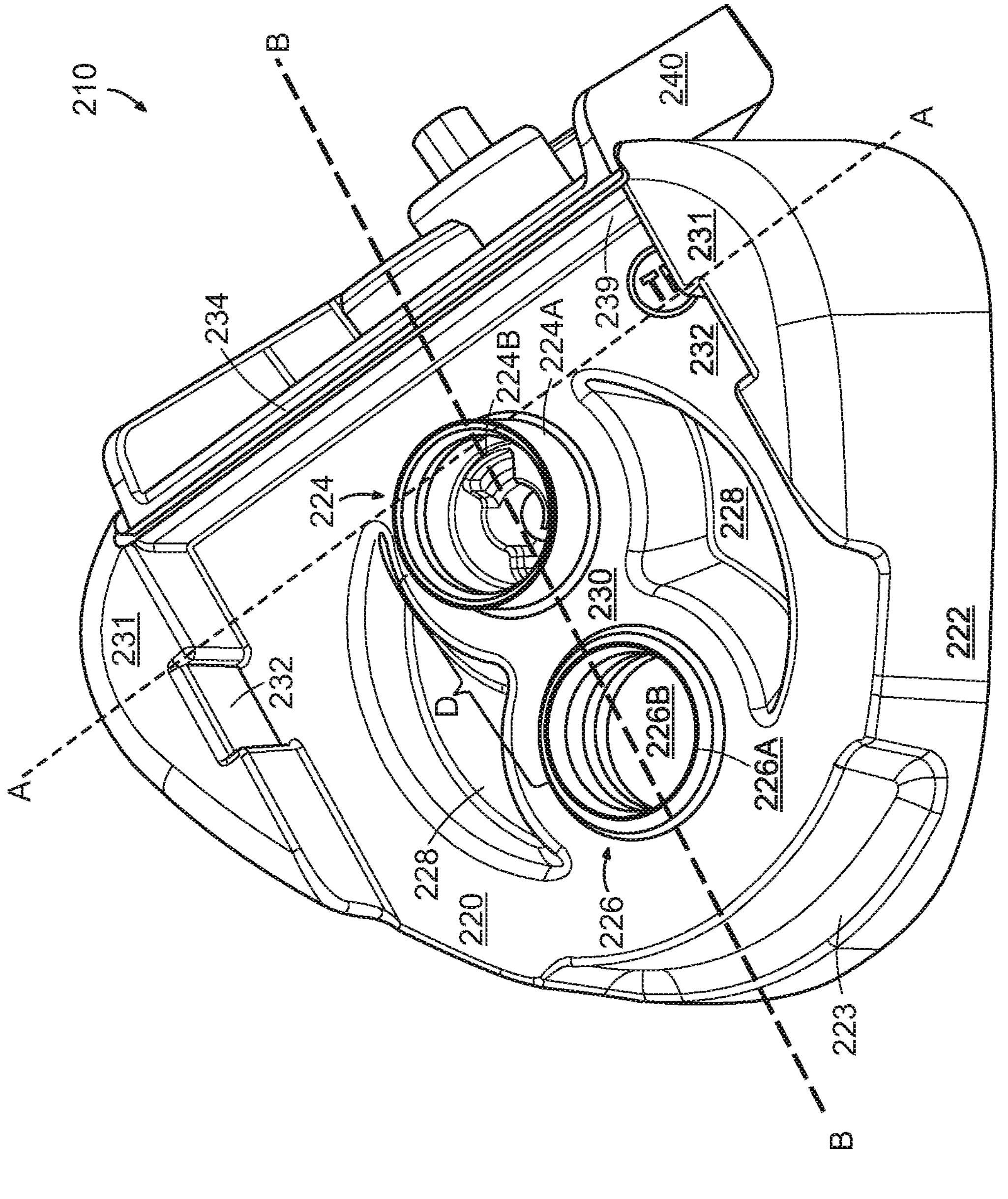
FIG. 11A is a perspective view of a lid of the ingredient container of FIG. 7.

The container inlet 224 and the outlet 226 can be positioned on the lid base 220 in line with a minor axis B-B of the lid 210 extending along a plane defined by an upper face of the lid base 220, as shown in FIG. 11A. When the lid 210 is coupled to the container body 250, the minor axis B-B can extend parallel to the minor axis A1 of the container body 250, and therefore can extend perpendicular to the major axis A2. In some variations, the entire lid 210 can be substantially symmetrically mirrored about the minor axis B-B. The lid 210 can also have a major axis A-A, as seen at least in FIGS. 11A-11B, which can extend perpendicular to the minor axis B-B.

Figure 11B:
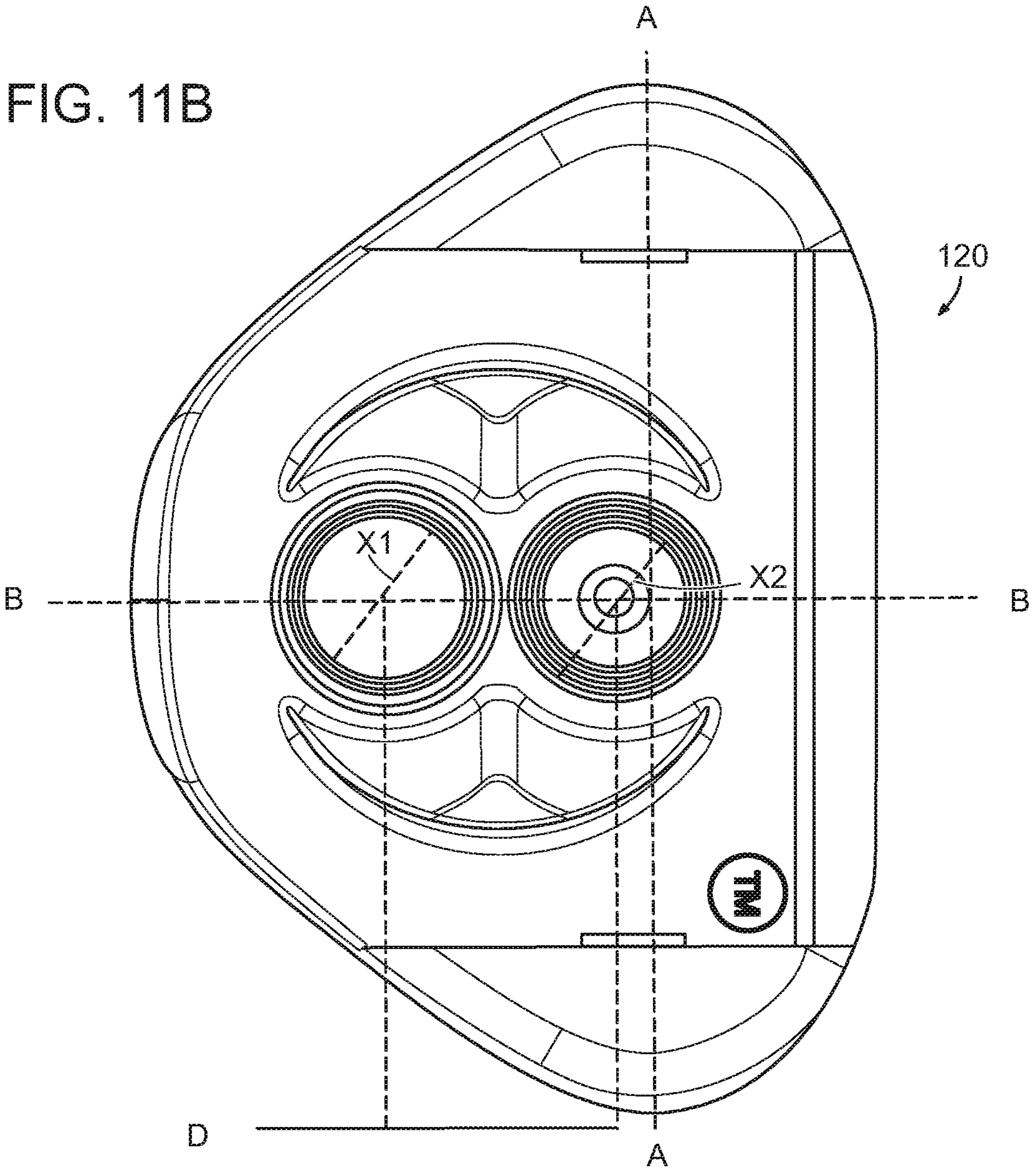
FIG. 11B is a top view of the lid of FIG. 11A.

As shown in FIG. 11B, the inlet 224 and outlet 226 can each have a central longitudinal axis (also called a central axis) with a distance D there between. The central longitudinal axis of each of the inlet 224 and the outlet 226 is coming out of the page in FIG. 11B, but it is shown from a side view in FIG. 21. The distance D between each central longitudinal axis can vary. In certain embodiments, the distance D can depend at least partially on the overall dimensions of the lid 210 and/or the sizes of the valves, as discussed further below. For example, in some embodiments, the distance D between the central axes can be between about 9 mm and 15 mm, and more preferably between about 11 mm and 13 mm, and in certain exemplary embodiments the distance D can be about 13 mm.

As further shown in FIG. 11B, the inlet 224 can have a diameter X1, and the outlet 226 can have a diameter X2. The inlet diameter X1 can be between about 6.6 mm and 7.2 mm, and in some embodiments can be about 6.90 mm. The outlet diameter X2 can be between about 6.5 mm and 7.1 mm, and in some embodiments can be about 6.84 mm.

Recesses 228 can flank each side of the inlet 224 and the outlet 226, and the recesses 228 can each be shaped to correspond to protrusions in a carriage (e.g., flanking protrusions 138 on carriage 120). For example, the recesses 228 can be shaped to follow an outer contour of the collars 224A, 226A and can take a "bat wing" form. In particular, similar to the flanking protrusions 138, the recesses 228 can have a radially outward sidewall that is concavely curved along its length and two inner sidewalls that are concavely curved to follow the contours of the inlet and outlet 224, 266. The recesses 228 can take on various other forms as well, and their form may be at least partially dependent upon the placement and form of other components on the lid 210. The recesses 228 can be placed a slight distance apart from the inlet 224 and the outlet 226, thus defining a central pattern 230 located in the space between the collars 224A, 226A and the recesses 228. As best seen in FIG. 11A, the central pattern 230 can take the form of a "figure-8," however other forms may be present. The illustrated central pattern 230 is shown being flush with the upper surface of the base 220, however the central pattern 230 can protrude above the upper surface or can be recessed below the upper surface. The central pattern 230 can be a protrusion, a recession, or a combination thereof with a portion of the central pattern 230 protruding from the lid 210 and a portion of the central pattern 230 receding into the lid 210. In some variations, the inlet and outlet collars 224A, 226A can contribute to the central pattern 230.

As explained previously with respect to the carriage face 130, although the lid base 220 is described and shown as having certain areas recessed and other areas protruding, lid bases with the opposite features are contemplated herein as well, i.e., all protrusions are recesses and all recesses are protrusions. Further, lid bases are also contemplated that may have only a portion of the features interchanged, such that only one or a few protrusions are recesses and/or only one or a few recesses are protrusions.

The lid base 220 can further include a pair of shoulders 231 formed on opposed sides of the skirt 222 and that extend upward from the lid base 220. Each shoulder 231 can have a shape, such as a rounded triangular shape, that complements a shape of the peripheral channel 133. Each shoulder 231 can also include one or more retention features, which can further assist in retention of the ingredient container 200 within the carriage 120. These features can be in the form of receivers 232 which can receive a complimentary element of the carriage 120, as will be described in more detail below. In the illustrated embodiment, the receivers 232 are each in the form of a substantially square or rectangular recess or cut-out formed in an inward facing sidewall of each shoulder 231.

As further shown, a rear portion of the lid base 220 can include a rear wall 233 which can extend between the shoulders 231. The lid cover 240 can be coupled to the rear wall 233, as will be discussed in more detail below.

Figure 9:
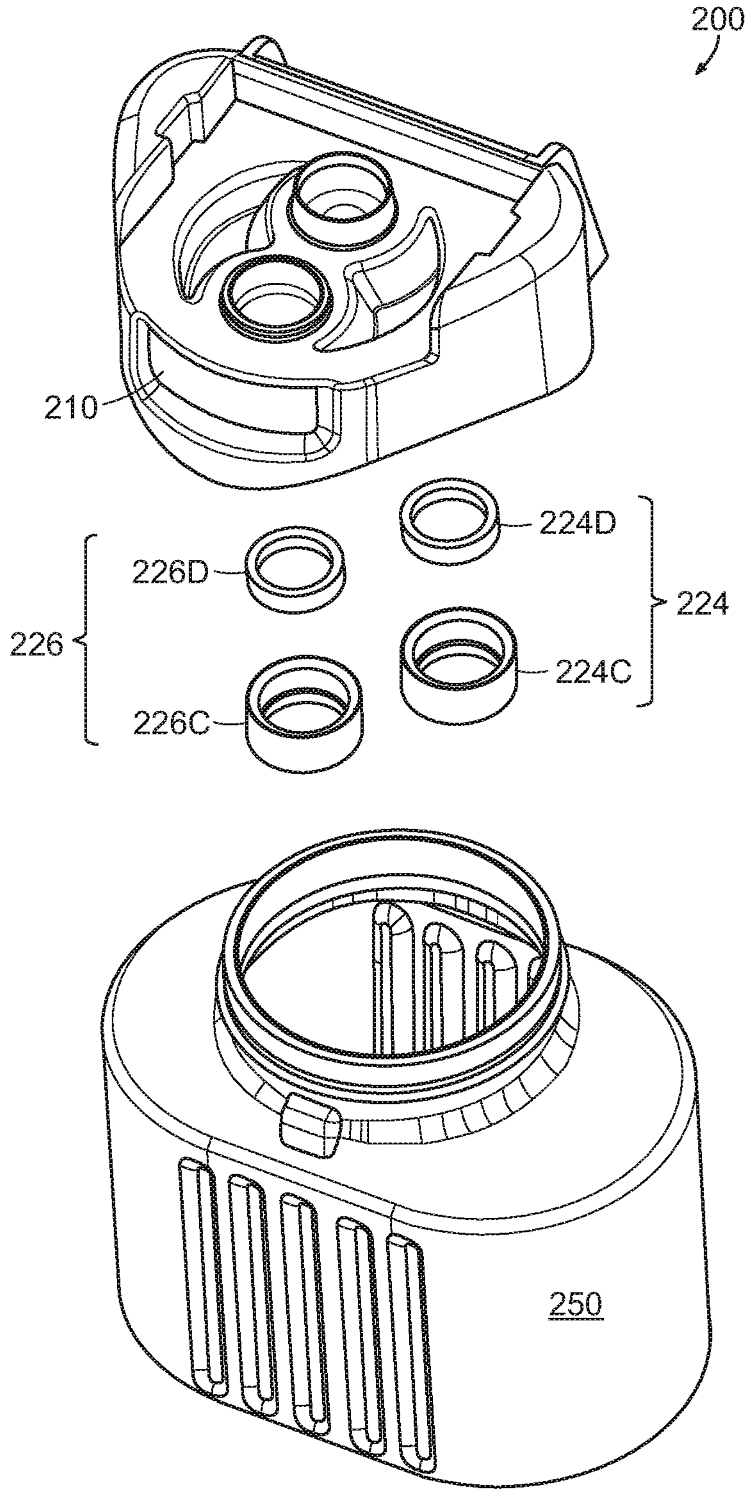
FIG. 9 is an exploded view of the ingredient container of FIG. 7.

Referring again to the inlet 224 and the outlet 226, as previously explained the inlet 224 can include an upwardly extending inlet collar 224A flanking an inlet orifice 224B, and the outlet 226 can include an upwardly extending outlet collar 226A flanking an outlet orifice 226B. Although the inlet collar 224A and the outlet collar 226A are shown in a circular form, the inlet and outlet collars 224A, 226A can take on a number of shapes, including various geometric shapes, e.g., a triangle, a star, etc., as well as fanciful and/or irregular shapes, e.g., a letter, a logo, etc. The form of the inlet and outlet collars 224A, 226A can be the same or different. As shown in FIG. 9, the inlet 224 can include an inlet valve frame 224C and an inlet valve 224D, and the outlet 226 can include an outlet valve frame 226C and an outlet valve 226D. Generally, each of the inlet valve 224D and the outlet valve 224D can be respectively seated within the inlet valve frame 226C and the outlet valve frame 226C. The inlet valve frame 224C and the outlet valve frame 226C can be affixed to the underside of the lid 210 beneath the inlet 224 and the outlet 226 respectively. In other embodiments, the inlet valve frame 224C and the outlet valve frame 226C can be formed from a single frame component.

Figure 12A:
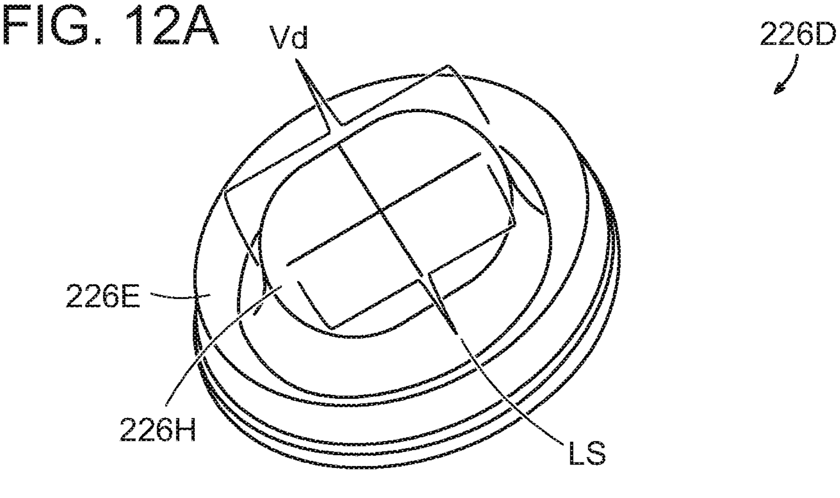
FIG. 12A is a perspective view of an outlet valve of the ingredient container of FIG. 7.

FIG. 12A depicts one embodiment of an outlet valve 226D in more detail. While description is made with respect to the outlet valve 226D, similar features are applicable to the inlet valve 224D. Additionally, where options are provided for aspects of the outlet valve 226D, actual aspects may not always be the same between the inlet valve 224D and the outlet valve 226D. The illustrated outlet valve 226D is configured to open to dispense an additive therefrom during a beverage dispensing process. While the outlet valve 226D is depicted as being round or substantially circular, the outlet valve 226D can vary in form to have any number of regular or irregular shapes. In general, the outlet valve 226D can include a flange 226E configured to hold an outlet valve head 226F within the outlet valve frame 226C. The flange 226E can be connected to the outlet valve head 226F via a roll sleeve 226G. The outlet valve 226D can also vary in size, and the size can depend at least in part on the diameter of the outlet 226 itself. For example, the outlet valve diameter Vd of the outlet valve 226D on the container body 250, i.e., not including the flange 226E, can be between about 8 mm to 12 mm. In some embodiments, the outlet valve diameter Vd can be between about 9 mm and 10 mm. The outlet valve 226D can be in the form of a slit valve having a slit 226H configured to open and allow for the transfer of a material, such as a fluid, therethrough. The slit 226H can have a variety of forms and sizes. For example, as shown in FIG. 12A, the slit 226H has a cross or X shape. The slit 226H can vary in size, but in an exemplary embodiment it can have a slit length Ls between about 1.5 mm and 5.5 mm. Note the slit length as used herein refers to the length of the longest slit where two or more slits are provided. In some embodiments, the slit length Ls can be between about 1.5 mm and 2 mm, and the outlet valve 226D can open at the cross-shaped slit 226H when subjected to enough pressure, either internally or externally. An opening pressure Po (also called a cracking pressure) of the outlet valve 226D can vary, and can be dependent upon the material, size, or other details of the outlet valve 226D. For example, in some embodiments, the opening pressure Po can be about 300 $mmH_2O$ or greater, and more preferably about 600 $mmH_2O$ or greater. A closing pressure Pc of the outlet valve 226D can vary as well, and can be dependent upon various details of the outlet valve 226D. In some embodiments, the closing pressure Pc can be about 400 $mmH_2O$ or less. In other embodiments, the closing pressure Pc can be about 300 to 400 $mmH_2O$ less than the cracking pressure.

Figure 12B:
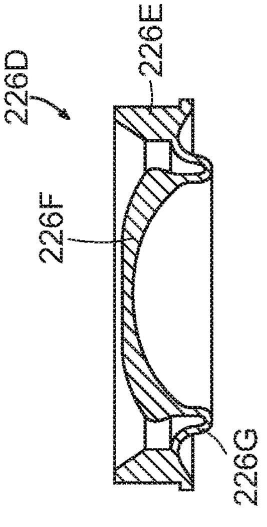
FIG. 12B is a cross-sectional view of the outlet valve of FIG. 12A during a dispensing process.
Figure 12C:
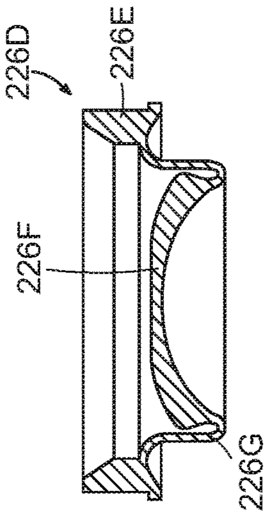
FIG. 12C is a cross-sectional view of the outlet valve of FIG. 12A during a dispensing process.
Figure 12D:
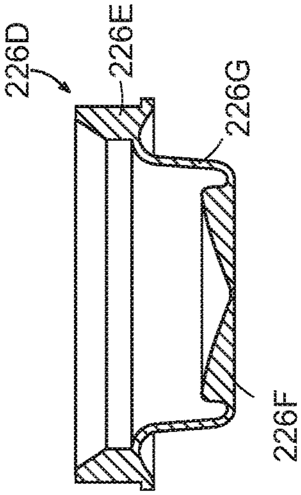
FIG. 12D is a cross-sectional view of the outlet valve of FIG. 12A during a dispensing process.
Figure 12E:
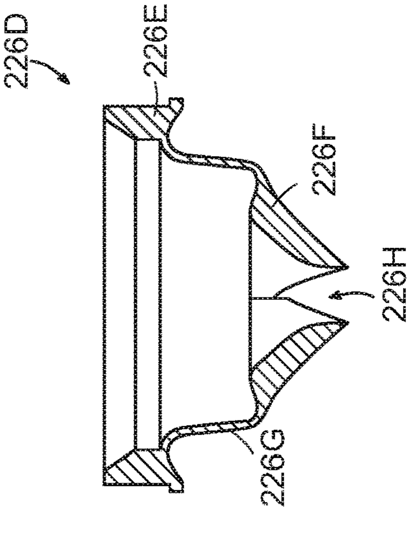
FIG. 12E is a cross-sectional view of the outlet valve of FIG. 12A during a dispensing process.
Figure 12F:
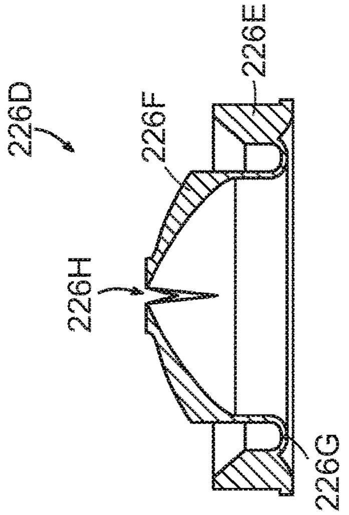
FIG. 12F is a cross-sectional view of the outlet valve of FIG. 12A during a dispensing process.

When the outlet valve 226D is subjected to a high enough pressure differential, such as in the build-up to attaining the opening pressure Po and then subsequent achievement of the opening pressure Po, the valve 226D can undergo a several-step transformation process before opening at the slit 226H. This transformation process is illustrated in FIGS. 12B-12F. In FIG. 12B, the outlet valve head 226F begins to move downward, subject to some pressure, rolling about the outlet valve sleeve 226G. In FIG. 12C, the outlet valve sleeve 226G is fully unrolled. In FIG. 12D, the outlet valve head 226F begins to flatten, and then at FIG. 12E, the opening pressure Po is achieved, forcing the slit 226H open and dispensing an additive. When the slit opens, the pressure differential across the valve 226D quickly dissipates, and the valve head 226F can return to its typical position. As a result of this return, in some configurations, the slit 226H can open inwardly, as shown in FIG. 12F, before finally reaching a rest state and returning to the position depicted in FIG. 12A. In other configurations, an internal pressure on the outlet valve 226D can cause the outlet valve 226D, after opening, to return to the state depicted in FIG. 12B, and the outlet valve 226D may never fully return to the state shown in FIG. 12A.

In some embodiments, the inlet valve 224D can be positioned in the same orientation as the outlet valve 226D. In these embodiments, fluid flows through the inlet valve 224D in the opposite direction as the fluid flowing through the outlet valve 226D, i.e., fluid flows into the ingredient container 200 through the inlet valve 224D but flows out of the ingredient container 200 through the outlet valve 226D, all while the inlet and the outlet valves 224D, 226D are positioned in the exact same orientation. As a result, in these embodiments, the inlet valve 224D does not undergo the same series of steps shown in FIGS. 12A-12F when fluid flows therethrough. Instead, the inlet valve begins in the state shown in FIG. 12A and when subjected to pressure great enough to open the inlet valve 224D, the inlet valve 224D merely opens in a manner similar to the state shown in FIG. 12F, but facing the direction shown in FIG. 12A, thus allowing fluid to flow through the opening. Because fluid is flowing through the inlet valve 224D in a direction that is opposite a direction of fluid flowing through the outlet valve 226D, the inlet valve 224D does not undergo the series of steps involving rolling to an expanded state and then opening, as depicted in FIGS. 12B-12E.

Figure 13:
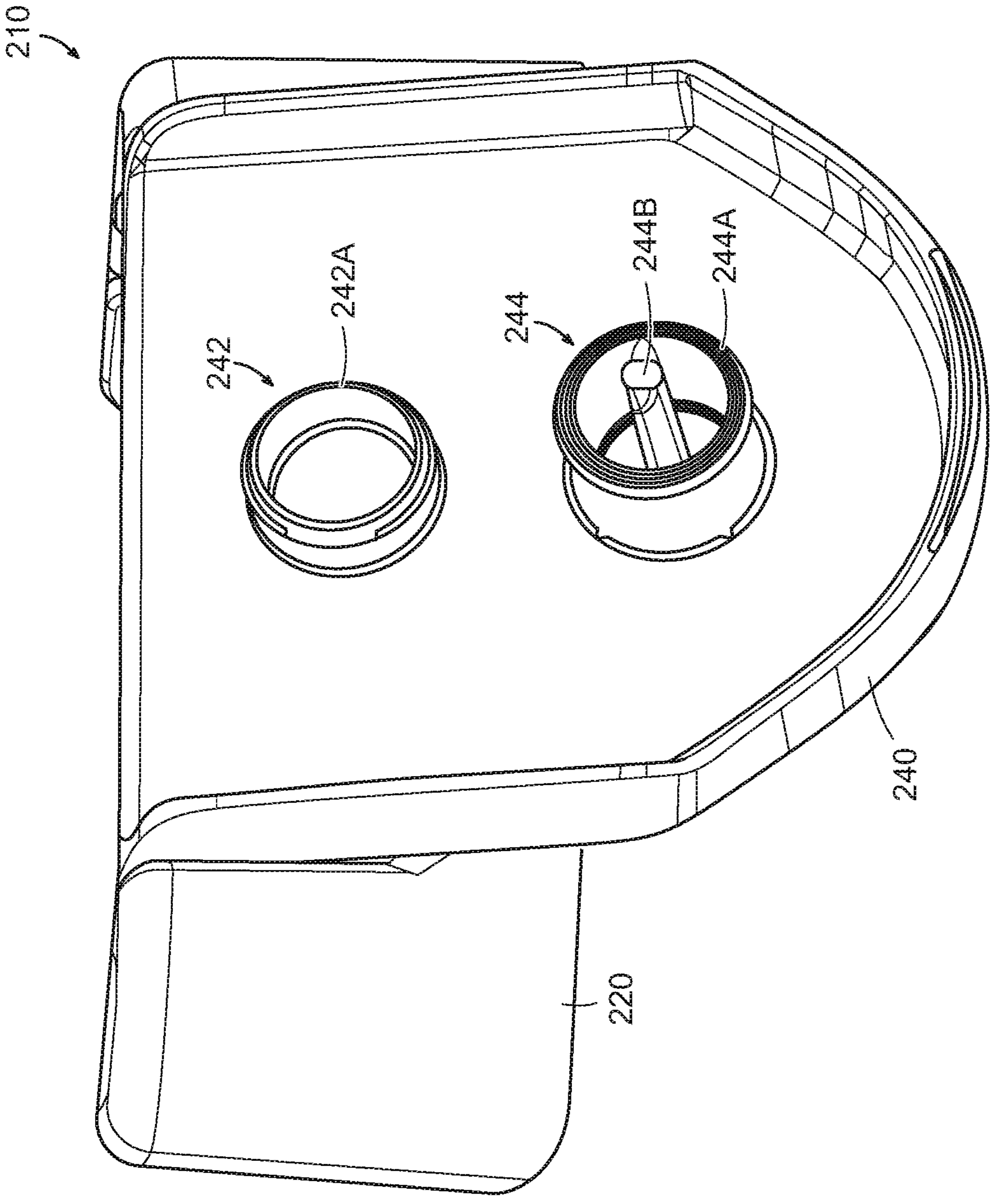
FIG. 13 is a rear perspective view of the lid of FIG. 11A.
Figure 14:
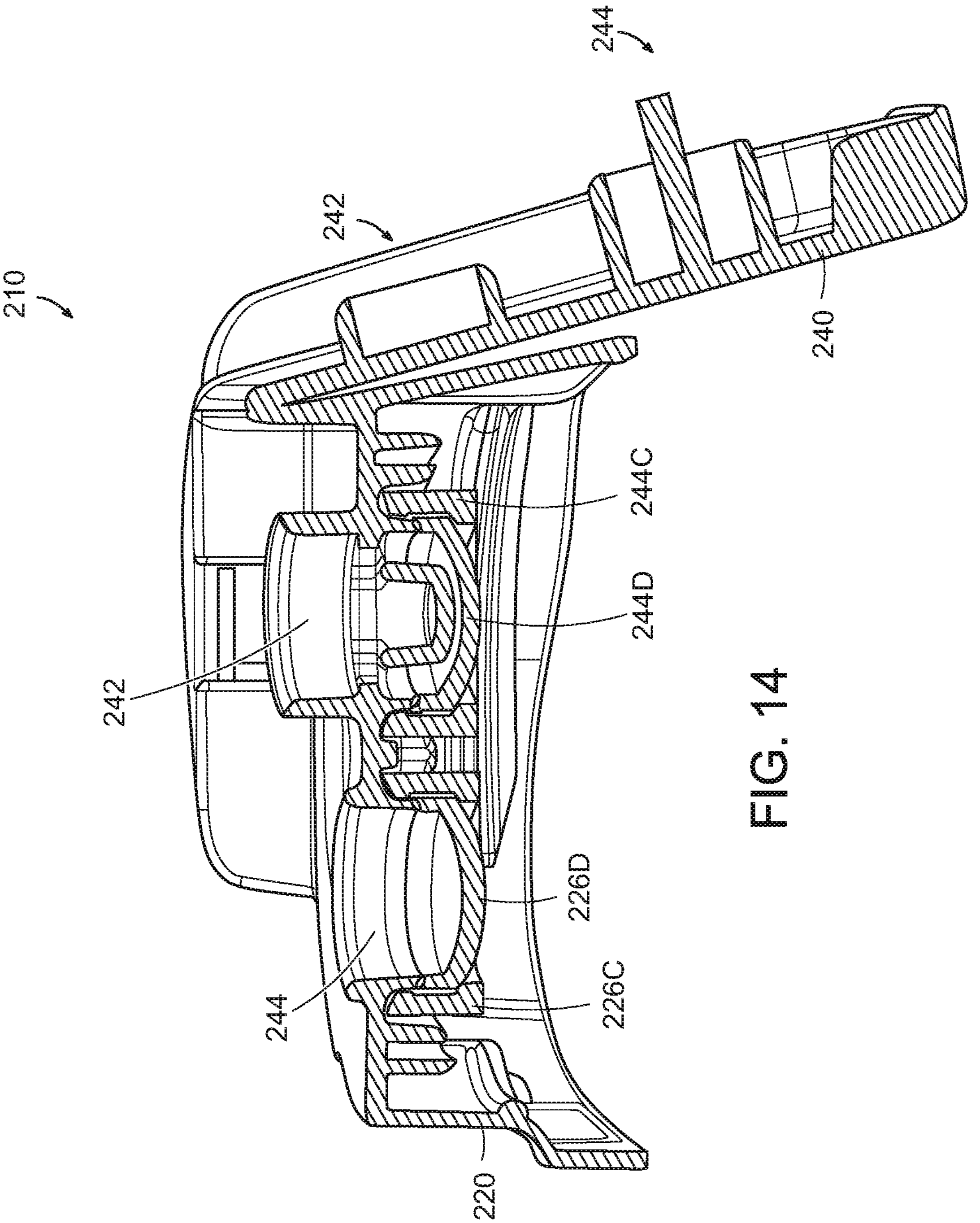
FIG. 14 is a perspective cross-sectional view of the lid of FIG. 11A.

As previously indicated, the lid 210 can also include a lid cover 240, shown in FIGS. 11 and 13, which can be connected to the rear wall 233 by various means, including by a hinge 234 (e.g., a living hinge). The lid cover 240 can include an inlet cover 242 and an outlet cover 244, which are sized to respectively close the inlet 224 and the outlet 226 on the lid base 220. Each of the inlet cover 242 and the outlet cover 244 can include respective inlet and outlet cover collars 242A, 244A that are sized to be internally received by the inlet collar 224B and the outlet collar 226B, as seen in the cross-section of FIG. 14. The outlet cover 244 can also include a central plug 244B that is sized to be internally received by the outlet 226 itself. The central plug 244B can operate to prevent premature opening of the outlet valve 226A. The central plug 244B can protrude out from the lid cover 240 beyond the protrusion distance of the outlet cover collar 244A in order to facilitate closure of the outlet 242 when the lid cover 240 is in the closed position.

Figure 15:
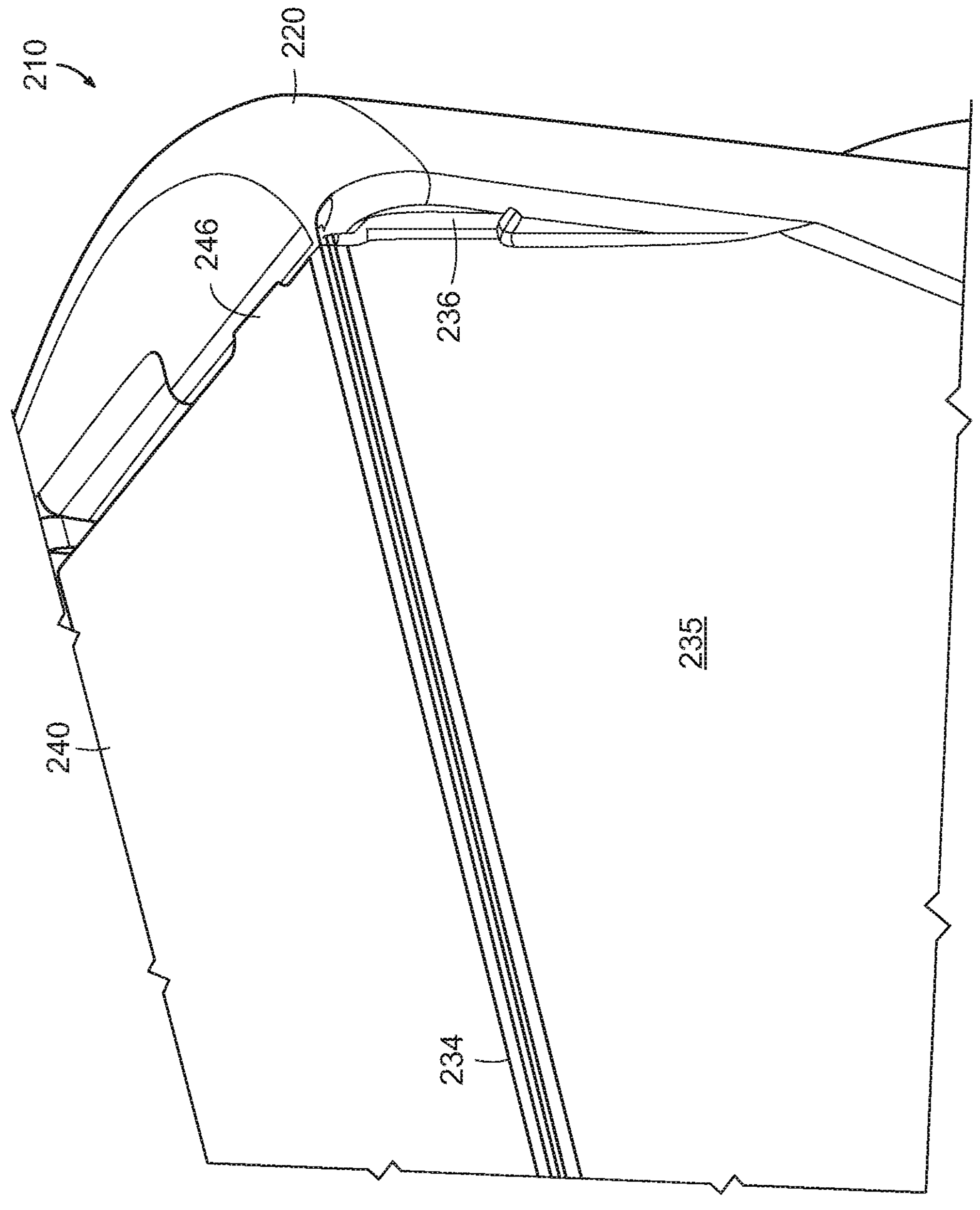
FIG. 15 is a partial perspective rear view of the lid of FIG. 11A having a lid cover in a closed position.

In some embodiments, the lid can include features to hold the cover 240 in an open position. For example, as shown in FIG. 15, the lid base 220 can include a back side 235 having a substantially flat central face 236 with a width that is substantially equal to a width of the lid cover 240. One or more lid cover retention features 236 can be located at an upper end of the back side 235 near the hinge 234. These features 236, which can be in the form of cut-outs or recesses, can secure the lid cover 240 when the lid cover 240 is in an open position. As shown, the lid cover 240 can include cover tabs 246 extending from at least one side of the lid cover 240. The cover tabs 246 can extend into the cover retention features 236 to assist in retention of the lid cover 240 in the open position. In the closed position, the inlet and outlet cover collars 242A, 244A, as explained previously, can extend into and frictionally engage the inlet 224 and the outlet 226. This frictional engagement can assist in retention of the lid cover 240 in the closed position. Additionally, the inlet and outlet cover collars 242A can prevent the inlet and outlet valves 224D, 226D from opening prematurely, such as during transportation. For example, the outlet valve 226D can be prevented from rolling about the roll sleeve 226G as illustrated in FIGS. 12B-12D.

Figure 16:
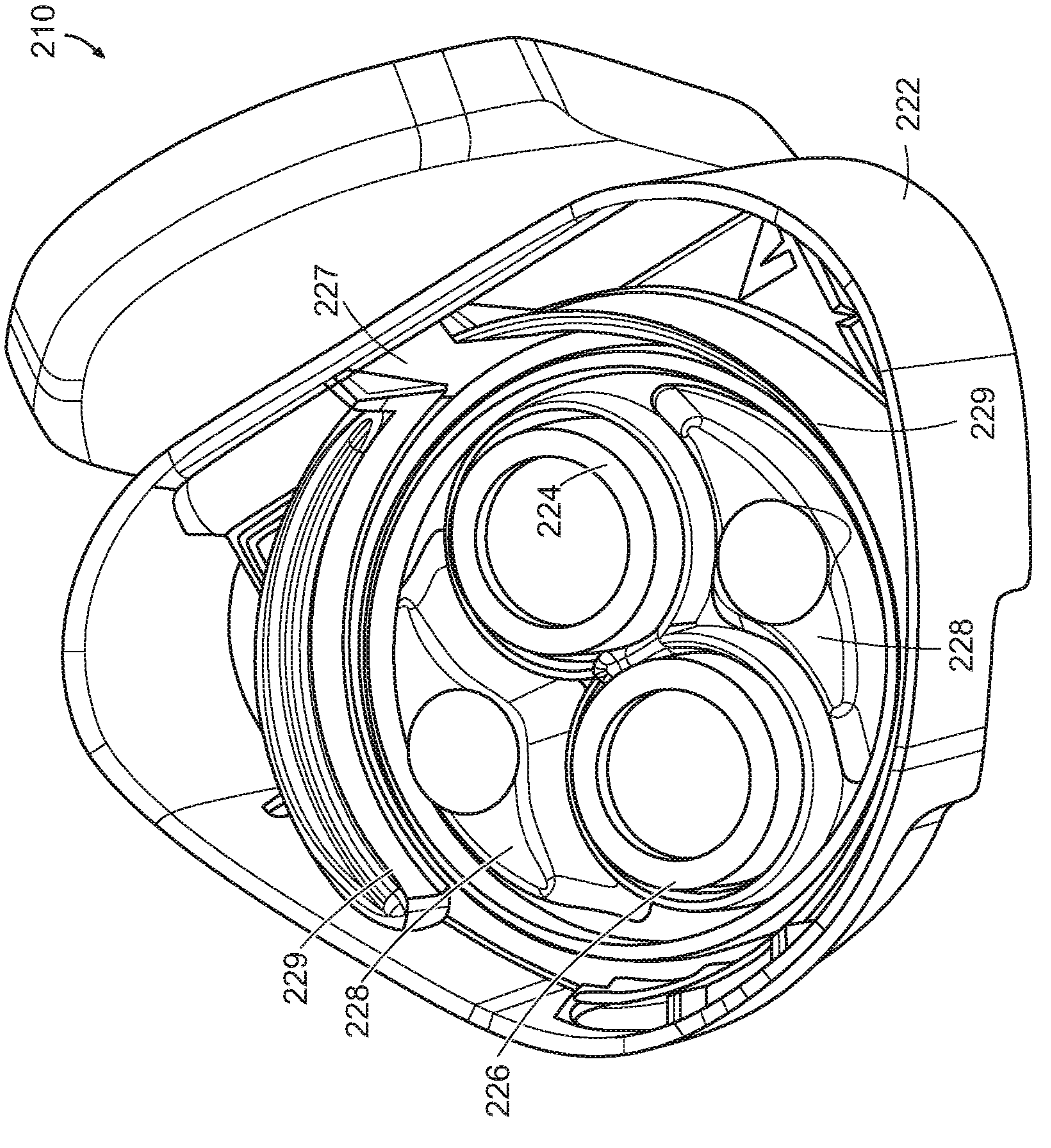
FIG. 16 is a perspective bottom view of the lid of FIG. 11A.
Figure 17:
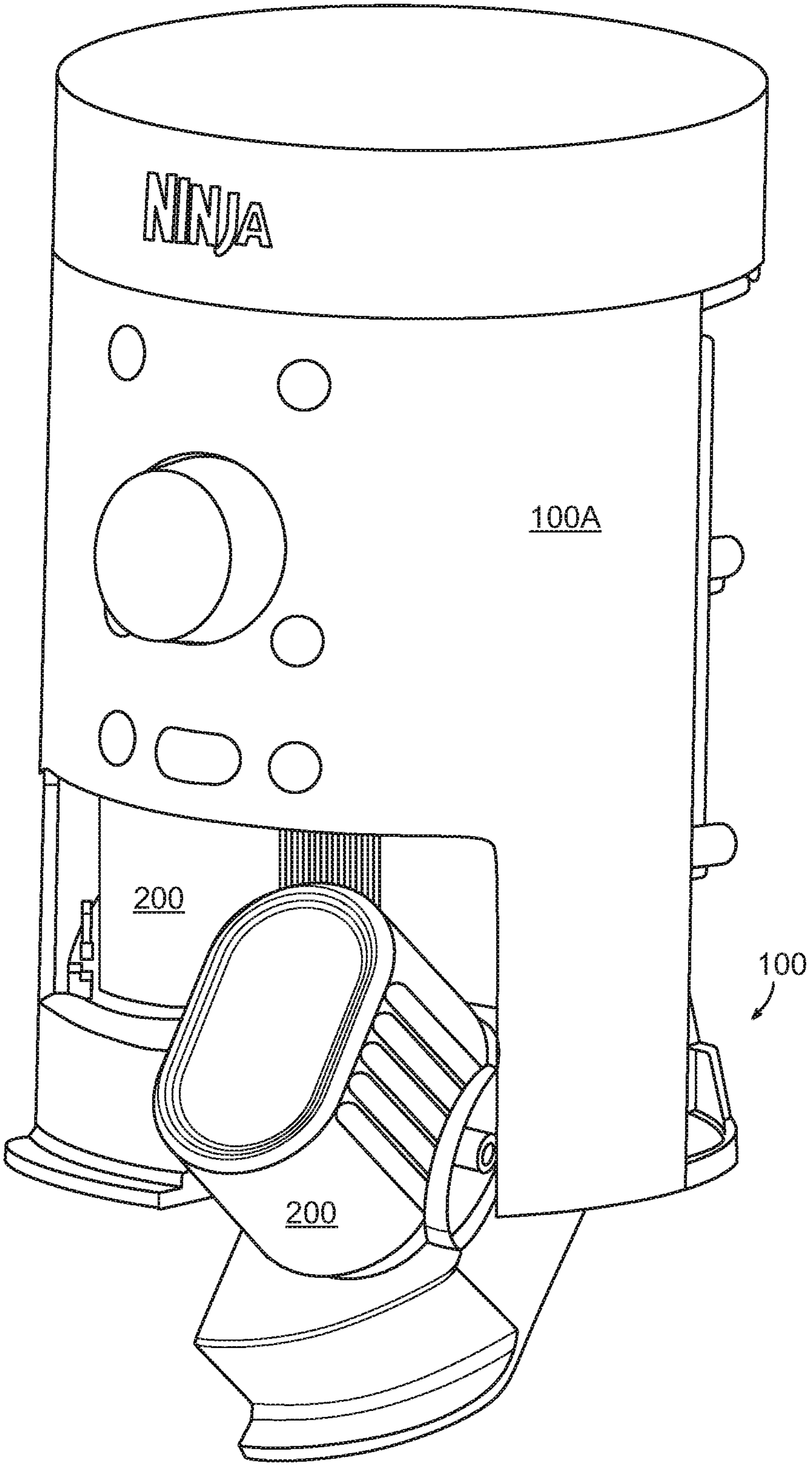
FIG. 17 is a perspective view of the carriage assembly of FIG. 3 having the ingredient container of FIG. 7 loaded therein.

FIG. 16 depicts an underside of the lid 210. The lid base 220 can have a divided, arcuate rim 229 that is sized to couple with the neck 260 (not shown) of the container body 250. The arcuate rim 229, can couple to the neck 260 (not shown) of the container body 250 (not shown) via a snap-fit, threads, and the like. For example, the arcuate rim 229 can include an internal lip 229A that is configured to interface with the flange 264 located on the neck 260. This engagement can be seen especially in FIG. 8C. In an exemplary embodiment, the arcuate rim 229 includes a ridge that engages a corresponding feature on the neck 260 to form a snap-fit connection. Depending upon the means by which the arcuate rim 229 affixes to the container body 250, the physical structure of the arcuate rim 229 may change accordingly. While not shown, a seal such as an O-ring can be disposed within the rim 229 to aid in coupling the lid 210 to the container body 250.

As further shown in FIG. 16, an inner surface of the skirt 221 can include one or more orientation channels 227 that can receive the orientation protrusions 266 (not shown) found on the top 256 of the container body 250 to aid in orientation of the lid 210 on the container body 250. As a result, the lid 210 can be limited to mating to the container body 250 in only two orientations. In embodiments where the lid 210 includes one or more recesses 228 to facilitate coupling with a carriage (e.g., carriage 120), the recesses 228 can extend downward from the underside of the lid 210 in between the inlet and outlet valve frames 224C, 226C, and the arcuate rim 229. In some variations where the recesses 228 are at least partially defined by the shape of the inlet 224, the outlet 226, and the overall shape of the lid 210, the recesses 228 can occupy the entirety of the space found between the inlet and outlet valve frames 224C, 226C, and the arcuate rim 229. Essentially, the recesses 228 can change in form depending upon other features located on the lid 210, such as the inlet collar 224A, the outlet collar 226A, the inlet valve frame 224C, the outlet valve frame 226C, the arcuate rim 229, the retention pattern 230, and more. In other variations, the recesses 228 can occupy only a portion of this space.

Figure 18:
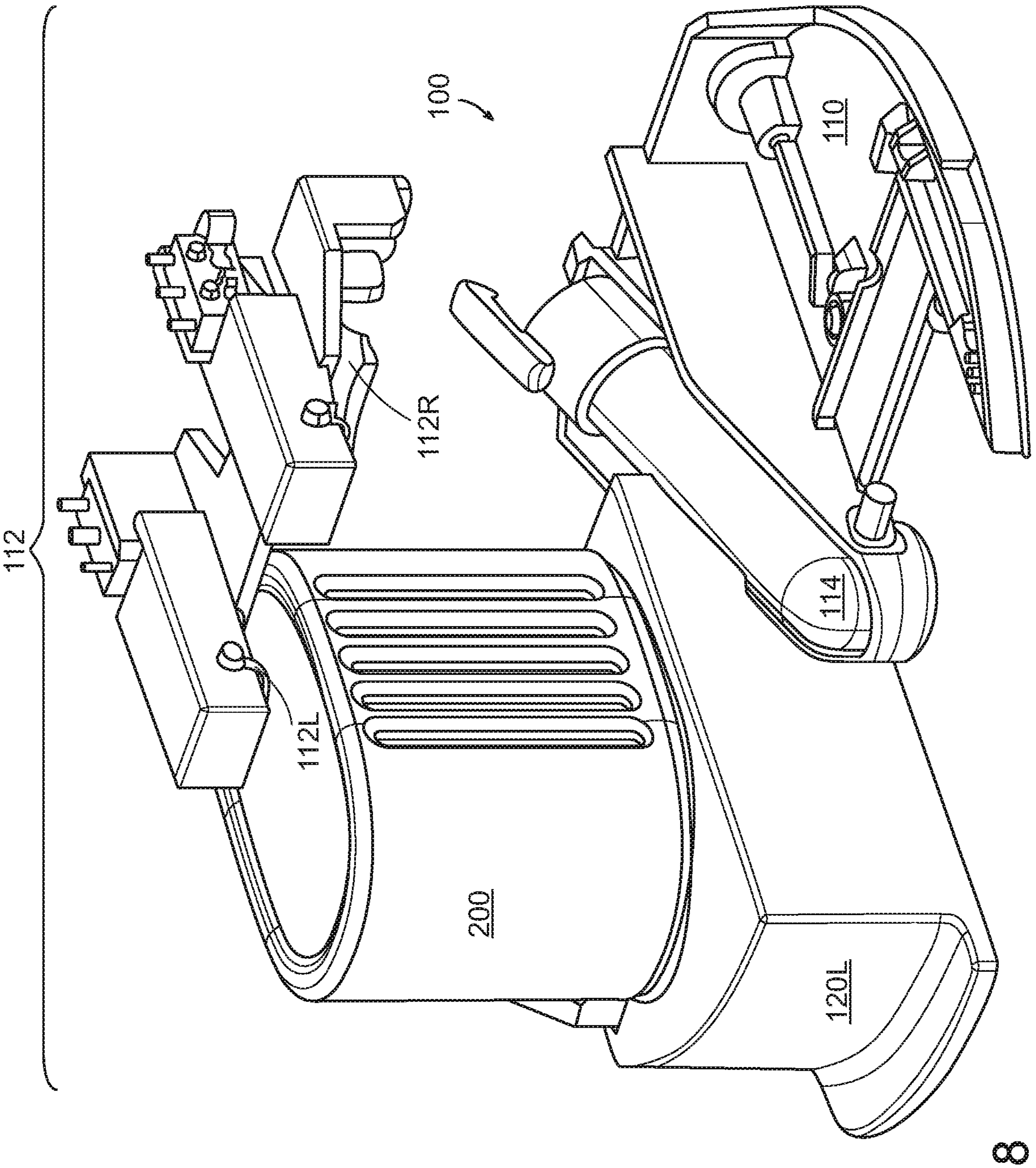
FIG. 18 is a perspective view of the carriage assembly and ingredient container of FIG. 17 having a housing removed.

FIGS. 17-22 depict the ingredient container 200 retained within the carriage assembly 100. FIG. 18 depicts the carriage assembly 100 with the carriage housing 110A (not shown) and the right carriage 120R (not shown) removed. With the right carriage 120R removed, the fluid outlet 114 is more visible.

Figure 19:
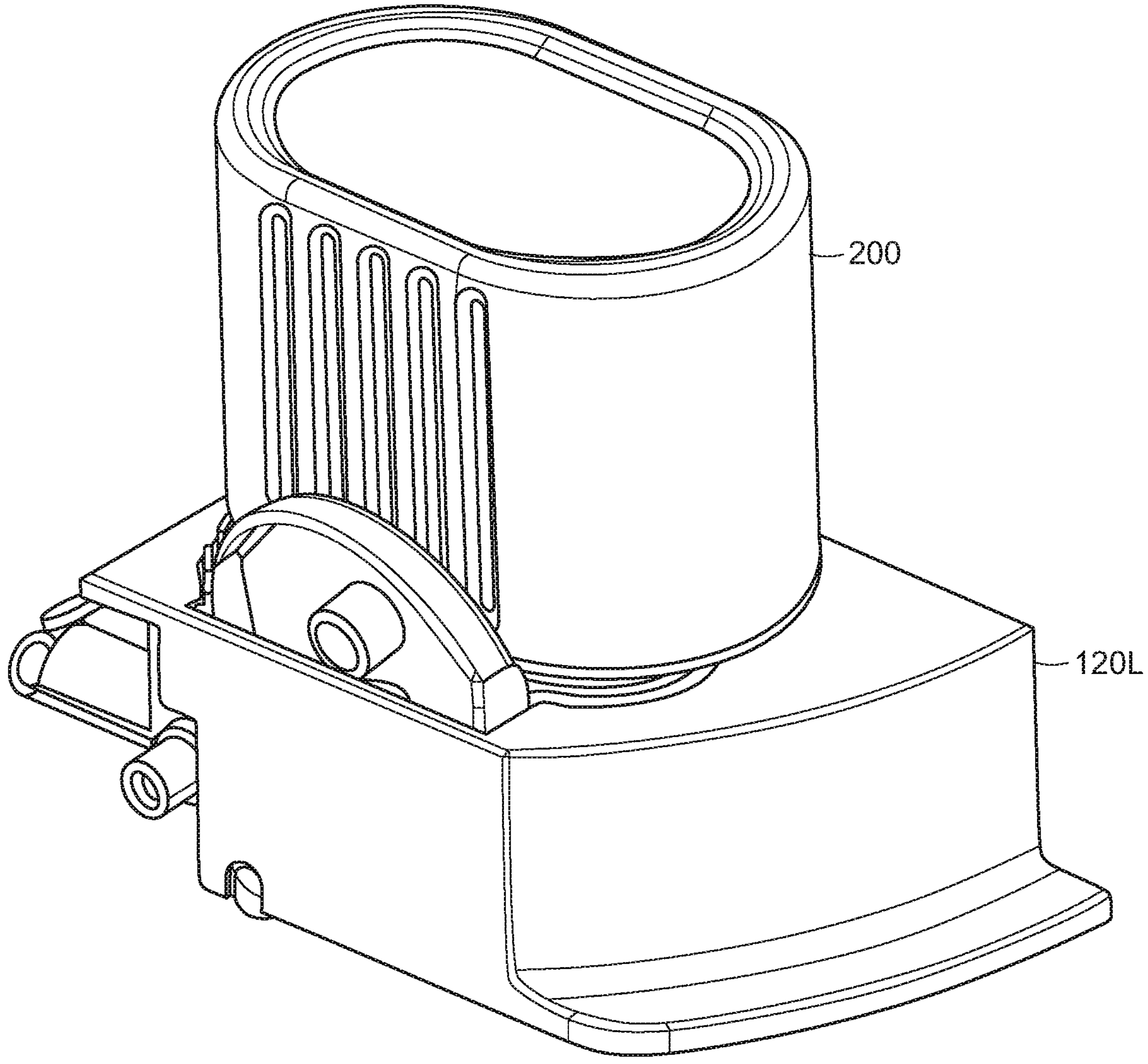
FIG. 19 is a perspective view of the carriage of FIG. 5A having the ingredient container of FIG. 7 loaded therein.
Figure 20:
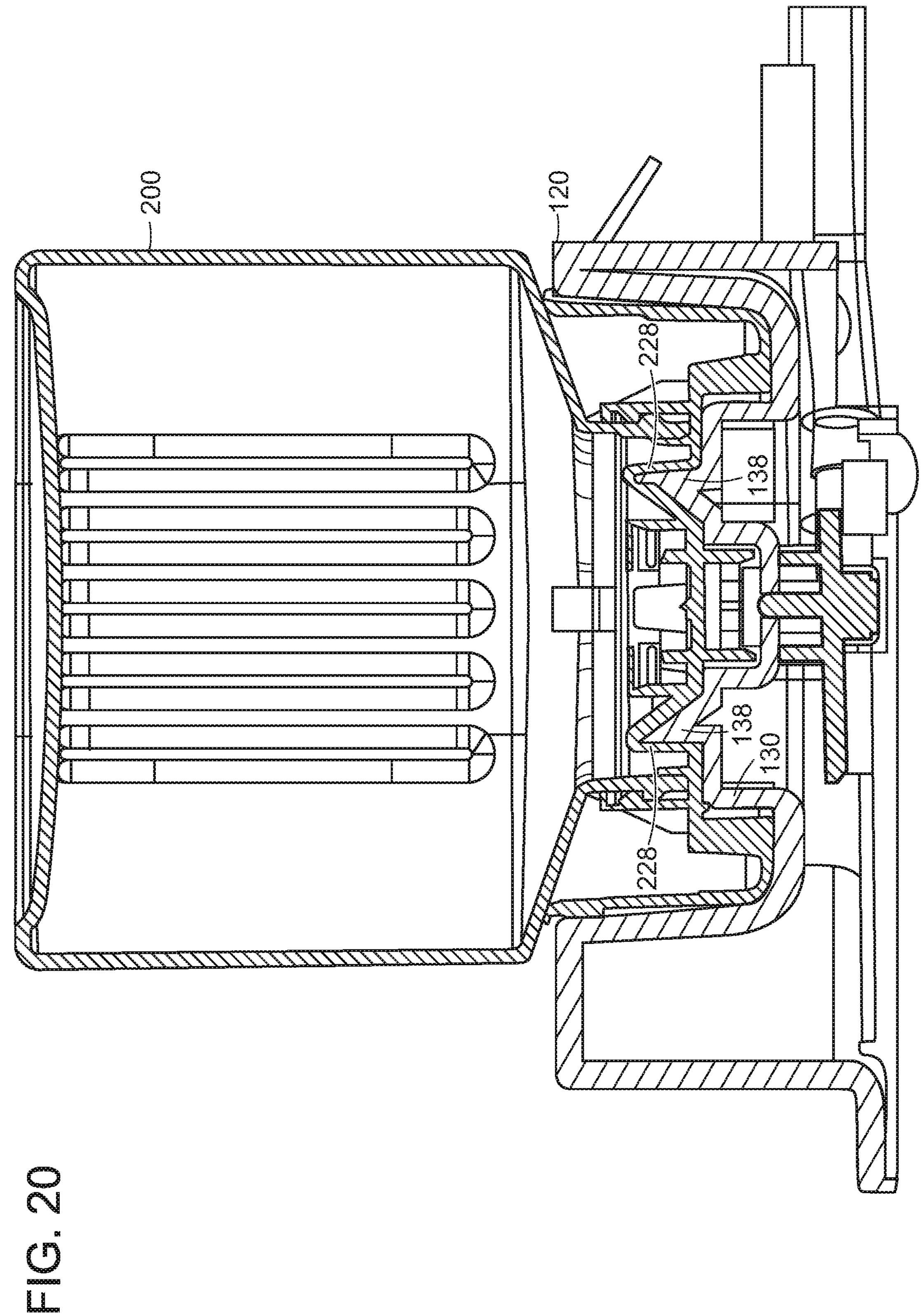
FIG. 20 a cross-sectional view of the carriage and ingredient container of FIG. 19.
Figure 21:
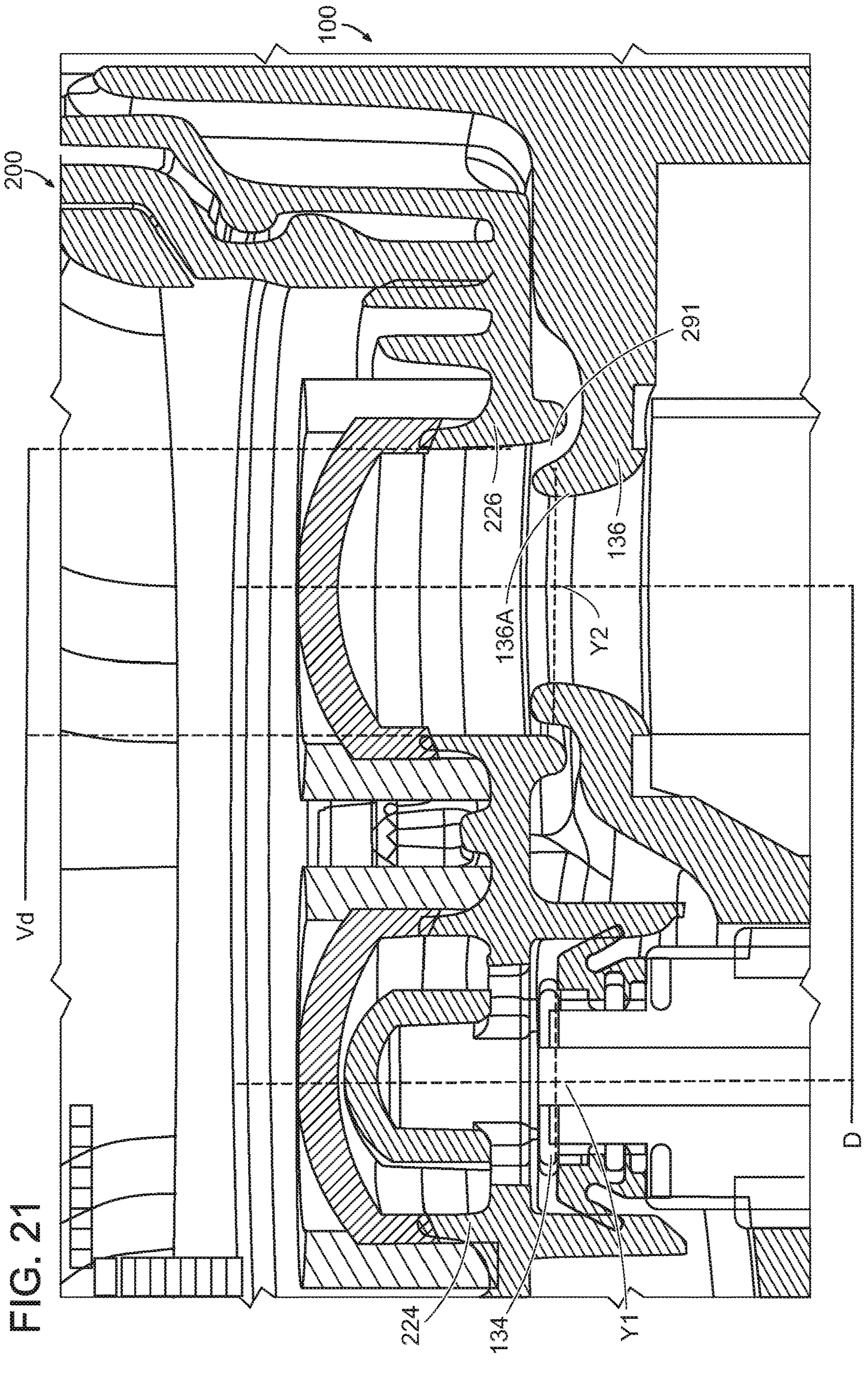
FIG. 21 is a partial cross-sectional perspective view of the container and ingredient container of FIG. 19.
Figure 22:
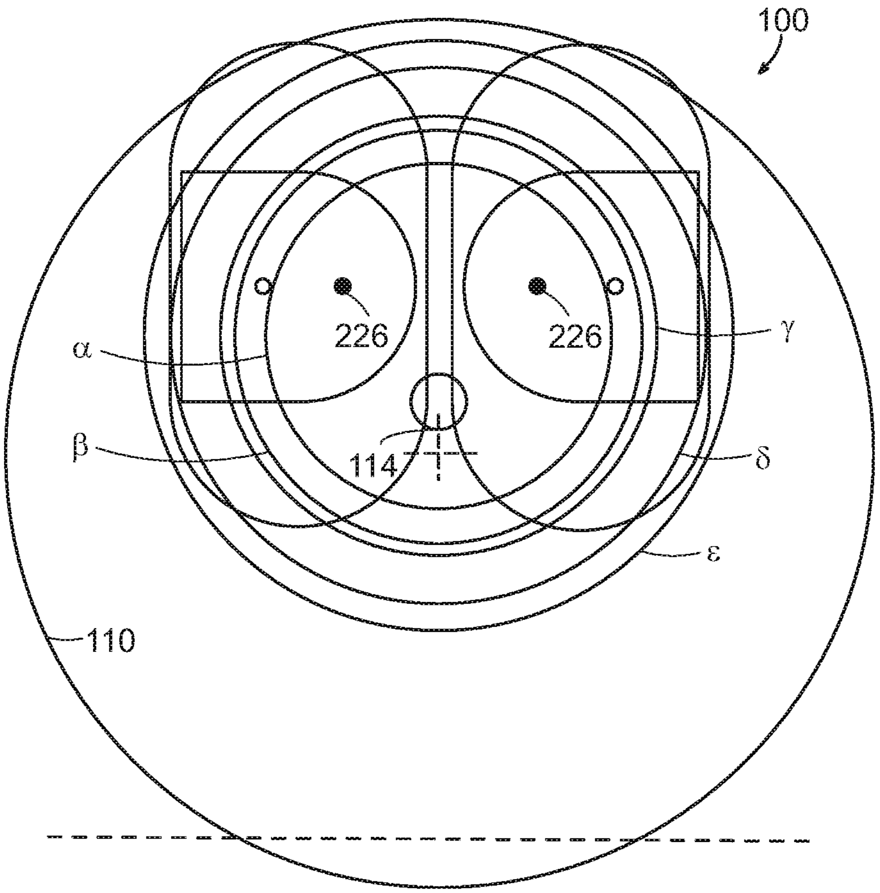
FIG. 22 is a bottom view of a carriage assembly according to some embodiments showing a relative position of ingredient container outlets and a fluid outlet in relation to variously-sized drinkware.

FIGS. 19-22 depict the ingredient container 200 seated within a carriage 120 in greater detail and from various angles to illustrate components on the ingredient container 200 and the carriage 120 coupling together. In order to seat the ingredient container 200, the lid cover 240 can be retained in the open position, as explained above. The carriage 120 can be lowered to expose the carriage face 130, and the ingredient container 200 can be aligned with the carriage face 130 and pressed down so that the carriage inlet 134 engages the inlet 224 and the carriage outlet 136 engages the outlet 226. When seated, the flanking protrusions 138 can extend into the recesses 228, as best shown in FIG. 20. Both the carriage inlet 134 and the carriage outlet 136 can extend respectively into the inlet 224 and the outlet 226, and the inlet collar 224A and the outlet collar 226A can extend circumferentially around the carriage inlet 134 and the carriage outlet 136, as best shown in FIGS. 21 and 22.

While not shown in FIGS. 19-22, in embodiments with a retainer 139, the retainer 139 can also snap into the receivers 232, which may provide an audible signal for a user to know that engagement is successful, such as an audible click when the retainer 139 is engaged and no longer under tension. The rectangular cutout 131 in the carriage face 130 can receive the lid cover 240 when the lid cover 240 is in the fully-opened position, as seen in FIG. 19. Once the container 200 is fully seated, the carriage 120 can be returned to an elevated position. In some embodiments, such movement of the carriage 120 can actuate the corresponding micro-switch 112 and signal to the dispensing system 10 that the container 200 is seated within the carriage assembly 100.

FIG. 21 depicts cross-sectional views of the container 200 seated within the carriage 120. Several distances and dimensions are highlighted relating to the carriage inlet 134, the carriage outlet 136, the inlet 224, and the outlet 226. These distances and dimensions include a distance D between the central longitudinal axis of the inlet 224 and the central longitudinal axis of the outlet 226 and an outlet valve diameter Vd. Also illustrated are a diameter Y1 of the carriage inlet 134, a diameter Y2 of the carriage outlet 136, and an allowable misalignment 291 between the carriage outlet 136 and the outlet 226. The allowable misalignment 291 can define the effective difference in distances between the respective components of the carriage 120 and the container 200, while still enabling a beverage dispensing process to take place. As seen in more detail in FIG. 22, the carriage outlet 136 can include an outlet receiver rim 136A (also known as a seal) that is sized to fit within the outlet 226. The outlet receiver rim 136A and the outlet 226 can together form a sealing surface such that an additive can be dispensed from the outlet 226 during a beverage dispensing process without concern for leaks or inaccurate dosages. If an ingredient container were seated on the carriage 120 and the dimensions of that ingredient container were such that the outlet receiver rim 136A was not properly received in the container outlet 226, then a beverage dispensing process could potentially be compromised. In some aspects, the rim 136A (or seal) can be between about 7 mm to 8 mm in diameter.

In certain embodiments, the distance D between the inlet and outlet can be between about 11 mm and 15 mm, and in some embodiments it can be about 13 mm. Vd can be between about 8 and 11 mm, and in some it embodiments can be about 9.5 mm. Y1 can be between about 7.7 mm and 8.1 mm, and in some embodiments it can be about 7.91 mm. Y2 can be between about 7.5 mm and 7.9 mm, and in some embodiments it can be about 7.70 mm. The allowable misalignment 291 can be between about 0.3 mm and 0.6 mm, and in some embodiments it can be about 0.5 mm.

When the ingredient container 200 is properly seated in the carriage assembly 100, a beverage dispensing process can occur using the stored additive. A user can select their beverage preferences, specifying details including volume, carbonation level, additive type, additive amount, and more. When the selections are received by the dispensing system 10, a beverage can be dispensed with the selected characteristics.

If an additive is desired, air or another gas, including carbon dioxide, nitrogen, oxygen, and the like, can be pumped through the gas line 116 and into the interior of the container body 250 through the inlet port 142 in the carriage 120 and through the inlet valve 244D in the container 200. The resulting increase in pressure within the ingredient container 200 can cause the outlet valve 226D to open and additive to dispense through the outlet 226 and the outlet port 244, into a drink container, such as the drinking glass 26 depicted in FIG. 1. In embodiments where the additive is a fluid, the additive can be dispensed at a certain dispensing flowrate F under a certain pressure. For example, in some embodiments, the dispensing flow rate F can be between about 1 mL/sec and 4 mL/sec. In other embodiments, the dispensing flow rate F can be about 2 mL/sec. A base liquid, such as carbonated water, can also be dispensed from the fluid outlet 114 such that the base liquid and the additive combine in the drinking glass 26.

In an exemplary embodiment, the carriage assembly 100 and two ingredient containers 200 can be arranged to minimize a distance between the fluid outlet 114 of the carriage assembly 100 and the outlets 226 of the ingredient containers 200. A bottom perspective of this arrangement is illustrated in FIG. 22. Although the outlets 226 and the fluid outlet 114 can be distinct, the distance between each outlet 226 (and the outlet port 244, in turn) and the fluid outlet 114 can be minimized as a result of the overall carriage assembly 100 configuration. The minimization of distance can arise as a result of the position of each outlet 226 on the respective ingredient containers 200, located on a minor axis B-B (not shown). When the ingredient containers 200 are received in the carriage assembly, the containers 200 can be positioned such that each outlet 226 is centrally located and close to the fluid outlet 114, which can extend between the two carriages 120, as shown above, for example, in FIG. 18.

This minimized distance can allow for a variety of drink containers to be placed beneath the carriage assembly 100 and to receive a beverage while also minimizing splashing and overall mess. For example, several circles indicative of a scale are shown in FIG. 19, and they can represent, in order of smallest to largest, a narrow water bottle circumference a, a highball glass circumference (3, a Collins glass circumference y, a mason jar circumference 6, and a pint glass circumference E. These circumferences are meant to illustrate the variety of drinkware usable with the beverage dispensing system 10 as a result of the arrangement of the containers 200 within the carriage assembly.

During a dispensing procedure, accurate dosages can be important to the creation of a beverage and can affect the quality of the resulting product. This accuracy can be affected by a number of parameters, each introduced and described above, including opening pressure Po, closing pressure Pc, the outlet valve diameter Vd of an outlet valve, and the slit length Ls on the outlet valve.

Each of these parameters can affect an overall accuracy of the ingredient container 200 during a beverage dispensing process. For example, if the opening pressure Po and/or the closing pressure Pc are too low, minor fluctuations in the internal pressure of the ingredient container 200 during a dispensing process, such as those associated with normal tolerance levels of the beverage dispensing device 10, could contribute to inaccurate dispensing of an additive. Conversely, if the opening pressure Po and/or the closing pressure Pc are too high, the additive could be dispensed in an extreme manner, resulting in excess spray of the additive and also resulting in inaccurate dispensing.

As explained above, the opening pressure Po is the pressure required to open the outlet valve 226D and permit fluid to flow therethrough. Once the outlet valve 226D is open and fluid is dispensed, the built-up pressure will taper off and decrease over time. Eventually, the pressure will reach a value that is too low to keep the outlet valve 226D open. This lower limit is the closing pressure Pc. The difference ΔP between the opening pressure Po and the closing pressure Pc can be optimized so as to not be either too great or too small, as this can affect the overall dosing accuracy during flavoring. The overall structure of the outlet valve, including its size, shape, and material, can alter the value of the opening pressure Po and closing pressure Pc, which can affect performance of the ingredient container 200. For example, if the difference ΔP is too small, minor fluctuations during a dispensing procedure could cause the outlet valve 226D to prematurely open or close. If the difference ΔP is too large then the outlet valve 226D could have trouble closing once opened, which could result in an inability to add small doses of an additive.

If the opening pressure Po is too high, the dispensing of fluid can become explosive, unmeasured, and/or unpredictable during dispensing, which can result in an overall loss of dosing accuracy. If opening pressure Po is too low, minor fluctuations or disturbances could lead to leaking and accidental discharge of an additive, which could also result in an overall loss of dosing accuracy. If the closing pressure Pc is too high, especially relative to the opening pressure Po (which would result in a small difference ΔP), then the window at which the outlet valve 226D is open would shrink drastically, which can result in a temperamental valve that is only able to open at a small pressure window. Conversely, if the closing pressure Pc is too low, then the outlet valve 226D will be open for too long as an additive is dispensed, which can also lead to an overall loss of dosing accuracy as the outlet valve 226D could fail to close in a precise manner, leading to over-dosing of the additive. Accordingly, the opening pressure Po and closing pressure Pc can be optimized to result in accurate dosing.

Additionally, the outlet valve diameter Vd and the slit length Ls—values affecting the dimensions of the outlet 226 and the outlet valve 226D—can effect dosing accuracy if they are too large or small. Forcing an additive out of a too-small or too-large slit 226H or outlet 226 can affect process timing and overall dosing, thereby affecting the accuracy of the dispensing process.

These values can vary depending upon the manufacturing process, materials, quality, etc. of the ingredient container 200. Together, these values can contribute to a so-called Dosing Accuracy (DA) value, which can be used to rate the quality of an ingredient container 200. In general, a given outlet valve on the ingredient container 200 can have a maximum potential in terms of a DA value, such as being able to accurately doze an additive, having a low minimum dose threshold for precision dosing, etc. This maximum potential can be limited, in some embodiments, by a quality of an inlet valve on the ingredient container 200. For example, for a given outlet valve, a quality inlet valve will mean that the maximum potential of the ingredient container 200 can be achieved or at least nearly achieved. However, for the same outlet valve, a poor inlet valve can result in a large drop-off in performance from the outlet valve's potential.

The DA value can be expressed by the following formula:

$$DA = \left[\frac{(Po - Pc)}{(Vd - Lz)}\right]$$

The individual values of these variables can vary, however their relationship according to the DA formula can provide a simple way to compare the quality of valves. Table 1 lays out several example values according to various designs, with each having the same outlet valve diameter D. It has been discovered that, according to the above formula, a valve having a DA value of 100 or less can accurately dose an additive in order to create a consistent beverage product. Each of the provided examples yields a DA value of 100 or less, with the exception of Examples 16 through 21. These examples pertain to valves which do not provide the ability to accurately dose an additive, likely due to the combination of properties of the valve, including the higher slit length Ls and higher difference ΔP between the opening and closing pressures Po, Pc.

TABLE 1

| Examples | | | | | | |
|---|---|---|---|---|---|---|
| Example | Po | Pc | Vd | Ls | ΔP | DA |
| 1 | 483 | 343 | 9.5 | 2.5 | 140 | 20 |
| 2 | 483 | 323 | 9.5 | 1.8 | 160 | 21 |
| 3 | 1819 | 1628 | 9.5 | 3.7 | 191 | 33 |
| 4 | 660 | 455 | 9.5 | 1.8 | 205 | 27 |
| 5 | 665 | 450 | 9.5 | 3.7 | 215 | 37 |
| 6 | 483 | 267 | 9.5 | 3.7 | 216 | 37 |
| 7 | 660 | 409 | 9.5 | 2.5 | 251 | 36 |
| 8 | 483 | 224 | 9.5 | 4.7 | 259 | 55 |
| 9 | 483 | 218 | 9.5 | 5.1 | 265 | 60 |
| 10 | 1448 | 1163 | 9.5 | 1.8 | 284 | 37 |
| 11 | 960 | 640 | 9.5 | 2.5 | 320 | 46 |
| 12 | 660 | 318 | 9.5 | 3.7 | 342 | 59 |
| 13 | 1427 | 1019 | 9.5 | 2.5 | 409 | 59 |
| 14 | 848 | 419 | 9.5 | 3.7 | 429 | 74 |
| 15 | 660 | 208 | 9.5 | 4.7 | 452 | 95 |
| 16 | 660 | 191 | 9.5 | 5.1 | 469 | 107 |
| 17 | 1405 | 724 | 9.5 | 3.7 | 681 | 117 |
| 18 | 2212 | 1483 | 9.5 | 3.7 | 729 | 125 |
| 19 | 4575 | 3759 | 9.5 | 3.7 | 816 | 140 |
| 20 | 1379 | 305 | 9.5 | 4.7 | 1074 | 226 |
| 21 | 4234 | 2593 | 9.5 | 3.7 | 1641 | 282 |

The DA factor, in some embodiments can be less than 100 according to the above formula, and it could fall more specifically between about 40 and 70. In further embodiments, the DA factor can be about 55. In systems with a DA factor that is less than 100, beverage making processes can accurately dose an additive to within fractions of a mL. For example, an amount of additive, such as a fluid, dispensed during a process can be between about 1.6 mL and 2.0 mL, and in some embodiments can be about 1.8 mL. This volume of fluid can be dispensed after gas is pumped into the container for a predetermined time period, such as about 140 ms. Importantly, the amount of fluid dispensed by a container can be proportional to a difference between the opening and closing pressures of a given valve.

As indicated above, the various properties of the valve can vary. In certain exemplary embodiments, the valve has an opening pressure Po that is about 300 $mmH_2O$ or greater, and more preferably is about 400 $mmH_2O$ or greater, or even 600 $mmH_2O$ or greater; a closing pressure Pc that is less than the opening pressure Po but that is about 100 $mmH_2O$ or greater, and more preferably is about 300 $mmH_2O$ or greater, or even, in some embodiments, 400 $mmH_2O$ or greater; a pressure differential (delta P) that is in range of about 200 $mmH_2O$ to 500 $mmH_2O$, and more preferably is about 300 $mmH_2O$ to 400 $mmH_2O$, and even more preferably is about 340 $mmH_2O$; and an outlet valve diameter Vd in a range of about 5 mm to 15 mm. In certain embodiments, Vd can be about 7 mm to 13 mm, and more preferably about 9.5 mm; a slit length Ls in a range of about 1 mm to 5 mm, and more preferably is about 3.7 mm.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A container for use in a beverage system, comprising:

a container housing defining an interior hollow chamber;

an inlet port disposed on the container housing and having an inlet valve seated therein, the inlet valve being movable between a closed configuration for preventing passage of fluid there through, and an open configuration for allowing passage of fluid there through;

an outlet port disposed on the container housing and having an outlet valve seated therein, the outlet valve being movable between a closed configuration for preventing passage of fluid there through, and an open configuration for allowing passage of fluid there through; and a collar positioned around the inlet port, the collar having an inner surface with at least a portion configured to circumferentially sealingly engage a seal having an outer diameter in a range of about 7 mm to 8 mm.

2. The container of claim 1, wherein the container housing comprises a container body coupled to a cap, the cap including a skirt extending around an end wall thereof and defining a sidewall of the container body.

3. The container of claim 2, wherein the skirt has a substantially triangular shape.

4. The container of claim 2, wherein the collar projects outward from the end wall.

5. The container of claim 1, wherein the collar is substantially cylindrical.

6. The container of claim 1, wherein the inlet valve and the outlet valve each include a cross-shaped slit configured to enable fluid flow therethrough.

7. The container of claim 1, wherein the container housing includes a closure pivotally coupled thereto and movable between an open position and a closed position, the closure being configured to close off the inlet valve and the outlet valve in the closed position.

8. A container for use in a beverage system, comprising:

a container housing defining an interior hollow chamber;

an inlet port disposed on the container housing with an inlet valve that is sealed to retain a fluid additive within the interior hollow chamber and that is configured to open to allow gas to be injected into the interior hollow chamber; and an outlet port disposed on the container housing with an outlet valve that is sealed to retain a fluid additive within the interior hollow chamber and that is configured to open when a pressure within the interior hollow chamber exceeds a threshold pressure to allow fluid additive within the container body to flow through the outlet valve, wherein the inlet port has an inner diameter in a range of about 7 mm to 9 mm.

9. The container of claim 8, wherein the inner diameter of the inlet port is about 8 mm.

10. The container of claim 8, wherein the container housing includes a closure pivotally coupled thereto and movable between an open position and a closed position, the closure being configured to close off the inlet valve and the outlet valve in the closed position.

11. The container of claim 8, wherein the container housing has a substantially ovular cross-section including a major axis along a first width and a minor axis along a second width.

12. The container of claim 11, wherein the inlet port and the outlet port are aligned with the minor axis of the container housing.

13. The container of claim 11, wherein the container housing comprises a container body coupled to a cap, and wherein the cap includes at least one orientation element configured to orient the cap relative to the container body.

14. The container of claim 8, wherein the inlet valve and the outlet valve each include a cross-shaped slit configured to enable fluid flow therethrough.

* * * * *